United States Patent [19]

Kauffman et al.

[11] 4,141,680
[45] Feb. 27, 1979

[54] ROTARY STRETCH BLOW MOLDING APPARATUS

[75] Inventors: Ivan L. Kauffman, Commerce Township, Oakland County; Robert C. Kellogg, Hartland Township, Livingston County, both of Mich.

[73] Assignee: Monsanto Company, St. Louis, Mo.

[21] Appl. No.: 415,851

[22] Filed: Nov. 14, 1973

[51] Int. Cl.² ............................................. B29D 23/03
[52] U.S. Cl. ..................................... 425/529; 425/526; 425/534
[58] Field of Search ................. 425/451, 387 B, 326 B, 425/DIG. 203, DIG. 204, DIG. 205, DIG. 211, DIG. 216, DIG. 201, 453, DIG. 213, 451.9, 526, 529, 534

[56] References Cited

U.S. PATENT DOCUMENTS

| | | | |
|---|---|---|---|
| 3,179,041 | 4/1965 | Lutai et al. | 425/455 |
| 3,275,726 | 9/1966 | Rudolph | 425/326 B |
| 3,314,110 | 4/1967 | Missbach | 425/384 |
| 3,351,980 | 11/1967 | Hehl | 425/DIG. 204 |
| 3,382,532 | 5/1968 | Schweiger | 425/326 B |
| 3,415,915 | 12/1968 | Lecluyse et al. | 425/DIG. 211 |
| 3,431,594 | 3/1969 | Schenck et al. | 425/455 |
| 3,439,380 | 4/1969 | Seefluth | 425/DIG. 216 |
| 3,599,280 | 8/1971 | Rosenkranz et al. | 426/DIG. 203 |
| 3,776,991 | 12/1973 | Marcus | 425/DIG. 216 |
| 3,817,676 | 6/1974 | Seefluth | 425/387 B |
| 3,864,445 | 2/1975 | Dean | 425/DIG. 213 |
| 3,892,829 | 7/1975 | Uhlig | 425/DIG. 215 |

FOREIGN PATENT DOCUMENTS

| | | | |
|---|---|---|---|
| 1314044 | 11/1962 | France | 425/DIG. 205 |
| 64-16941 | 8/1964 | Japan | 425/DIG. 205 |
| 1166893 | 10/1969 | United Kingdom | 425/DIG. 204 |

*Primary Examiner*—Richard B. Lazarus
*Assistant Examiner*—Gus T. Hampilos
*Attorney, Agent, or Firm*—Michael J. Murphy

[57] ABSTRACT

A continuous motion stretch blow molding apparatus for blow molding hollow articles from tubular parisons. A rotary parison loading turret loads parisons sequentially onto a plurality of stretch pin means operatively carried on a continuous motion transfer means which then conveys each of said stretch pin means into an operative position in a molding station on a continuous motion multi-station rotary molding turret. The parisons are stretched longitudinally, blown to form a final article, cooled in the molding stations, and then said article is ejected.

34 Claims, 66 Drawing Figures

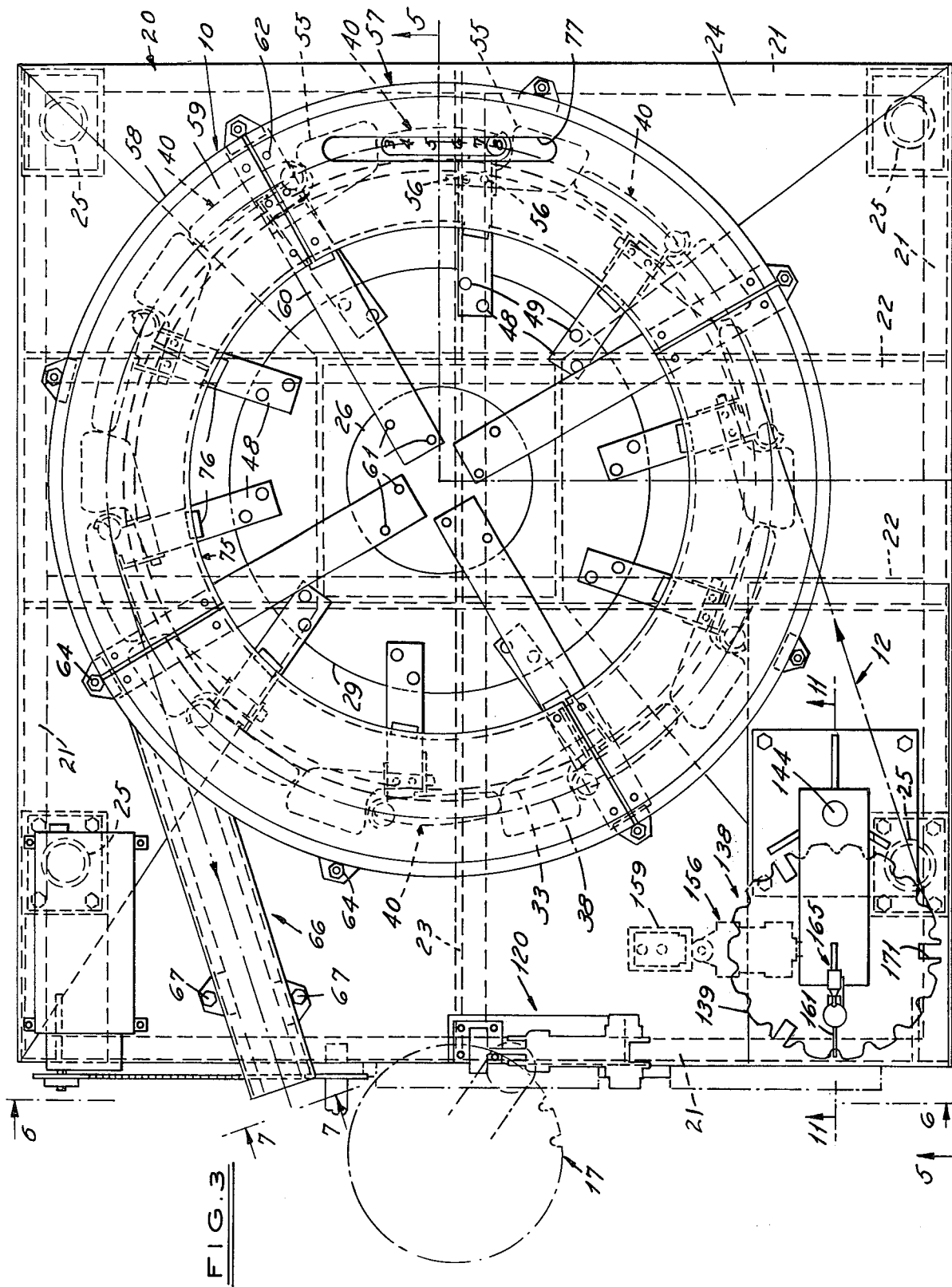

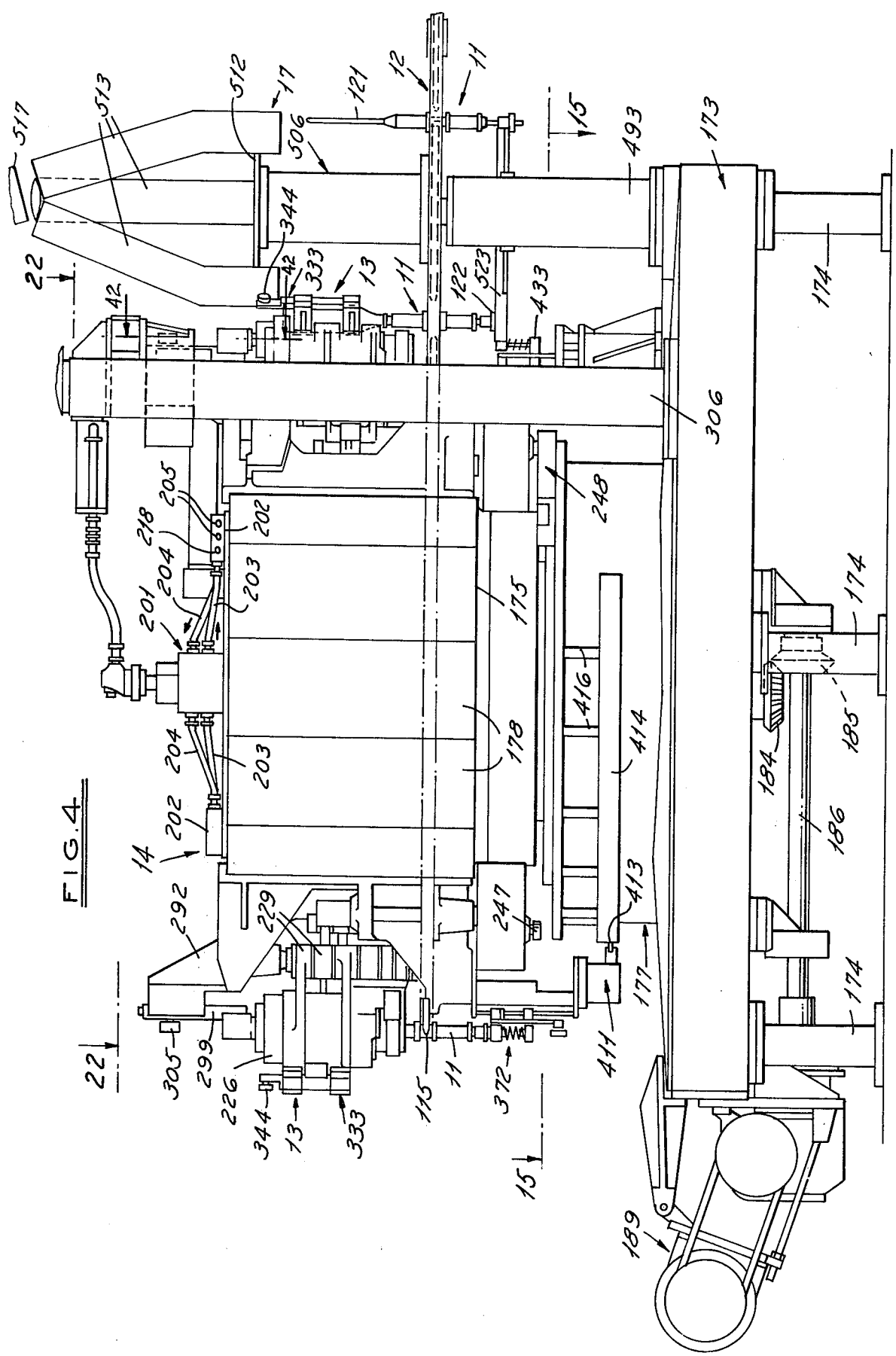

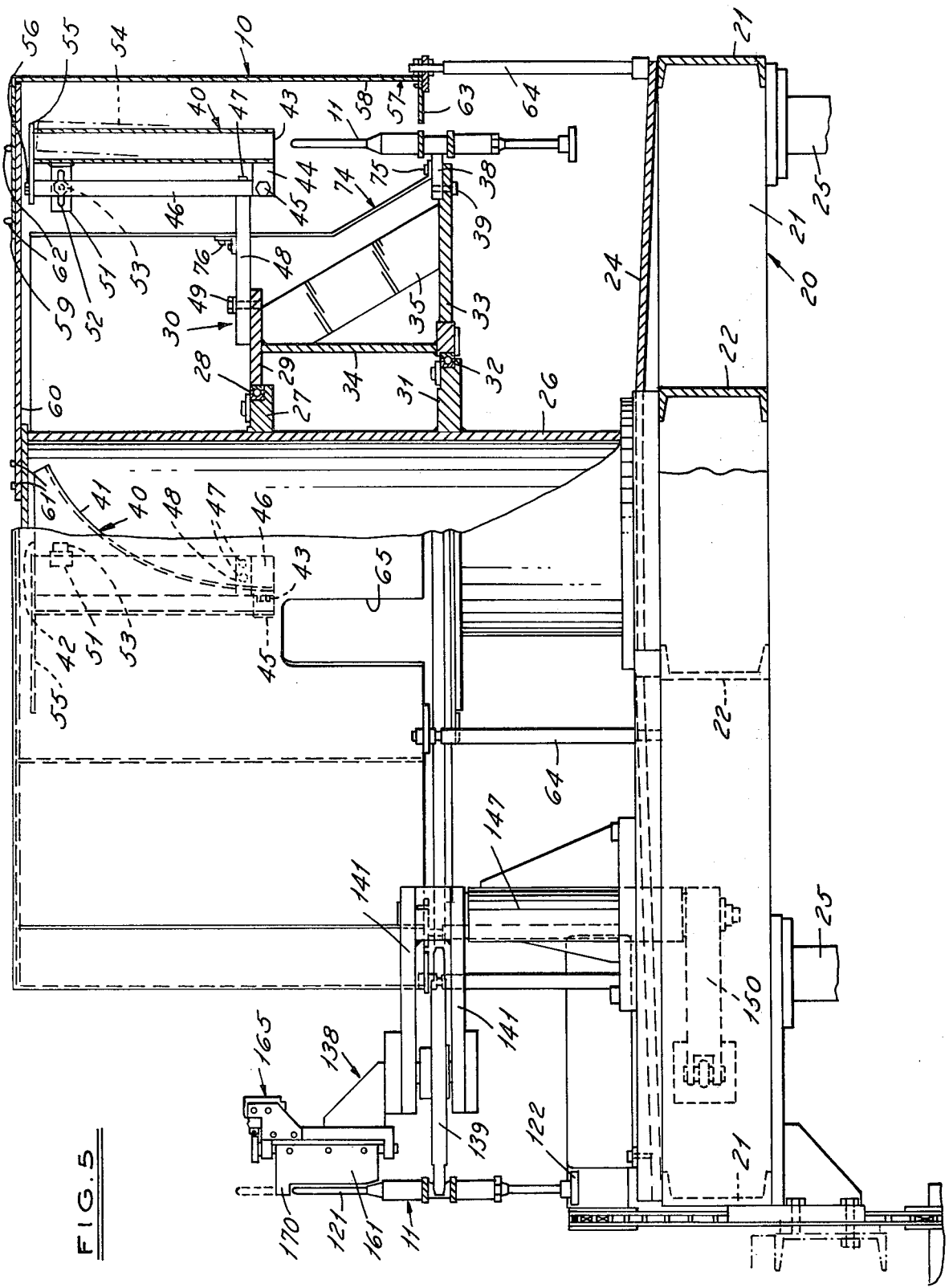

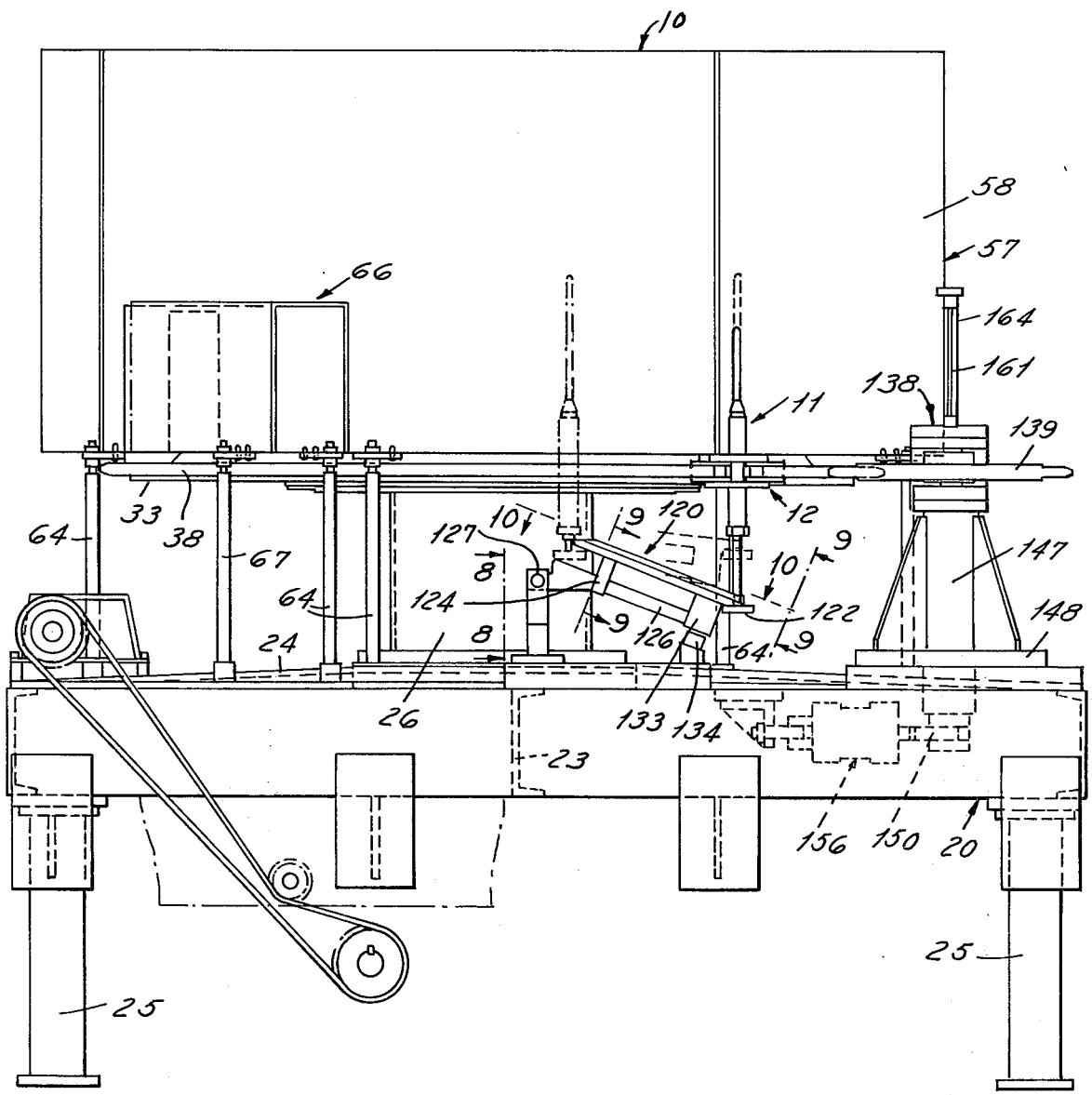

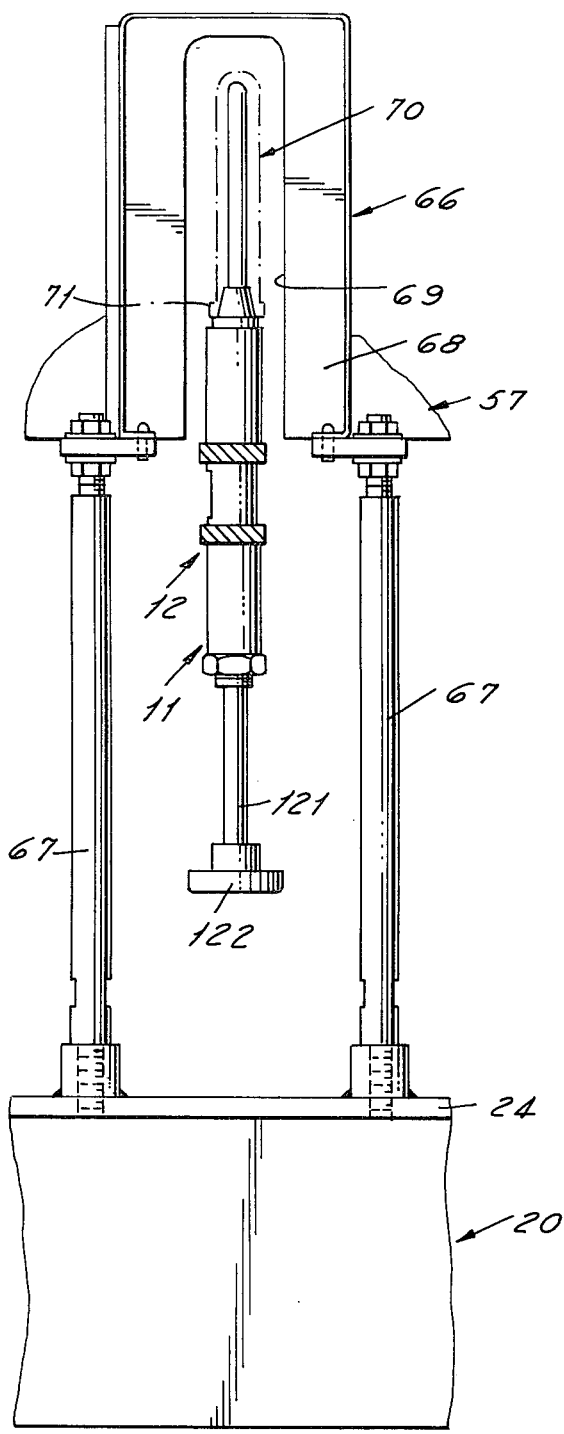
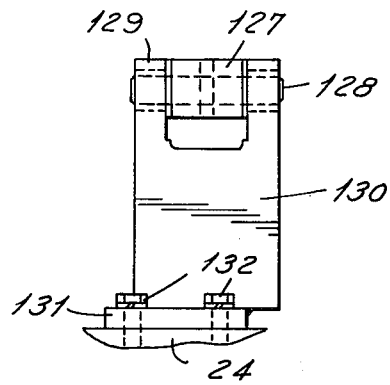
FIG.8
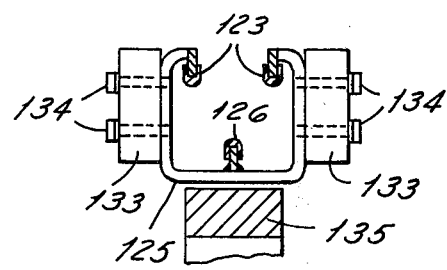
FIG.9
FIG.7

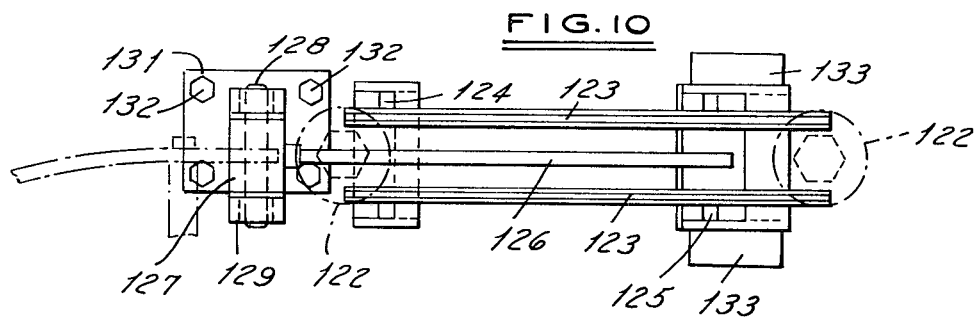
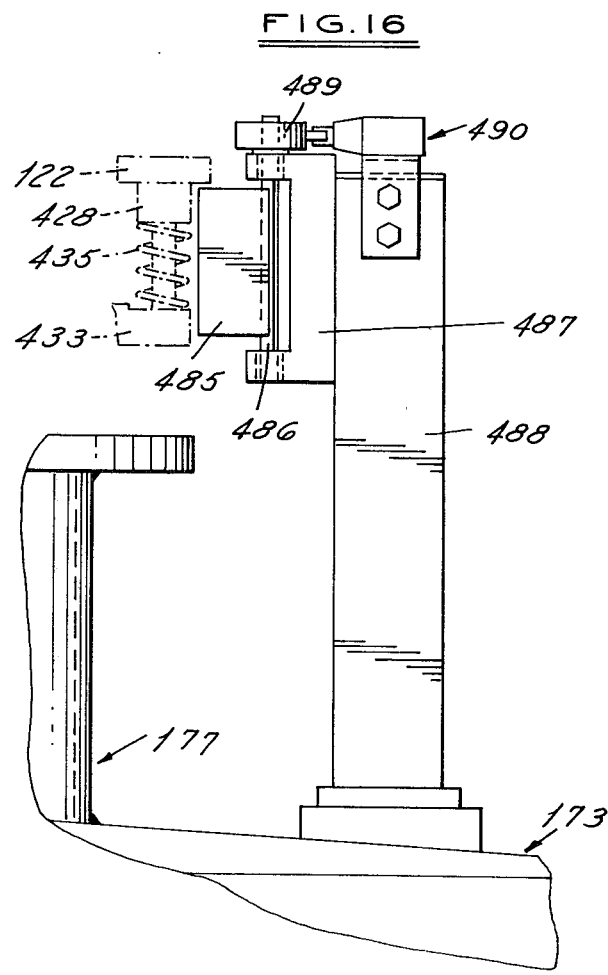

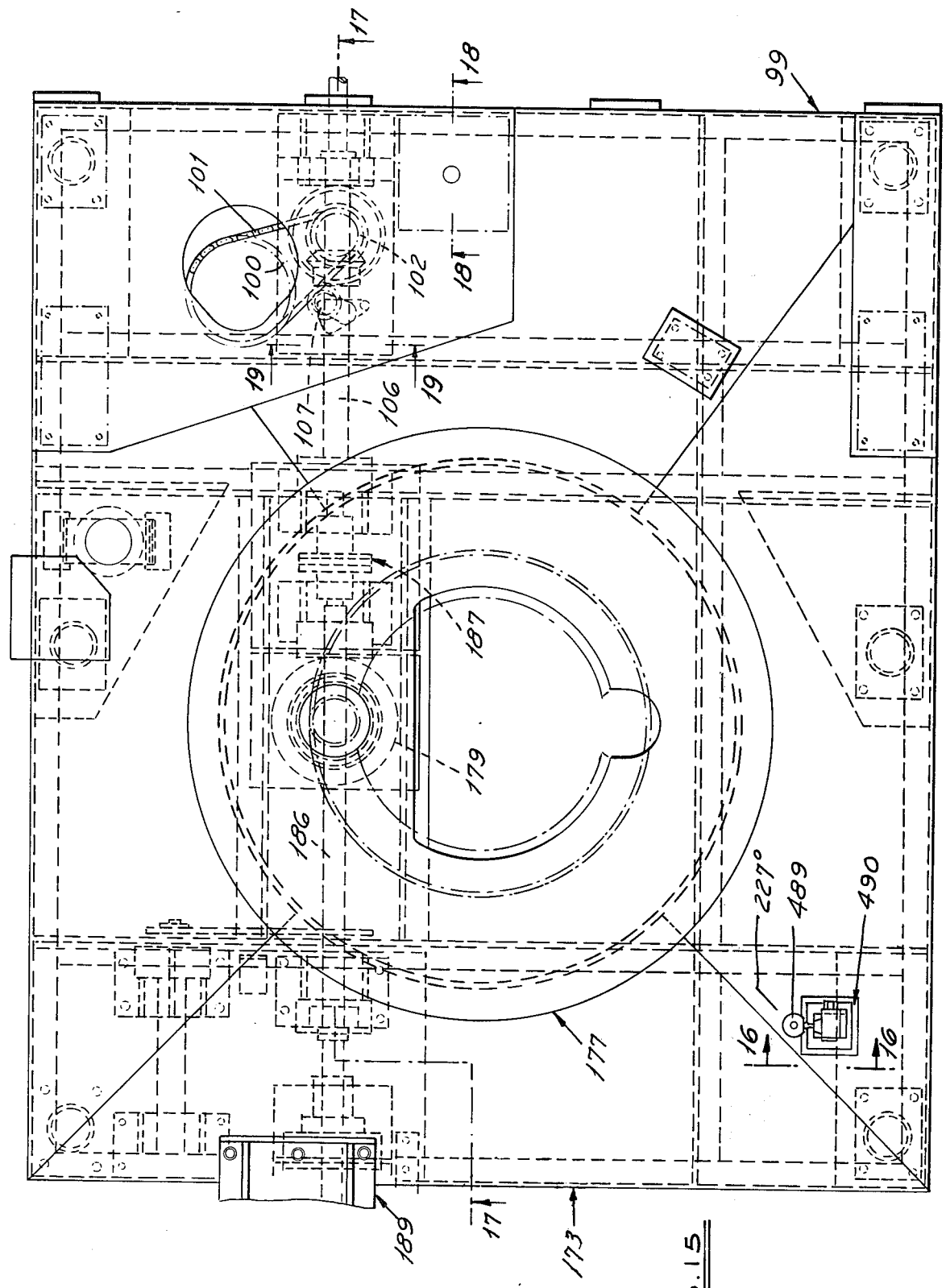

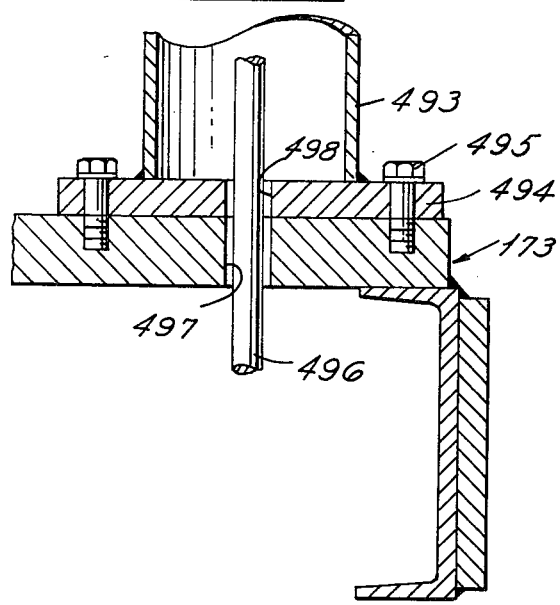
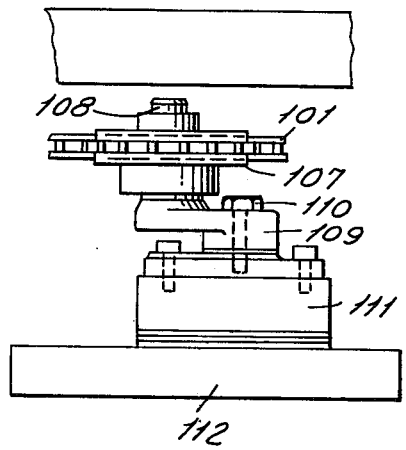
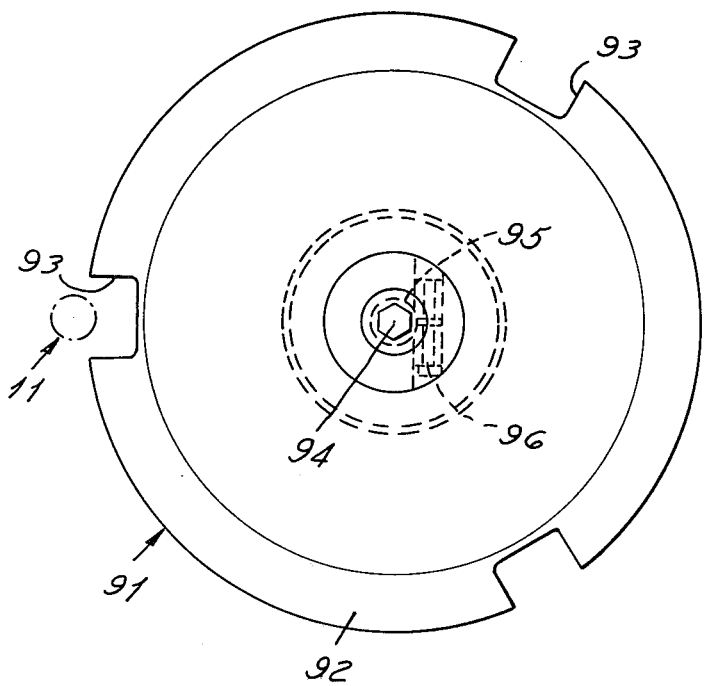

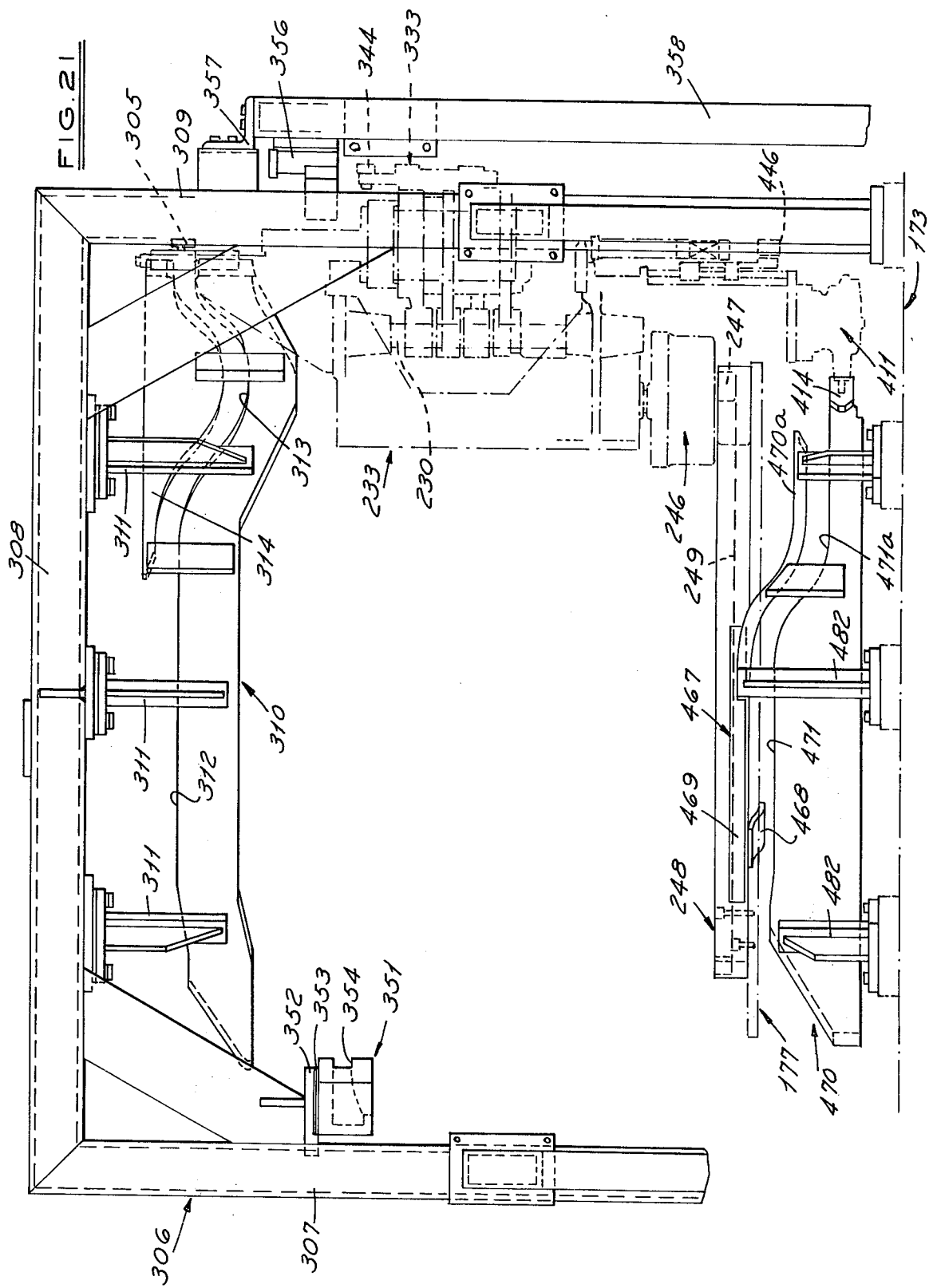

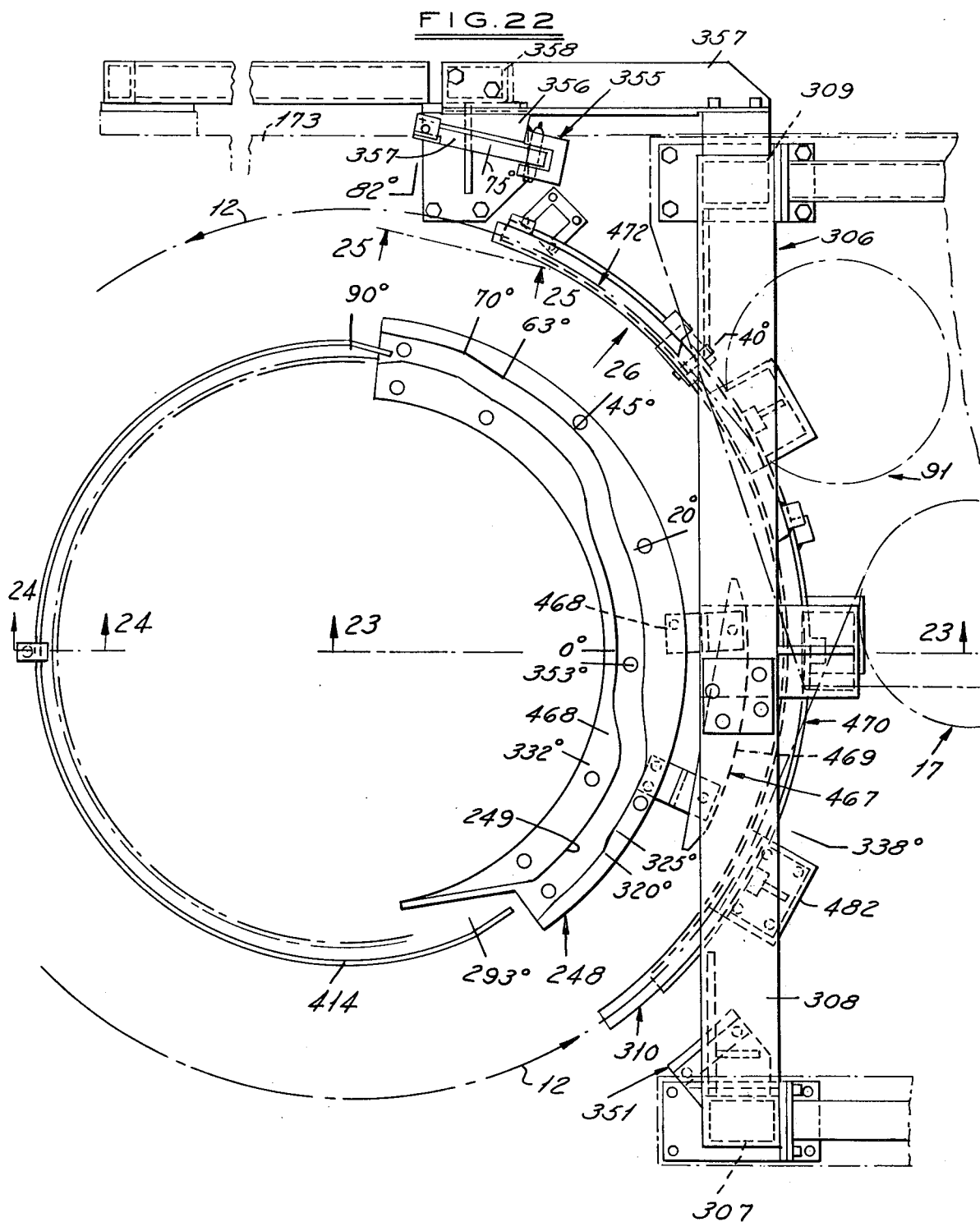

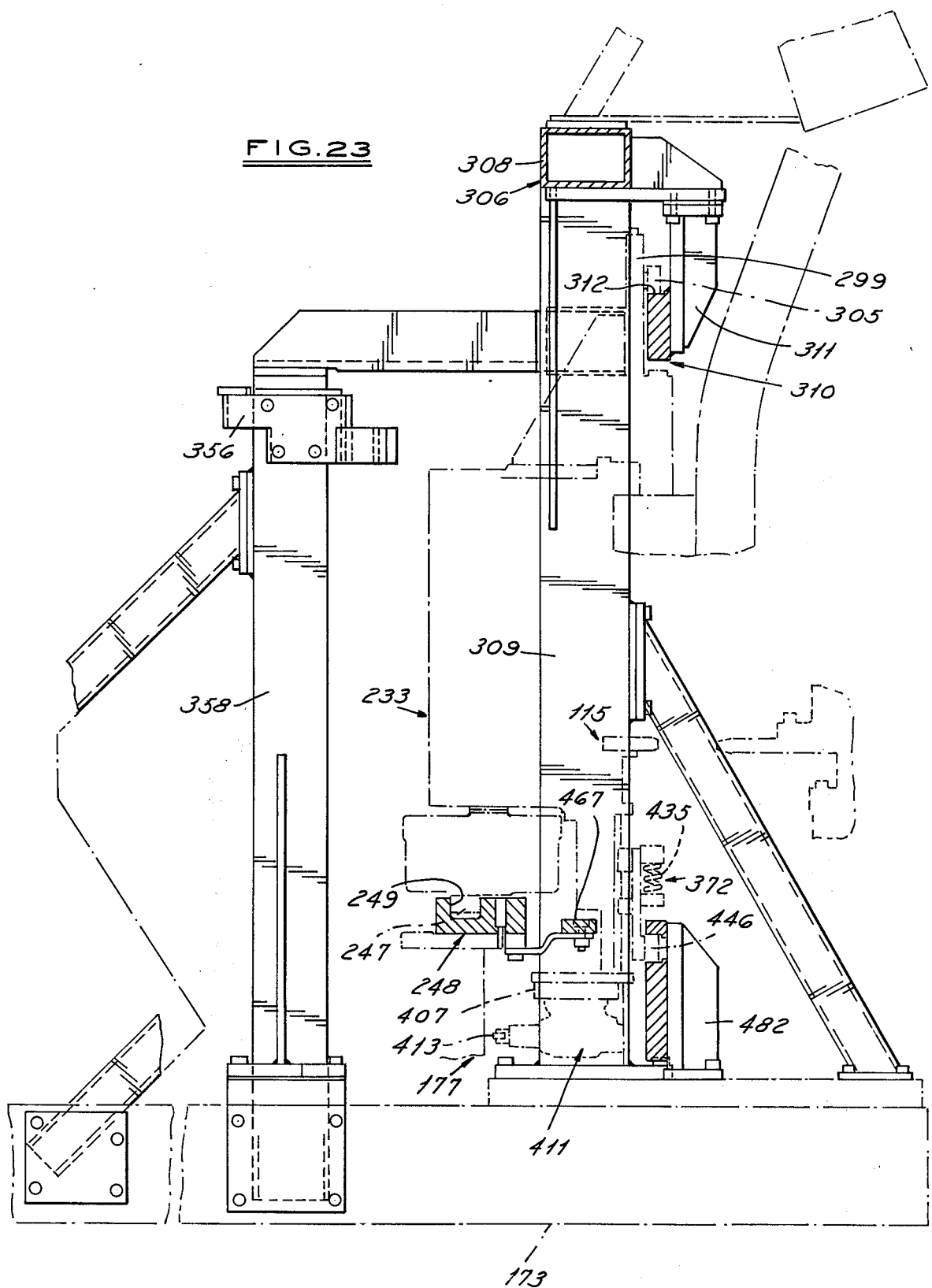

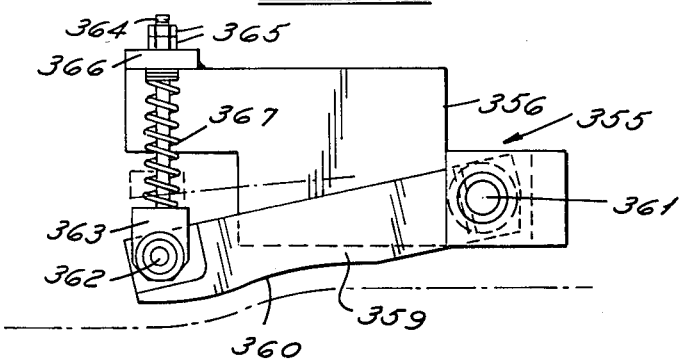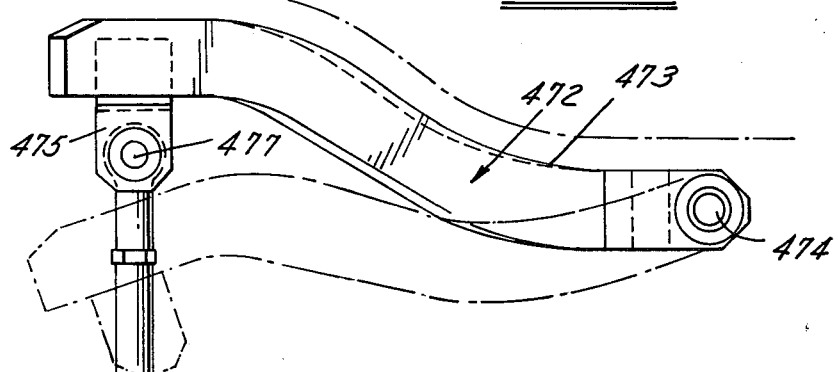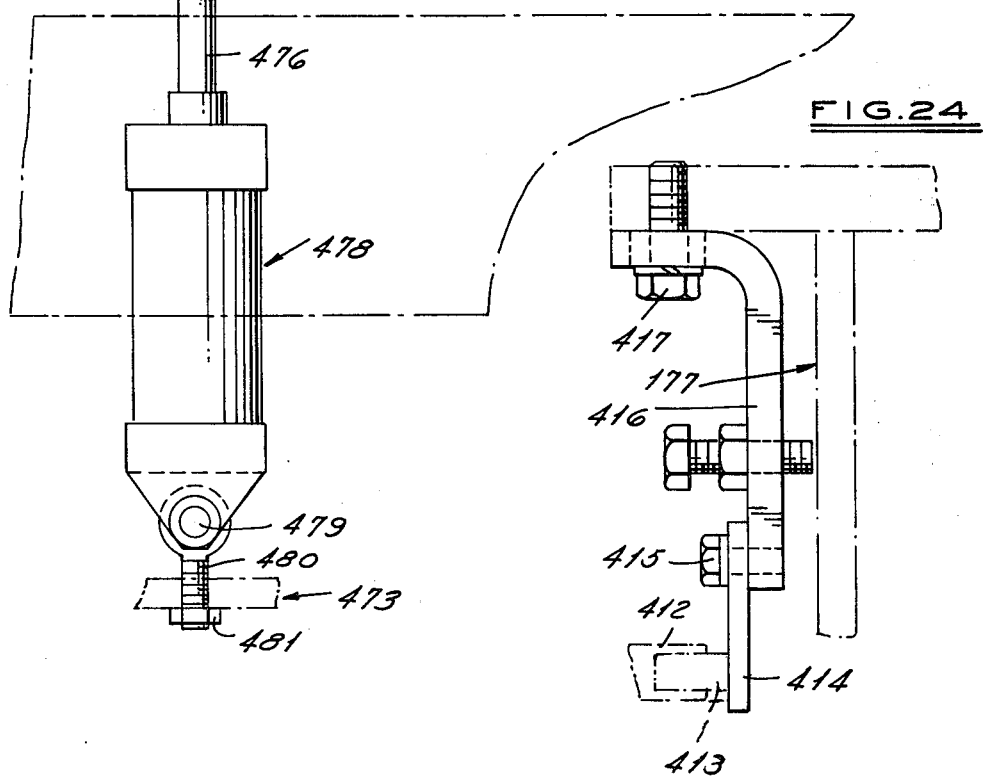

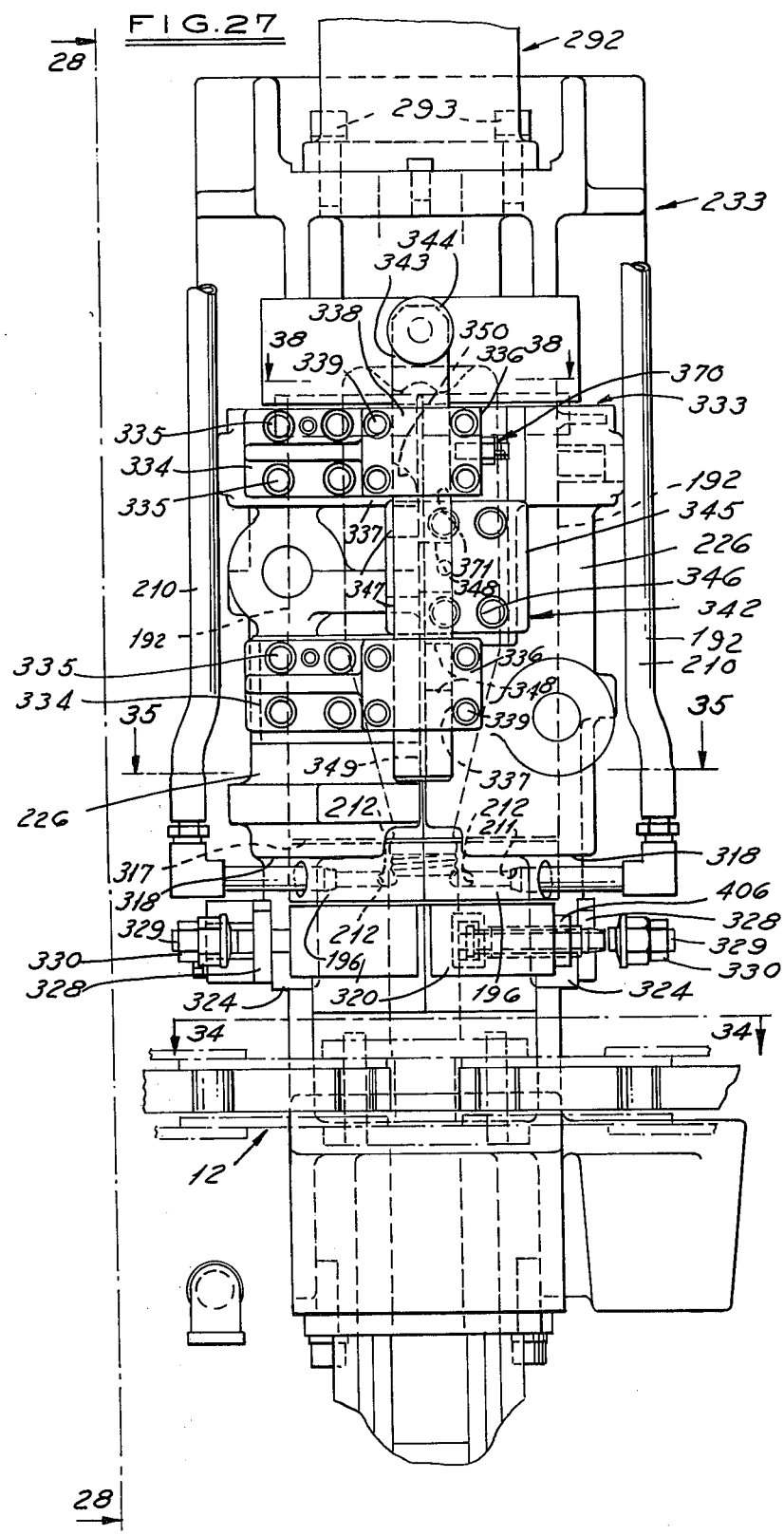

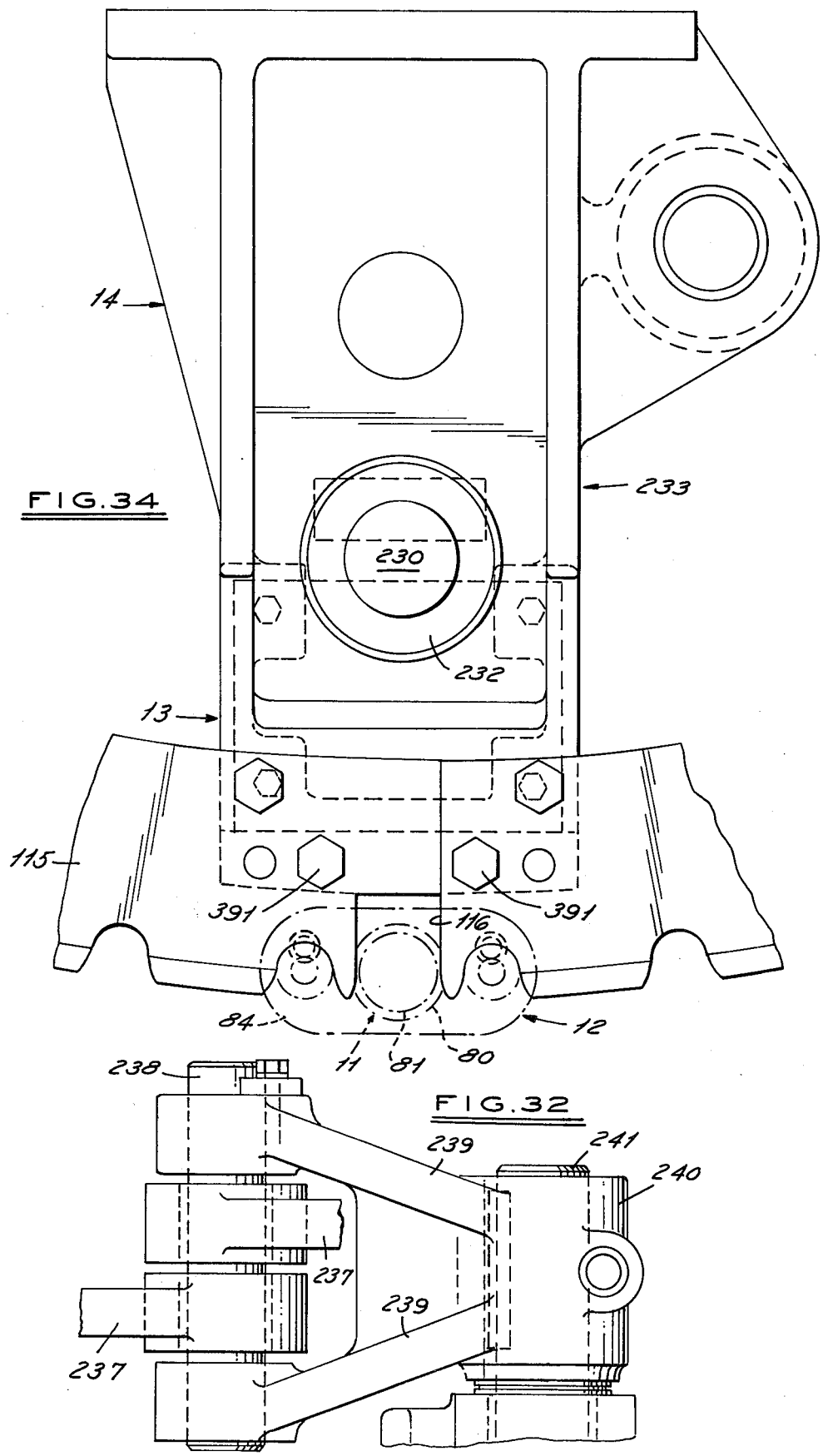

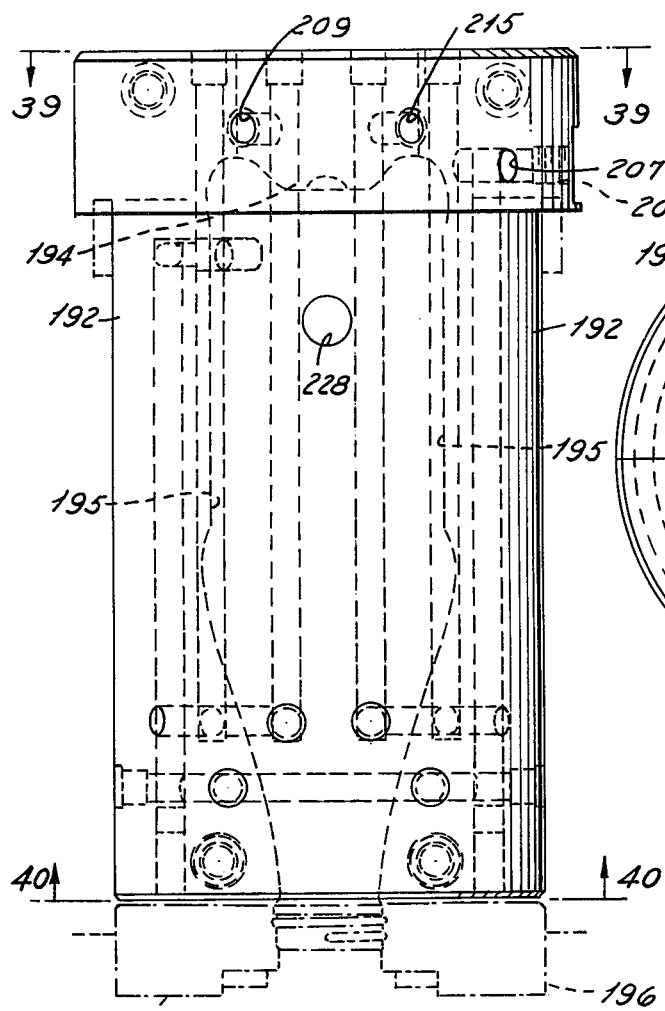
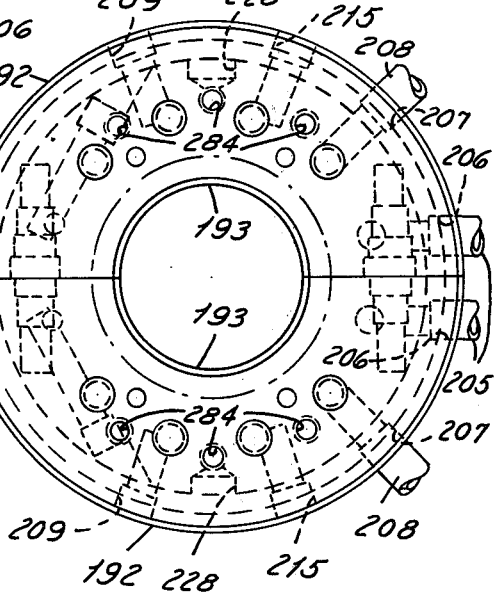
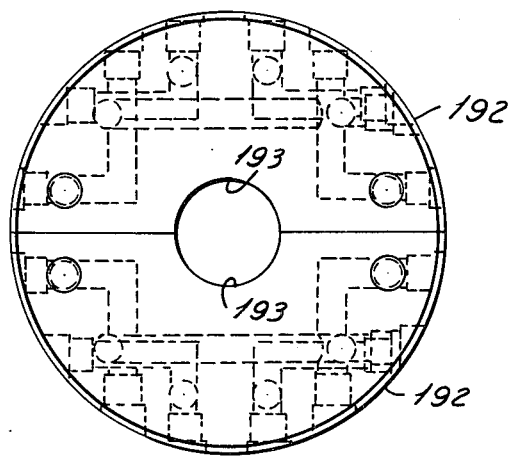

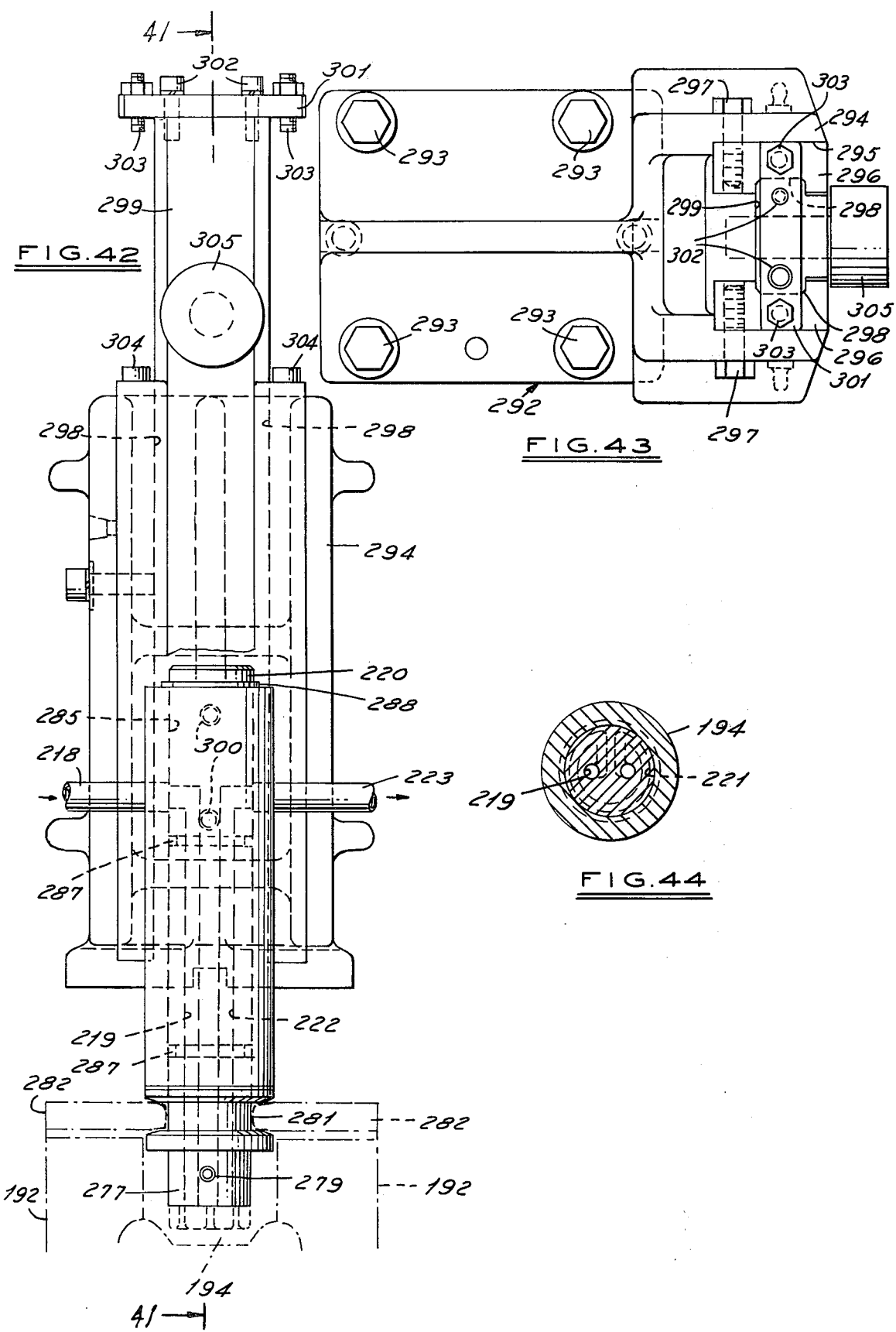

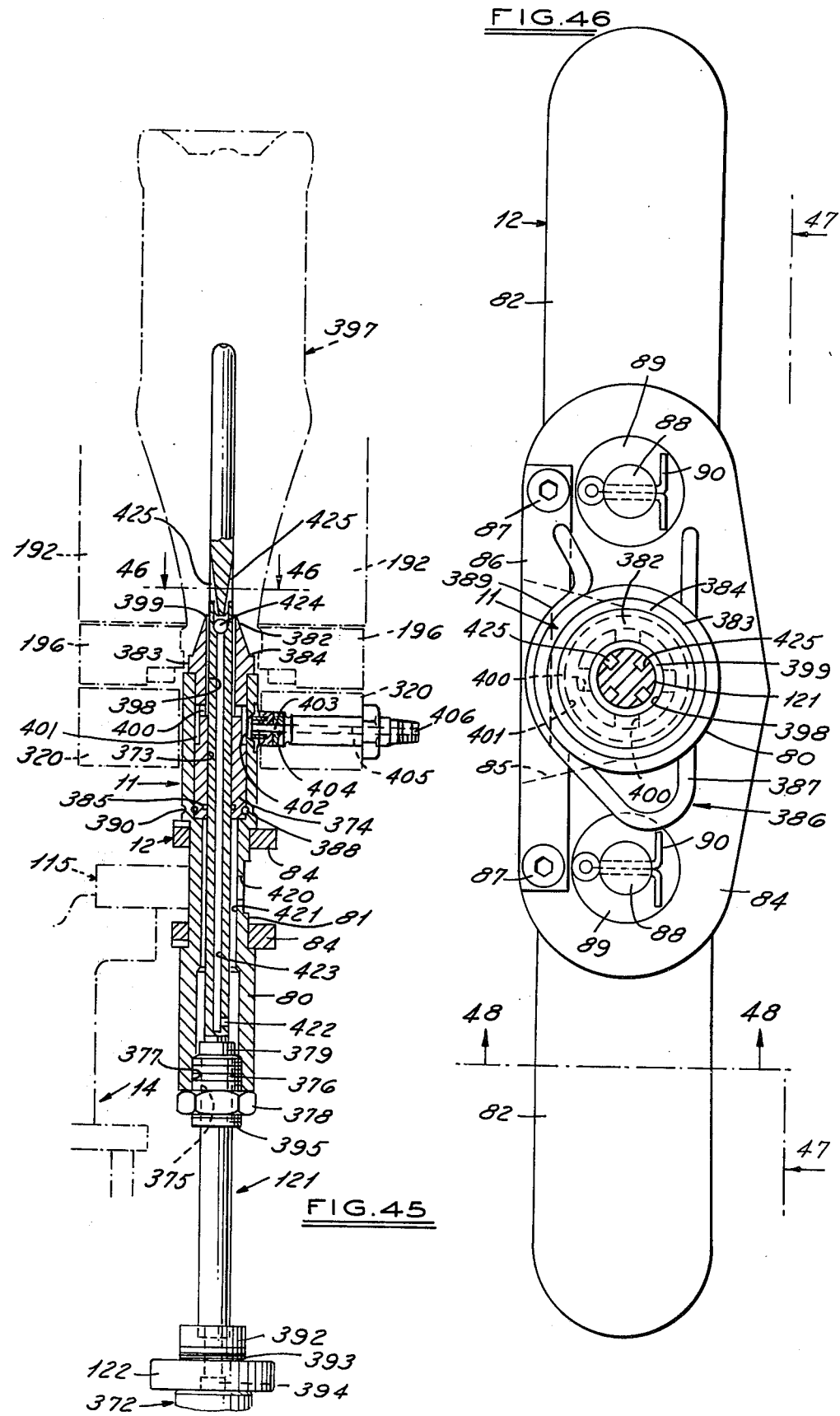

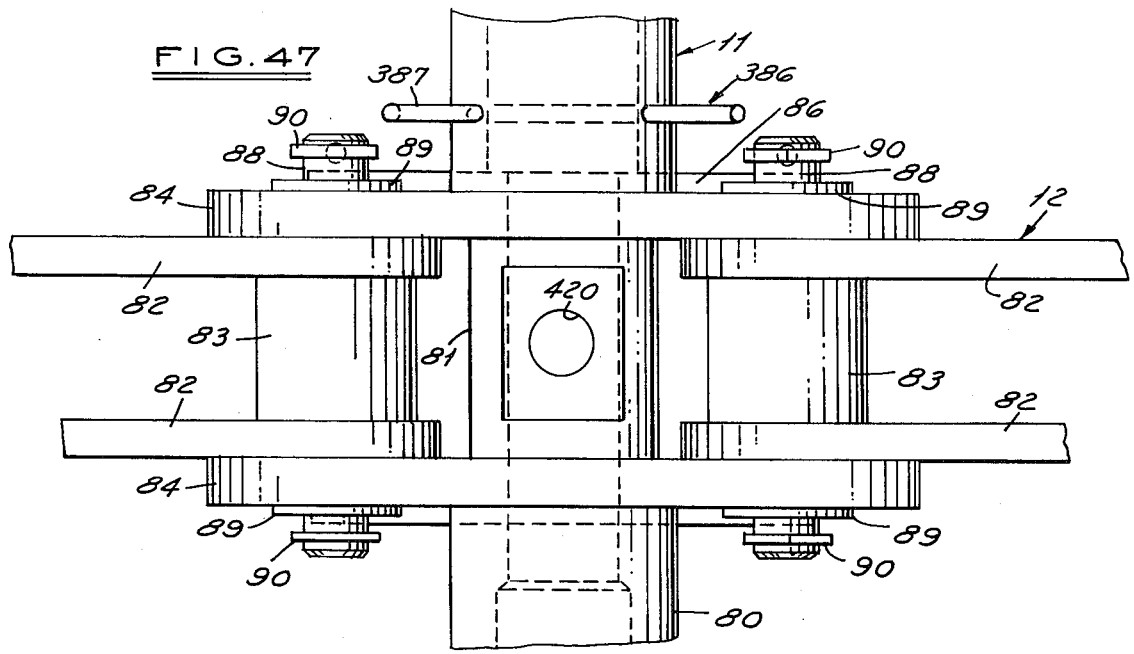
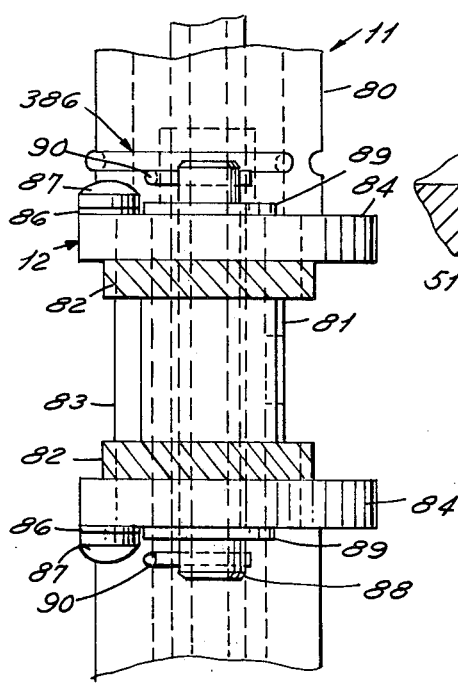
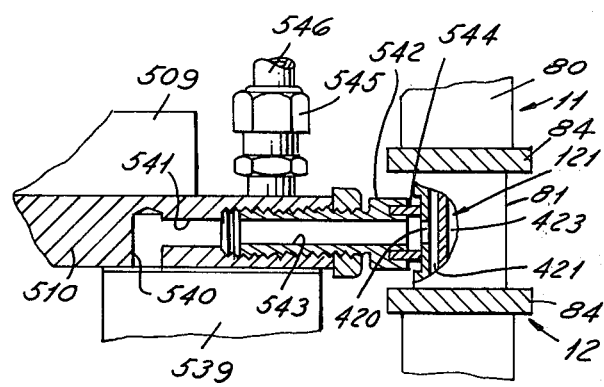

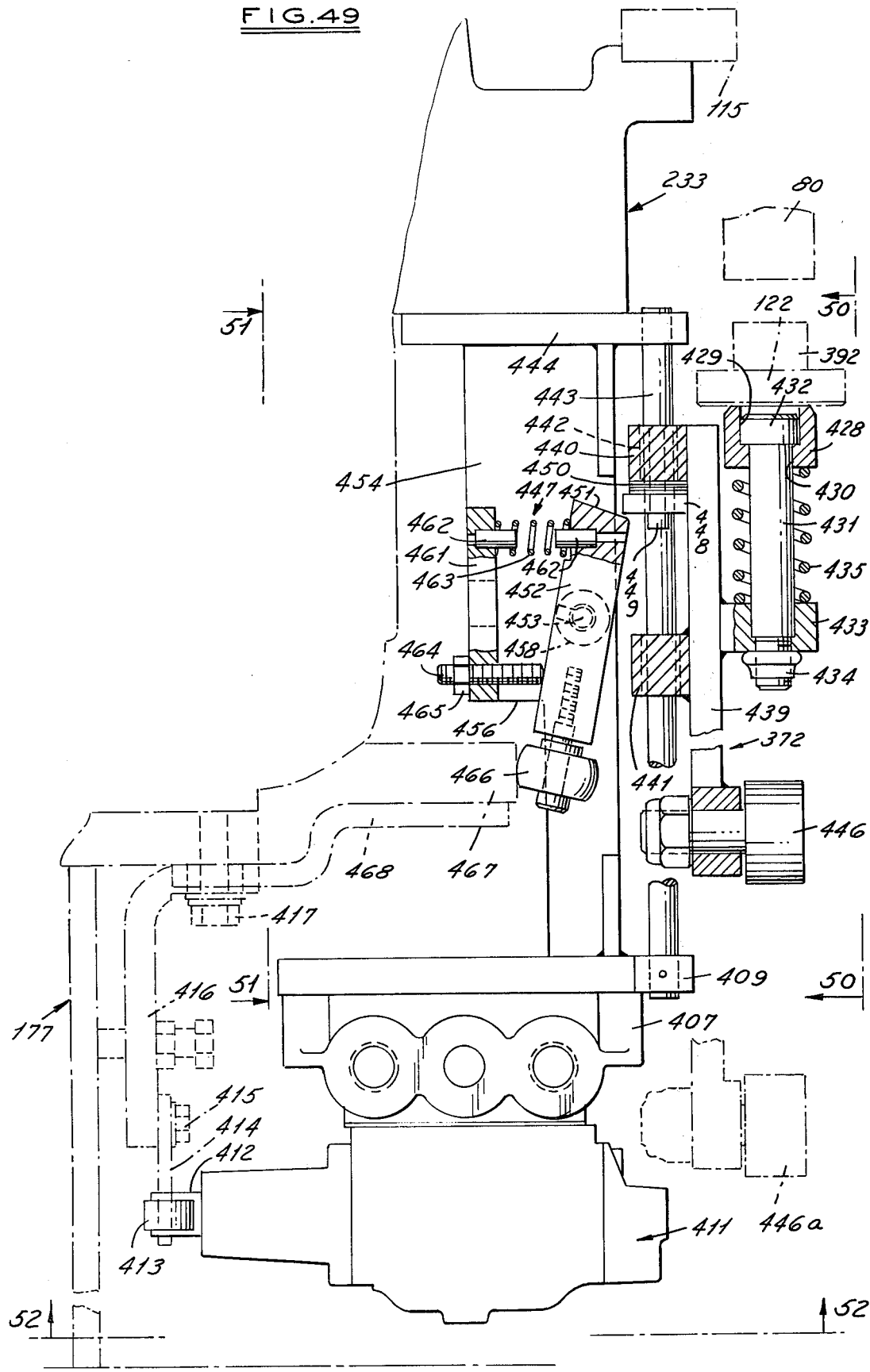

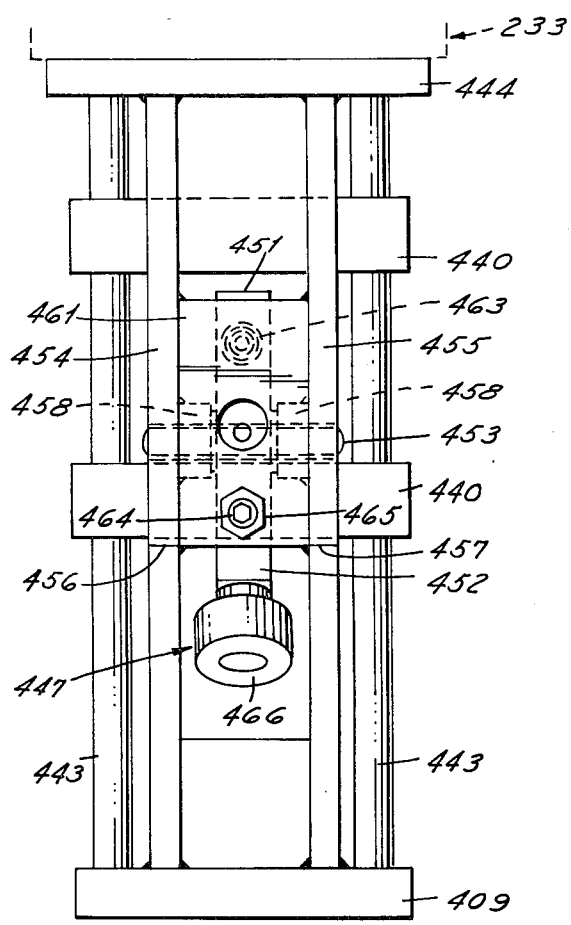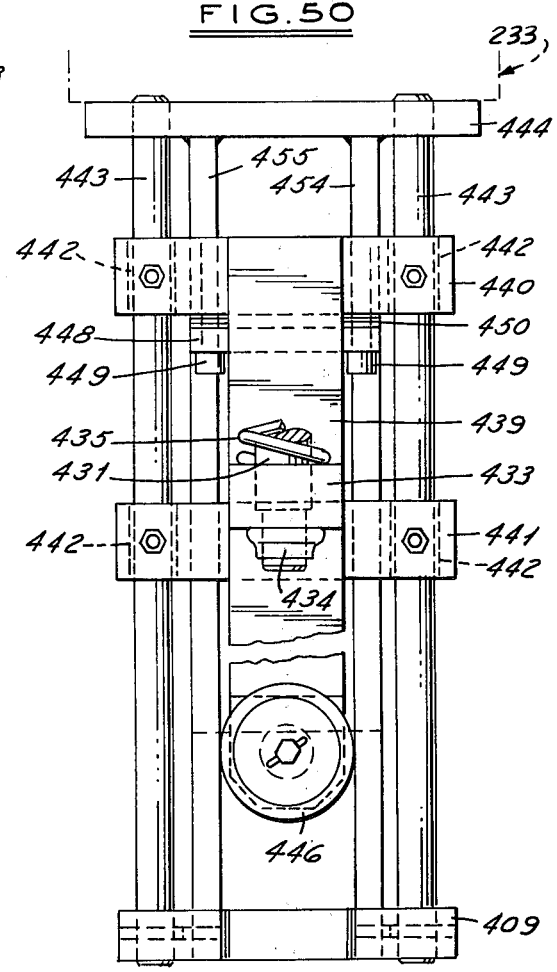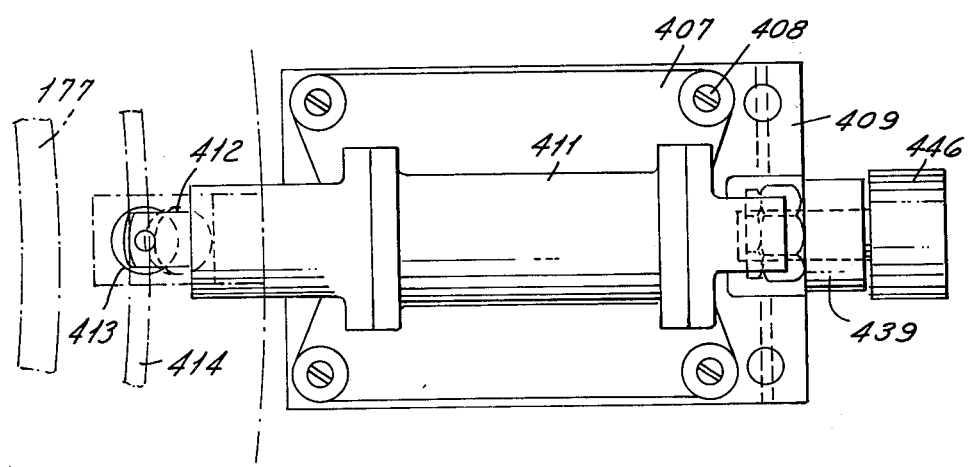

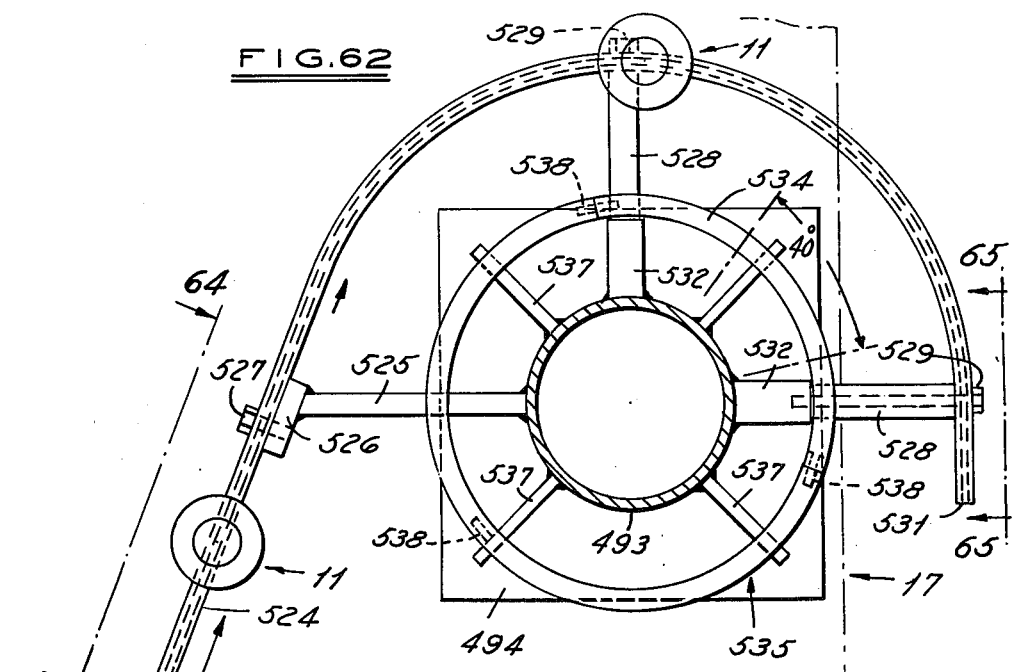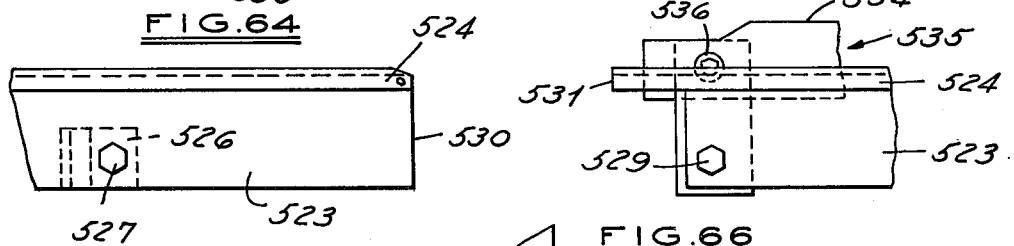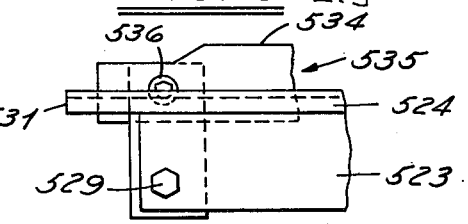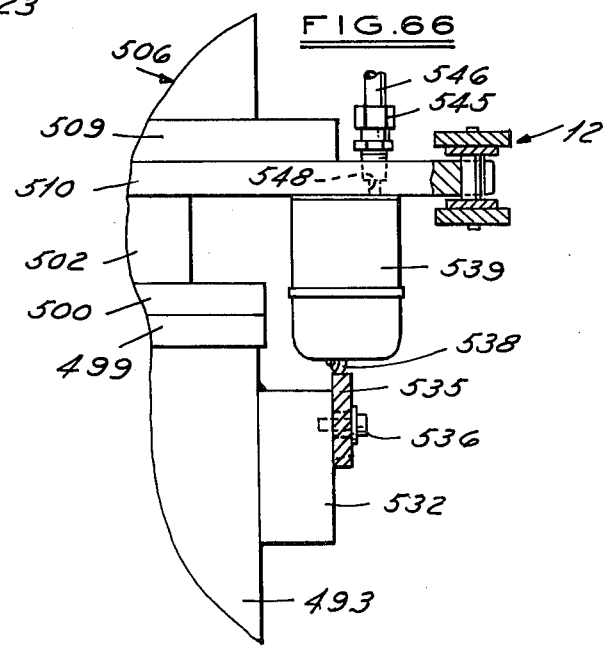

ROTARY STRETCH BLOW MOLDING APPARATUS

SUMMARY OF THE INVENTION

This invention relates to the stretch blow molding art, and more particularly, to a continuous motion stretch blow molding apparatus for blow molding hollow articles from tubular parisons. Heretofore, various types of machines have been proposed for blow molding preformed parisons to form hollow articles. A disadvantage of such prior art blow molding machines is that they include indexing operations which produce very high acceleration and deceleration forces, which require added machine structure at additional costs to overcome such forces. A further disadvantage of said prior art indexing blow molding machines is that they are not capable of high speed fabrication of hollow articles to supply the present day need for low cost production of such articles. Accordingly, in view of the aforegoing, it is an important object of the present invention to provide a novel and improved continuous motion stretch blow molding apparatus which overcomes the aforementioned disadvantages of the prior art blow molding machines.

It is another object of the present invention to provide a novel and improved continuous motion stretch blow molding apparatus which is capable of high speed fabrication of hollow articles at a low cost.

It is still another object of the present invention to provide a novel and improved parison loading multi-station rotary turret for loading parisons onto a moving stretch pin means for subsequent stretching, blowing and cooling operations.

It is a further object of the present invention to provide a novel and improved parison loading apparatus which includes adjustable chute means for sequentially loading parisons onto a plurality of stretch pin assemblies that move at a constant speed.

It is still a further object of the present invention to provide a novel and improved stretch blow molding machine which includes means for moving a parison laterally into a molding station, and means for stretching the parison prior to blowing and before closing the mold so as to prevent cooling of the parison walls before blowing of the parison into a final article.

It is a further object of the present invention to provide a novel and improved continuous motion stretch blow molding apparatus for blow molding hollow articles from tubular parisons including, a continuous motion transfer means, a plurality of stretch pin means operatively carried on said transfer means, a continuous motion rotary parison loading turret for receiving parisons and for sequentially loading them onto said stretch pin means, a continuous motion rotary molding turret having a plurality of molding stations, and said transfer means being operative to locate each of said stretch pin means with a parison loaded thereon in an individual one of said molding stations for a stretching, blowing and cooling operation on each parison on each stretch pin means to form an article from each parison.

It is still a further object of the present invention to provide a novel and improved continuous motion stretch blow molding apparatus which includes an ejection means for automatically ejecting articles formed by the blow molding apparatus.

It is another object of the present invention to provide a novel and improved continuous motion stretch blow molding apparatus which includes a mold having a pair of mold halves, a mold end plug, and two mold neck rings, and means for operating the mold halves, end plug and mold neck rings whereby a parison on a stretch finger may be laterally moved between the mold halves and positioned radially and axially between the mold halves by the mold neck rings before the mold halves are closed, and then subsequently stretching the parison axially, closing the mold halves to close the mold, and then blowing and chilling the parison to form a finished article.

It is still another object to provide a novel and improved continuous motion stretch blow molding apparatus which includes a molding means that is adapted to grip a parison by its neck and locate the parison radially and axially in the molding means, before closing the molding means, stretch the parison without chilling the parison walls, and then subsequently closing the molding means and blowing and chilling the parison to form a finished article.

It is still a further object of the present invention to provide a novel and improved stretch finger assembly for a stretch blow molding apparatus which includes a stretch pin body, a stretch pin axially movable in said body, means for limiting the movement of the stretch pin in said body in the upward and downward directions, and a stretch pin actuator means adapted to raise the stretch finger to a predetermined elevation within a molding apparatus and including spring operated means for releasably locking and supporting the stretch pin in an elevated position by a spring biased latch means.

Other objects, features and advantages of this invention will be apparent from the following detailed description, appended claims, and the accompanying drawings.

BRIEF DESCRIPTION OF THE DRAWINGS

FIG. 3 is an enlarged top plan view of the parison infeed turret illustrated on the right side of FIG. 1.

FIG. 4 is a fragmentary, enlarged, elevational view of the structure illustrated in FIG. 1, taken along the line 4—4 thereof, and looking in the direction of the arrows.

FIG. 5 is a fragmentary, broken, elevational, section view of the structure illustrated in FIG. 3, taken along the line 5—5 thereof, and looking in the direction of the arrows.

FIG. 6 is a fragmentary, elevational, section view of the structure illustrated in FIG. 3, taken along the line 6—6 thereof, and looking in the direction of the arrows.

FIG. 7 is a fragmentary, enlarged, elevational view of the structure illustrated in FIG. 3, taken along the line 7—7 thereof, and looking in the direction of the arrows.

FIG. 8 is a fragmentary, enlarged, elevational view of the structure illustrated in FIG. 6, taken along the line 8—8 thereof, and looking in the direction of the arrows.

FIG. 9 is a fragmentary, enlarged, elevational, section view of the structure illustrated in FIG. 6, taken along the line 9—9 thereof, and looking in the direction of the arrows.

FIG. 10 is a fragmentary, enlarged, plan view of the structure illustrated in FIG. 6, taken along the line

FIG. 15 is a fragmentary, horizontal, section view, with parts broken away and parts removed, of the structure illustrated in FIG. 4, taken along the line 15—15 thereof, and looking in the direction of the arrows.

FIG. 16 is a fragmentary, enlarged, elevational view of the structure illustrated in FIG. 15, taken along the line 16—16 thereof, and looking in the direction of the arrows.

FIG. 18 is a fragmentary, enlarged section view of the structure illustrated in FIG. 15, taken along the line 18—18 thereof, and looking in the direction of the arrows.

FIG. 19 is a fragmentary, enlarged, elevational section view of the structure illustrated in FIG. 15, taken along the line 19—19 thereof, and looking in the direction of the arrows.

FIG. 20 is a fragmentary, enlarged plan view of the structure illustrated in FIG. 17, taken along the line 20—20 thereof, and looking in the direction of the arrows.

FIG. 21 is a fragmentary, enlarged, section view of the structure illustrated in FIG. 2, taken along the line 21—21 thereof, and looking in the direction of the arrows.

FIG. 22 is a fragmentary, enlarged, plan view of the structure illustrated in FIG. 4, taken along the line 22—22 thereof, and looking in the direction of the arrows.

FIG. 23 is a fragmentary, elevational section view of the structure illustrated in FIG. 22, taken along the line 23—23 thereof, and looking in the direction of the arrows.

FIG. 24 is a fragmentary, enlarged, elevational view of the structure illustrated in FIG. 22, taken along the line 24—24 thereof, and looking in the direction of the arrows.

FIG. 25 is a fragmentary, elevational view of the structure illustrated in FIG. 22, taken along the line 25—25 thereof, and looking in the direction of the arrows.

FIG. 26 is a fragmentary view of the structure illustrated in FIG. 22, taken in the direction of the arrow 26.

FIG. 27 is a fragmentary, enlarged, elevational view of the structure illustrated in FIG. 2, taken along the line 27—27 thereof, and looking in the direction of the arrows.

FIG. 32 is a fragmentary, elevational view of the structure illustrated in FIG. 31, taken along the line 32—32 thereof, and looking in the direction of the arrows.

FIG. 34 is a fragmentary, enlarged, horizontal view of the structure illustrated in FIG. 27, taken along the line 34—34 thereof, and looking in the direction of the arrows.

FIG. 38 is a side elevational view of a mold used in carrying out the principles of the present invention.

FIG. 39 is a top plan view of the mold structure illustrated in FIG. 38, taken along the line 39—39 thereof, and looking in the direction of the arrows.

FIG. 40 is a bottom plan view of the mold structure illustrated in FIG. 38, taken along the line 40—40 thereof, and looking in the direction of the arrows.

FIG. 42 is an elevational view of the structure illustrated in FIG. 4, taken along the line 42—42 thereof, and looking in the direction of the arrows.

FIG. 43 is a top plan view of the structure illustrated in FIG. 41, taken along the line 43—43 thereof, and looking in the direction of the arrows.

FIG. 44 is a horizontal section view of the structure illustrated in FIG. 41, taken along the line 44—44 thereof, and looking in the direction of the arrows.

FIG. 45 is a fragmentary, enlarged, elevational section view of the structure illustrated in FIG. 14, taken along the line 45—45 thereof, and looking in the direction of the arrows.

FIG. 46 is an enlarged, horizontal section view of the structure illustrated in FIG. 45, taken along the line 46—46 thereof, and looking in the direction of the arrows.

FIG. 47 is a fragmentary, right side elevational view of the structure illustrated in FIG. 46, taken along the line 47—47 thereof, and looking in the direction of the arrows.

FIG. 48 is a fragmentary, elevational view of the structure illustrated in FIG. 47, taken along the line 48—48 thereof, and looking in the direction of the arrows.

FIG. 49 is a fragmentary, enlarged, partly in section view of the structure illustrated in FIG. 13, and taken in the direction of the arrow "49".

FIG. 50 is a fragmentary, right-side elevational view of the structure illustrated in FIG. 49, taken along the line 50—50 thereof, and looking in the direction of the arrows.

FIG. 51 is a fragmentary, left-side elevational view of the structure illustrated in FIG. 49, taken along the line 51—51 thereof, and looking in the direction of the arrows.

FIG. 52 is a fragmentary, bottom plan view of the structure illustrated in FIG. 49, taken along the line 52—52 thereof, and looking in the direction of the arrows.

FIG. 62 is a fragmentary, enlarged, horizontal, section view of the structure illustrated in FIG. 59, taken along the line 62—62 thereof, and looking in the direction of the arrows.

FIG. 63 is a fragmentary, enlarged, section view of the structure shown within the circle marked "FIG. 63" in FIG. 59.

FIG. 64 is a fragmentary, elevational view of the structure illustrated in FIG. 62, taken along the line 64—64 thereof, and looking in the direction of the arrows.

FIG. 65 is a fragmentary, elevational view of the structure illustrated in FIG. 62, taken along the line 65—65 thereof, and looking in the direction of the arrows.

FIG. 66 is a fragmentary, enlarged, elevational section view of the structure illustrated in FIG. 60, taken along the line 66—66 thereof, and looking in the direction of the arrows.

DESCRIPTION OF THE PREFERRED EMBODIMENT

The blow molding apparatus of the present invention is constructed and arranged to provide continuous, high speed fabrication of hollow thermoplastic articles, as bottles and the like. Heated tubular parisons or preforms are loaded at a rotary loading turret on stretch pin assemblies which are carried on a constant speed transfer means that conveys the stretch pin assemblies, in a predetermined sequence, into operative positions within molding stations on a multi-station blow molding rotary turret. The parisons are stretched longitudinally, blown to the final form of an article, cooled, and thereafter ejected, all in a continuous operation.

General Machine Description

Figure 1:
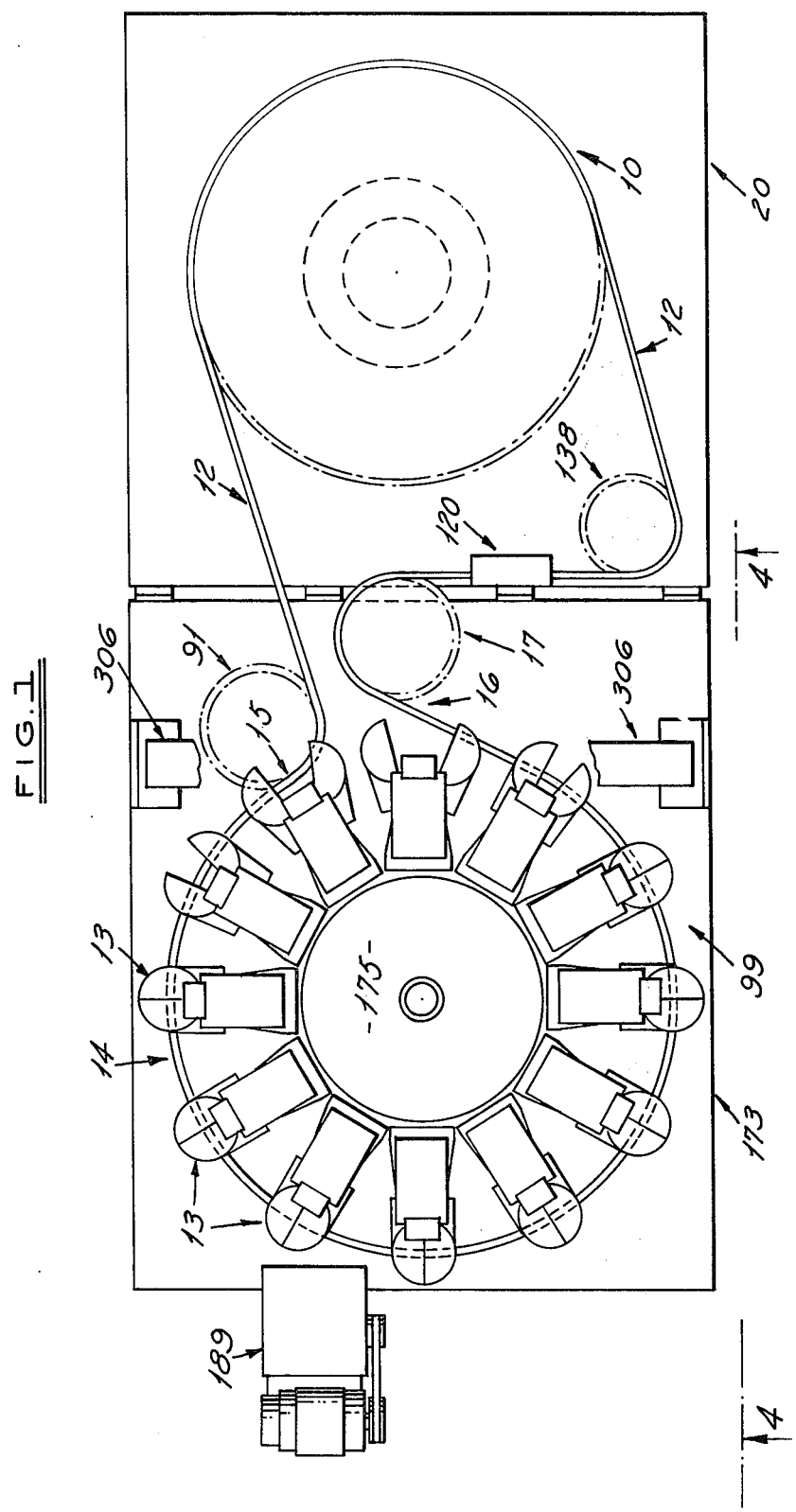
FIG. 1 is a schematic top plan view of a rotary stretch blow molding apparatus made in accordance with the principles of the present invention.

Referring now to the drawings, and in particular to FIG. 1 which is a top plan view of a continuously operating machine made in accordance with the principles of the present invention, the numeral 10 generally designates a multi-station parison loading turret which receives heat tubular parisons and loads them in a predetermined sequence onto upwardly disposed individual stretch pin assemblies of the type generally indicated by the numeral 11 in FIG. 4. The stretch pin assemblies 11 are operatively mounted on a constant speed transfer means, generally indicated by the numeral 12, and which comprises a continuous standard pitch roller chain. The tubular parisons are located longitudinally and transversely on the stretch pin assemblies 11. The transfer means 12 conveys the stretch pin assemblies 11 at a constant speed into operative positions within individual molding stations 13 on a multi-station blow molding rotary turret, generally indicated by the numeral 14 in FIGS. 1, 2 and 4. The rotary turret 14 rotates at constant speed and moves the stretch pin assemblies 11 between a loading position 15 and an unloading position 16, as shown in FIG. 1. The parisons are stretched longitudinally, blown to the final form of an article, as a bottle, and cooled, between the load and unload positions 15 and 16, respectively. The transfer means 12 conveys each of the stretch pin assemblies 11 with its formed article from its respective molding station 13 at the unloading position 16 and thence around an article ejection means, generally indicated by the numeral 17 in FIGS. 1 and 4.

The apparatus of the present invention is applicable for the formation of hollow thermoplastic articles, such as bottles and other containers. Any suitable thermoplastic resin can be used in forming the parisons. Examples of a suitable resin would include polymers and copolymers of polypropylene. The resin may be extruded or molded into the parisons or preforms, and cooled to a temperature below their crystalline freezing point. The parisons are then heated in a suitable oven to a plastic stage or orientation temperature and conveyed by suitable means to the aforedescribed parison loading rotary turret 10.

The apparatuses for forming the parisons, and for heating and conveying the parisons to the loading rotary turret 10, do not form any part of this invention, and any suitable such apparatuses may be employed.

Parison Loading Rotary Turret

As shown in FIGS. 3, 5 and 6, the parison loading rotary turret 10 is operatively mounted on a suitable base, generally indicated by the numeral 20, which comprises four side channel members 21, a pair of intermediate transverse channels 22 extended in one direction and an intermediate transverse channel 23 extended perpendicular to the channel members 22. The base 20 further includes a fixed plate 24 operatively carried by the aforementioned channel members. The base 20 is supported by four ground-engaging legs indicated by the numeral 25.

As shown in FIG. 5, the parison loading rotary turret 10 includes a tubular fixed column 26 which is fixedly mounted in a central position on the base 20 by any suitable means, as by bolting. As shown in FIG. 5, a circular flange 27 is fixedly mounted on the column 26 by any suitable means, as by welding, at a position spaced downwardly from the upper end of the column. The flange 27 operatively supports a circular bearing means 28 on which is rotatably supported a horizontal, radially extended upper circular carrier plate 29 which forms a part of a rotary carrier member, generally indicated by the numeral 30. A second circular flange 31 is fixed on the column 26 at a point spaced apart downwardly from the flange 27, and it operatively supports a second circular bearing means 32. A lower circular carrier plate 33 is rotatably supported on the bearing means 32, and it is fixedly joined to the upper carrier plate 29 by a cylindrical support member 34. The carrier plates 29 and 33 are further interconnected by a plurality of circumferentially disposed vertical support arms 35.

As shown in FIGS. 3, 5 and 6, a circular sprocket 38 is fixedly mounted by suitable machine screws 39 on the lower carrier plate 33. The sprocket 38 is operatively engaged for a distance of about 180°, around the periphery thereof, by the chain of the transfer means 12. The constant speed of the transfer means 12 is thus imparted to the rotary carrier 30 and it moves with the transfer means 12.

As shown in FIG. 3, the parison loading rotary turret 10 includes ten loading stations, each of which is provided with a loading chute generally indicated by the numeral 40. Each of the parison loading chutes 40 is adjustably mounted on the carrier member 30. As shown in FIG. 5, the side view of a loading chute 40 shows the chute to be substantially gun holster shaped, with the leading edge 41 being arcuately formed in the shape of a parabola. As shown in FIG. 5, the upper end 42 of each parison loading chute 40 is open and the lower end 43 is open. A support arm 44 is fixedly secured to the lower end of each of the loadinng chutes 40, as shown in FIG. 5. Each support arm 44 is pivotally attached by means of a suitable machine screw 45 to the lower end of a vertical support bar 46 which is secured by a pair of machine screws 47 to the outer end of a horizontal support arm 48. As best seen in FIG. 3, each of the support arms 48 is fixedly secured by a pair of machine screws 49 to the upper side of the upper carrier plate 29.

As shown in FIG. 5, an adjustment bracket 51 is fixedly secured, as by welding, to the upper inner side of each of the chutes 40. Each of the brackets 51 is provided with a horizontal slot 52 through which is passed a suitable bolt and nut means 53 for adjustably securing the bracket 51 to the upper end of the vertical support bar 46. It will be seen that the bolt and nut means 53 and the screw means 45 can be loosened so as to permit adjustment of each chute 40 radially inward or outward to a desired adjusted position, as indicated by the broken line position designated by the numeral 54 in FIG. 5. As shown in FIGS. 3 and 5, a spacer plate 55 is operatively mounted between each of the chutes 40, adjacent the upper ends thereof. The spacer plates 55 are fixedly secured by suitable bolts 56 to the upper ends of the support bars 46.

As shown in FIGS. 3, 5 and 6, the parison loading rotary turret 10 is provided with an outer fixed shroud, generally indicated by the numeral 57. As shown in FIG. 5, the fixed shroud 57 includes an outer cylindrical, vertical wall 58 which has integrally formed on the upper end thereof a horizontal and inwardly extended circular wall 59. The shroud upper wall 59 is secured to the column 26 by a plurality of horizontal support arms 60 which have their inner ends connected by suitable machine screws 61 to the upper end of the column 26, and their outer ends connected by suitable machine screws 62 to the shroud upper wall 59. The fixed shroud 57 includes a lower horizontal circular wall 63, as shown in FIG. 5, which extends inwardly from the lower end of the wall 58 to a point adjacent the path of the stretch pin means 11 as they pass around the rotary carrier member 30. The fixed shroud 57 is fixedly supported by a plurality of support posts 64 which have their lower ends suitably fixed to the base plate 24 by any suitable means. As shown in FIG. 5, the shroud vertical wall 58 is provided with an entrance opening 65 for the passage therethrough of the stretch pin means 11 as they are conveyed into the shroud 57 by the transfer means 12.

As shown in FIGS. 3, 6 and 7, the fixed shroud 57 has fixedly connected thereto an exit tunnel, generally indicated by the numeral 66, out through which pass the stretch pin means 11 after they have been loaded with a parison. The tunnel 66 is supported by suitable support posts 67 which have their lower ends mounted on the base plate 24. As shown in FIG. 7, the outer end of the tunnel 66 is provided with an end wall 68 that has an exit opening 69 through which passes the upper ends of the stretch pin means 11. As shown in FIG. 7, each of the stretch pin means 11 exits from the parison loading rotary turret 10 with an inverted parison, generally indicated by the numeral 70, mounted on the upper end thereof. The parisons 70 are substantially test tube shaped and they have formed around the open end thereof a thread indicated by the numeral 71.

As shown in FIG. 5, the rotary carrier member 30 supports a moving heat shield, generally indicated by the numeral 74, which is secured by suitable machine screws 75 at its lower end to the lower carrier plate 33. The heat shroud 74 is also secured by a plurality of suitable retainer brackets 76 secured to the support arms 48. The shrouds 58 and 74 function to prevent heat loss from the parisons 70 to the surrounding atmosphere as the parisons are conveyed through the loading rotary turret 10 and into a mold station 13 on the molding turret 14.

As shown in FIG. 3, a parison loading opening 77 is formed through the upper end wall 59 of the fixed shroud 58 to form a parison loading position. The heated parisons 70 may be dropped through the loading opening 77 by any suitable means, as for example a plurality of parisons, as five at a time, may be carried by a horizontal pallet and then sequentially dropped, one at a time, in an inverted position through the opening 77 and into one of the chutes 40 as it is timed to pass below the opening 77, in sequence with the dropping of the parison. The opening 77 is formed in a straight line to permit the sequential dropping of parisons 70 from a straight line pallet. The chutes 40 are adjusted so that they are timed to receive a parison 70 at a predetermined position, as marked by the numerals 3 through 8 in FIG. 3 within the opening 77. The opening 77 and the chutes 40 are constructed and arranged so as to be able to receive parisons 70 dropped at a number of points along a straight line, as for example ten parison drop points. The parisons 70 are dropped through the opening 77 in a predetermined sequence so that they fall into the high end of the parabola shaped end 41 of each of the chutes 40. The parison 70 then falls down the face of the parabola shaped wall 41 and strikes the vertical back wall portion of the chute 40, and then it is captured in the lower narrow neck of the lower funnel shaped end of the chute, and it passes through the lower open end 43 and onto a stretch pin means 11 which is timed to be disposed under the open end 41 of each chute 40 at the parison drop time.

Stretch Pin Transfer Means

The stretch pin transfer means includes the continuous standard pitch roller chain 12 which passes around the parison loading turret 10, and the molding turret 14, and around the ejection means 17. The chain 12 is driven at a constant speed which is commensurate with the machine speed.

As shown in FIG. 45, each of the stretch pin means or assemblies 11 includes a cylindrical body 80 which is provided with a reduced annular recess or reduced diameter portion 81 intermediate the ends thereof. As shown in FIGS. 47 and 48, the transfer chain 12 includes upper and lower plates 82 which are spaced apart by tubular spacer members or bushings 83. The stretch pin assemblies 11 are releasably carried by the transfer chain by means of a pair of chain attachment plates 84. As shown in FIG. 46, each of the plates 84 is provided with a hole therethrough for reception of the stretch pin body portion 81, and a diverging, outward opening 85 so as to permit mounting of the pair of plates 84 around said body portion 81. Each chain attachment plate 84 is then secured to a stretch pin assembly body 80 by a retainer plate 86 that is disposed over the entrance opening 85 and secured in place by a pair of suitable machine screws 87.

As shown in FIGS. 46, 47 and 48, the chain plates 82 and 84 are hingedly secured together by suitable hinge pins 88 which pass through the ends of the plates 82 and 84 and through the spacer members 83. The hinge pins 88 are secured in place by suitable washers 89 and cotter keys 90.

Figure 2:
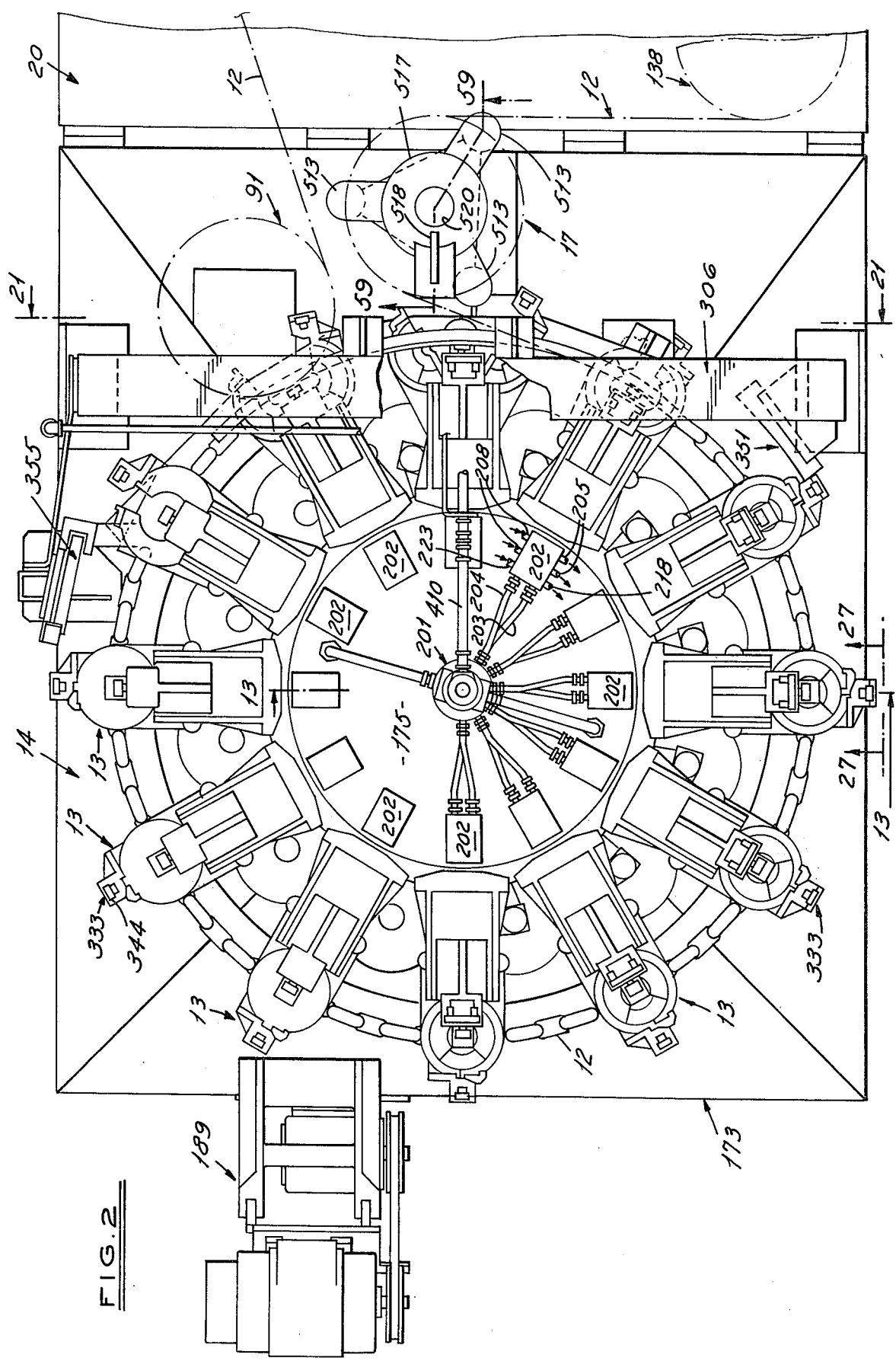
FIG. 2 is an enlarged top plan view of the main turret illustrated on the left side of FIG. 1 that carries the parison stretching, blowing and chilling apparatus, and eject apparatus.
Figure 17:
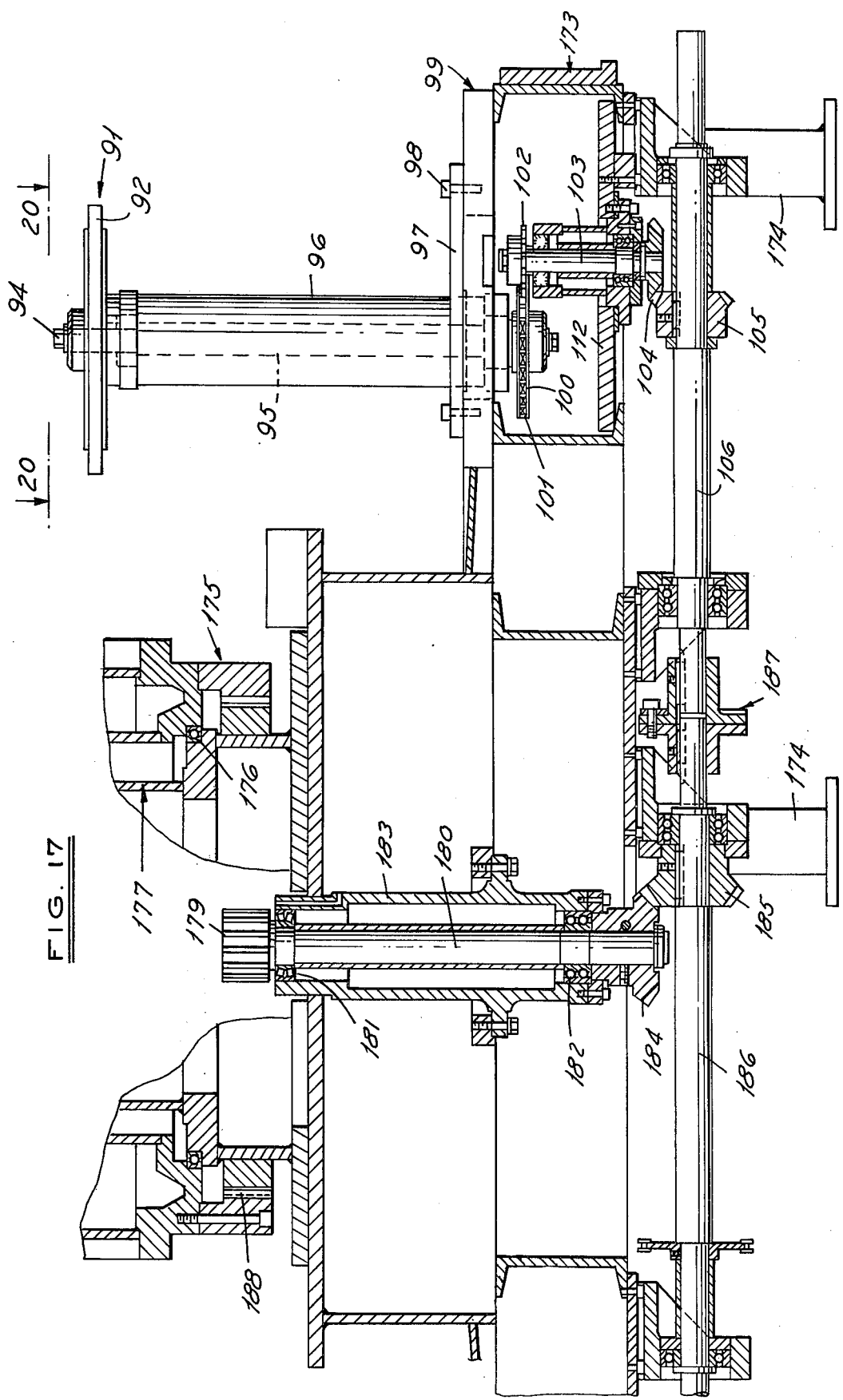
FIG. 17 is a fragmentary, enlarged, elevational section view of the structure illustrated in FIG. 15, taken along the line 17—17 thereof, and looking in the direction of the arrows.

As shown in FIGS. 1 and 2, the transfer means chain 12 leaves the parison loading rotary turret 10, and then passes to the left and around an input idler means, generally indicated by the numeral 91, which guides the chain 12 so as to bring it in tangent to the molding turret 14, and to properly insert each of the stretch pin assemblies 11 into its respective mold assembly 13. The idler means 91 does not have any teeth thereon, but it simply supports the rollers or spacers 83 of the chain 12 as it passes therearound. As shown in FIGS. 17 and 20, the idler means 91 includes a circular member or wheel 92 which is similar to a sprocket, but without teeth. As shown in FIG. 20, the wheel 92 has three evenly, peripherally spaced notches 93 for the reception of stretch pin assembly bodies 80 as they pass around the idler wheel 92. The idler wheel 92 is fixedly secured by a suitable machine screw 94 to the upper end of a vertical shaft 95. As shown in FIG. 20, a lock pin 96 is also employed for retaining the idler wheel 92 on the shaft 95. As shown in FIG. 17, the shaft 95 is suitably journaled in a vertical column 96 which is fixedly supported on a mounting plate 97. The plate 97 is fixedly secured, as by machine screws 98, to the molding rotary turret base, generally indicated by the numeral 99.

As shown in FIG. 17, the shaft 95 is provided on the lower end thereof with a sprocket 100 that is driven by a drive chain 101. The drive chain 101 is operatively mounted around and driven by a sprocket 102 which is fixed on the upper end of a drive shaft 103. The shaft 103 is rotatably mounted by any suitable means in the turret housing 99, and it has fixedly mounted on the lower end thereof a driven bevel gear 104. The gear 104 is meshed with and driven by a bevel gear 105 which is fixed on and carried by the machine main drive shaft 106.

As shown in FIGS. 15 and 19, the chain 101 is provided with a chain tightener that includes a sprocket 107 that engages the chain 101. As shown in FIG. 19 the sprocket 107 is rotatably mounted on a shaft 108 that is carried on an adjustably mounted crank 109. The crank 109 is secured in an adjusted position by suitable machine screws 110 on a mounting block 111. The block 111 is fixedly secured to a plate 112 mounted in the molding turret housing 99. The plate 112 also carries the housing for the shaft 103.

As shown in FIG. 2, the chain 12 passes around the idler input means 91 and thence around the molding rotary turret 14. The idler means 91 times the chain 12 so as to bring the stretch pin assemblies 11 into operative engagement with a molding turret circular sprocket, generally indicated by the numeral 115 in FIGS. 14 and 34. As shown in FIG. 34, the turret sprocket 115 is provided with a suitable notch 116, at each of the molding stations 13, for locating and for reception of a stretch pin assembly 11.

As shown in FIG. 2, the transfer means chain 12 passes around the molding rotary turret 14 and then carries the stretch pin assemblies 11 off of the molding rotary turret 14 and tengentially onto and around the rotary ejector means 17, which will be described in detail hereinafter.

As shown in FIG. 1, the transfer chain 12 carries the stretch pin assemblies 11 from the ejection means 17 into operative engagement with a cam means 120 for camming the stretch pin 121 downwardly to an initial parison receiving position. As shown in FIG. 45, the stretch pin 121 is slidably mounted in the stretch pin assembly body 80 and it carries on its lower end a circular block 122.

As shown in FIG. 6, each of the stretch pin assemblies 11 is carried by the chain 12 through the cam means 120 which engages the circular block 122 and moves said block and the stretch pin 121 downwardly, from the dotted line position shown in FIG. 6 to the solid line position shown in FIG. 6.

The stretch pin cam means 120 is shown in detail in FIGS. 8, 9 and 10. As best seen in FIGS. 9 and 10, the stretch pin cam means 120 comprises an upper pair of spaced apart, elongated parallel rails 123 which are fixedly mounted at their entrance or forward ends on a U-shaped bracket 124, and at their exit or rear ends on a U-shaped bracket 125. A lower parallel rail 126 is disposed downwardly from the upper rails 123 and in a central position therebetween. The lower rail 126 is also fixedly mounted on the channel-shaped brackets 124 and 125. The forward end of the lower rail 126 is fixedly secured, as by welding, to a journal member 127, as shown in FIGS. 8 and 10. The journal member 127 is rotatably mounted on a suitable shaft 128 which is supported between the upper bifurcated end 129 of a vertical support plate 130. As shown in FIGS. 8 and 10, the support plate 130 is fixed, as by welding, to a plate 131 which is fixed by suitable machine screws 132 to the top plate 24 of the parison loading rotary turret 10.

As shown in FIG. 9, a pair of weight blocks 133 are secured by suitable machine screws 134 to the outer face of the U-shaped bracket 125 at the discharge end of the rails 123 and 126, so as to normally bias the cam means 120 into engagement with a stop member 135 which is positioned on the parison loading rotary turret plate 24. The pivotal mounting of the cam means 120 permits the cam means to swing upwardly, in a counter-clockwise direction as viewed in FIG. 6, to relieve pressure on the stretch pin block 122, indicating a jam condition if a parison is stuck on the stretch pin. The weights 133 are effective to return the cam means 120 to the operative position to move the stretch pin block 122 downward to move the stretch pin to the desired level.

Figure 11:
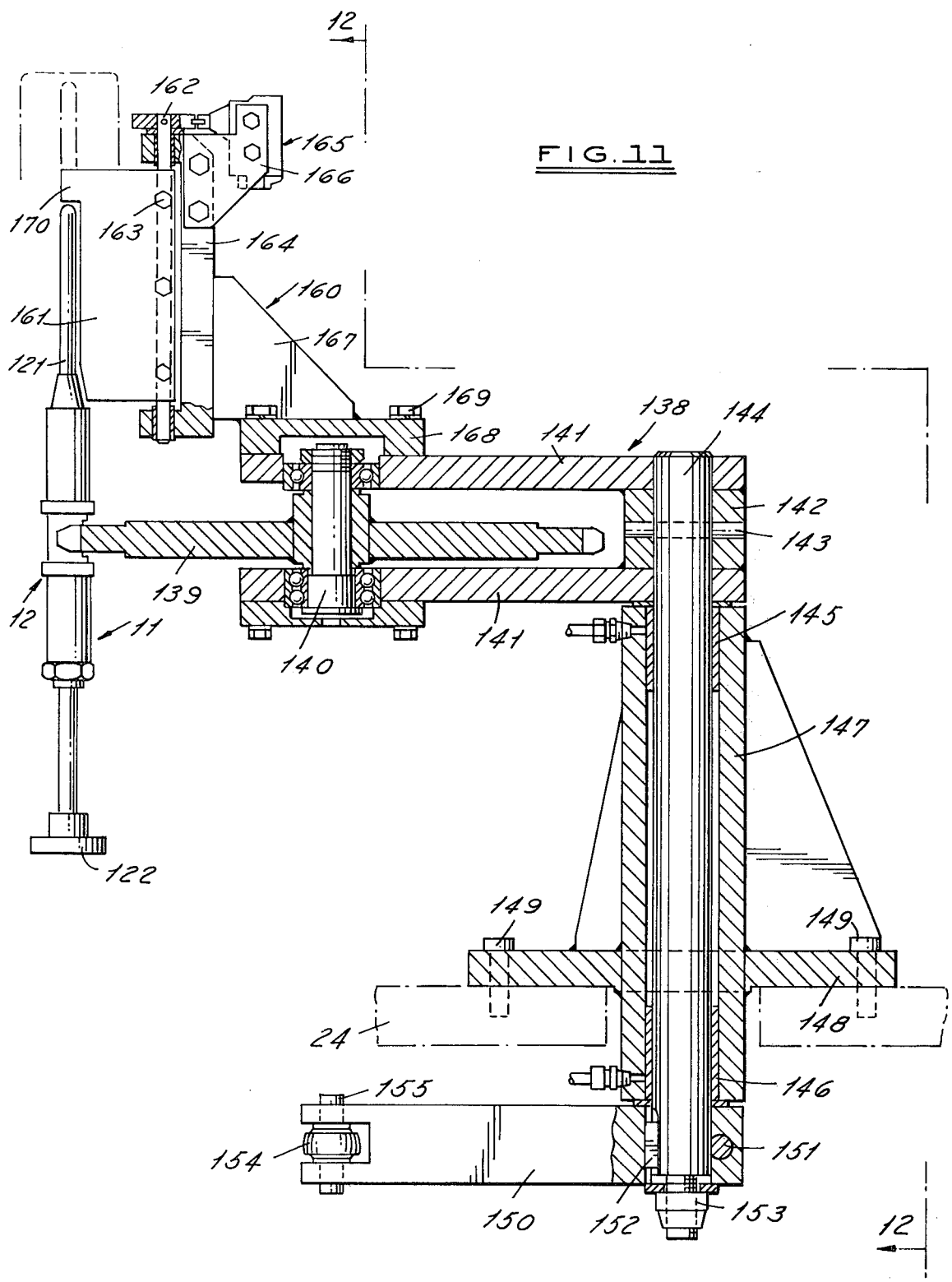
FIG. 11 is a fragmentary, enlarged, elevational section view of the structure illustrated in FIG. 3, taken along the line 11—11 thereof and looking in the direction of the arrows.

As shown in FIGS. 1 and 3, the numeral 138 generally indicates a transfer chain take-up means for maintaining the chain 12 at the proper tightness, without slack. As shown in FIGS. 5 and 11 the chain take-up means 138 includes a freely rotatable sprocket 139 around which the chain 12 passes. The sprocket 139 is rotatably mounted on a shaft 140 which is rotatably carried between two horizontally disposed support arms 141. The support arms 141 are fixed, as by welding, at their rear ends to an intermediate mounting block 142. The arms 141 and the block 142 are fixed by a retainer pin 143 to the upper end of a pivotally mounted vertical shaft 144. The shaft 144 is pivotally mounted by a pair of bushings 145 and 146 in a vertical tubular housing 147. As shown in FIG. 11, the tubular housing 147 is fixedly mounted on a plate 148, as by welding. The plate 148 is secured by suitable machine screws 149 to the base plate 24 of the loading rotary turret 10.

Figure 12:
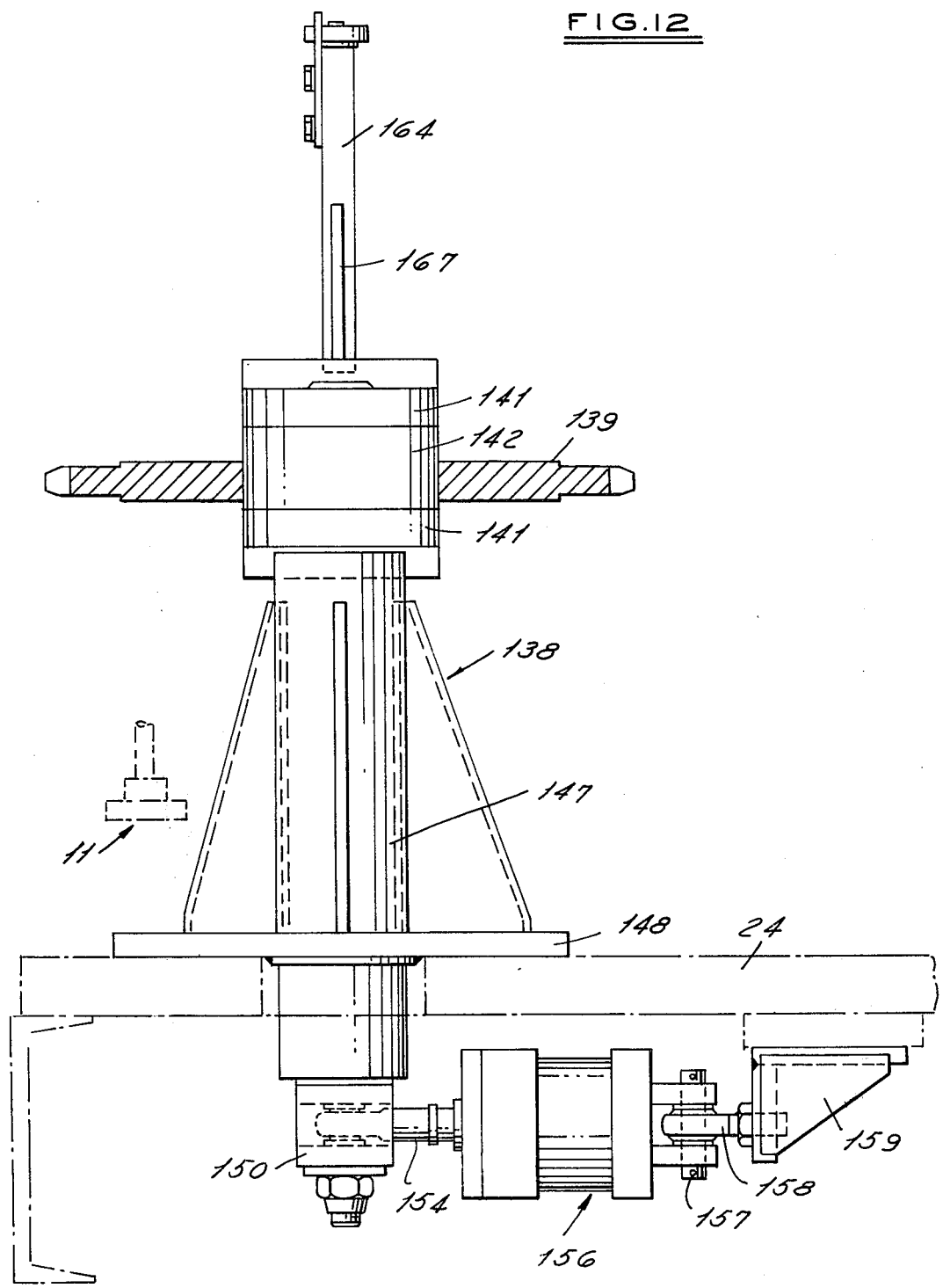
FIG. 12 is a fragmentary, elevational view of the structure illustrated in FIG. 11 partly in section, taken along the line 12—12 thereof, and looking in the direction of the arrows.

The shaft 144 is provided with a rotative bias, so as to maintain the sprocket 139 against the chain 12 for taking up any slack therein. As shown in FIG. 11, the shaft 144 extends down below the base plate 24 and it is secured to a lever arm 150 by a locking pin 151, a lock key 152, and a lock nut 153. As shown in FIGS. 11 and 12, the outer end of the lever 150 is bifurcated and this end receives the outer end of a cylinder rod 154. The cylinder rod 154 is privtally connected to the lever 150 by a suitable pivot pin 155. The cylinder rod 154 is operatively connected to a piston in a fluid cylinder, generally indicated by the numeral 156 in FIG. 12. The fluid cylinder 156 is operatively connected to a suitable source of pressurized fluid and is controlled so as to maintain the aforementioned rotative bias on the sprocket 139. The cylinder 156 is supported at its cylinder head end by a pivot shaft 157 and a mounting rod 158 to a support bracket 159 that is fixedly mounted on the lower side of the base plate 24.

As shown in FIG. 3, the take-up sprocket 139 is provided with clearance notches, as 171, for the reception of the stretch pin means 11 as they pass around the sprocket 139.

As best seen in FIG. 11, the chain take-up means 138 also operatively carries a stretch pin safety means, generally indicated by the numeral 160. As best seen in FIG. 11, the stretch pin safety means 160 includes a gage plate 161 which is disposed adjacent the travel path of the chain 12 and stretch pin means 11. The gage plate 161 is secured to a vertical pivot shaft 162 by suitable machine screws 163. The shaft 162 is rotatably supported on a vertical support arm 164 to which is fixed a plate 166 that carries a microswitch, generally indicated by the numeral 165. The support arm 164 is fixed, as by welding, to a bracket 167, which is fixed by welding to a mounting plate 168. The mounting plate 168 is secured by suitable machine screws 169 to the upper sprocket support arm 141. It will be seen that if a stretch pin 121 has not been moved down to the proper parison receiving position, it will not pass under the upper outwardly extended arm 170 of the gage plate 161, and it will rotate the gage plate 161 so as to operate the micro-switch 165 and cause suitable controls to stop the machine for corrective operations thereon.

Molding Rotary Turret

Figure 14:
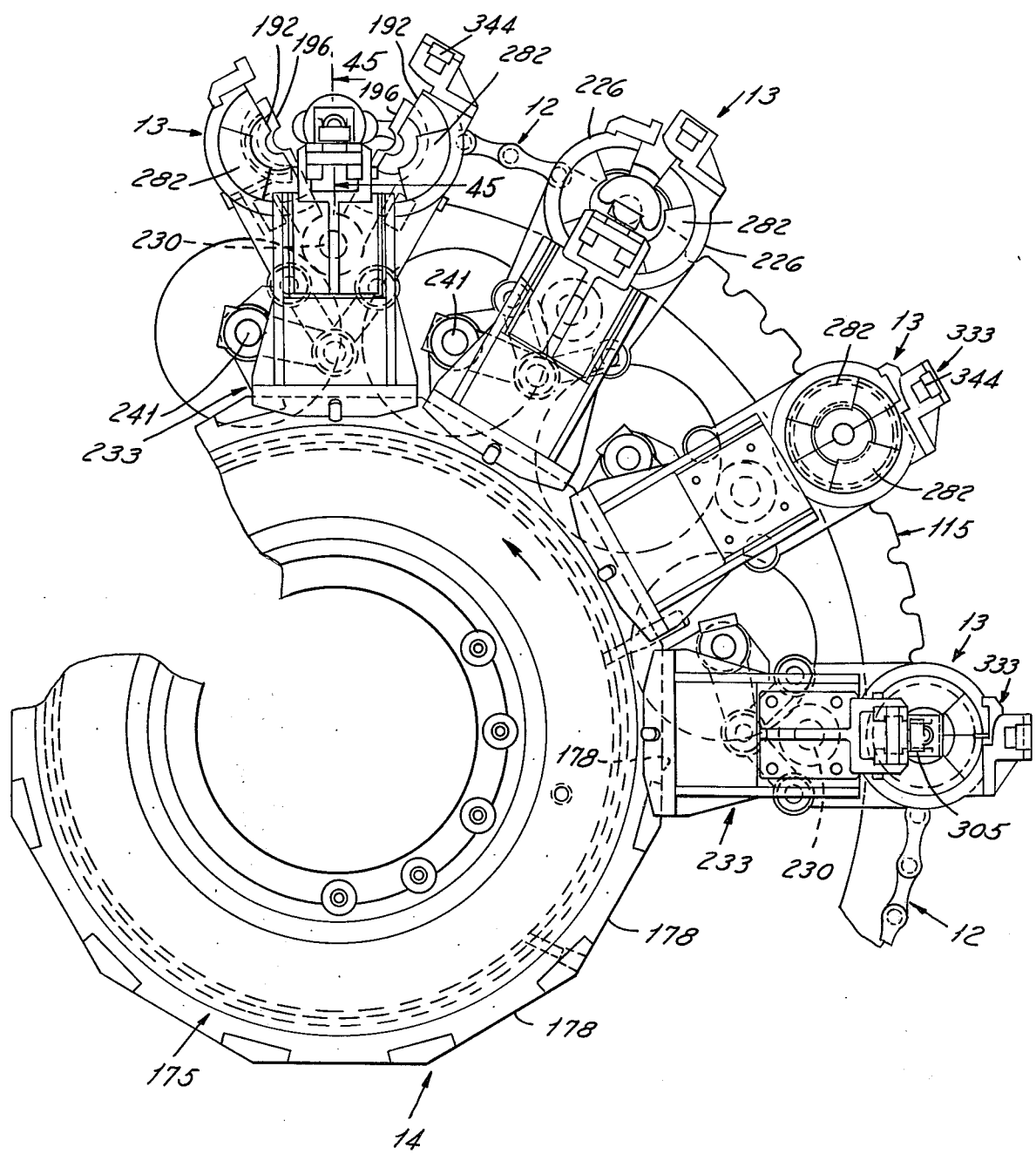
FIG. 14 is a fragmentary, top plan view of the structure illustrated in FIG. 13, taken along the line 14—14 thereof, and looking in the direction of the arrows.

As shown in FIG. 4, the molding rotary turret 14 includes a base, generally indicated by the numeral 173, which is formed in a manner similar to the loading turret base 20. The molding turret base 173 is suitably supported by a plurality of support legs 174. As illustrated in FIGS. 4 and 17, the molding rotary turret 14 includes a rotary turret 175 which is rotatably mounted by suitable bearings 176 on a support pedestal and column 177 carried on the base 173. As shown in FIG. 14, the turret 175 is provided with 12 vertical flat mounting areas 178 at each of which is operatively mounted one of the molding stations 13.

As shown in FIG. 17, the turret 175 is provided with a ring gear 188 which is driven by a drive gear 179 that is operatively mounted on the upper end of a vertical drive shaft 180. The drive shaft 180 is mounted in suitable bearings 181 and 182 in a vertical tubular housing 183 carried on the base 173. The shaft 180 has fixed on the lower end thereof a bevel gear 184 which meshes with and is driven by a second bevel gear 185 operatively mounted on a machine drive shaft 186. The machine drive shaft 186 is operatively connected by a suitable coupling 187 to the drive shaft 106 that drives the chain timing means 91. The shafts 106 and 186 are rotatably mounted in suitable bearings carried on the base 173.

As shown in FIG. 15, the drive shaft 186 is operatively connected to and driven by a suitable electric motor power drive means, generally indicated by the numeral 189. As shown in FIG. 2, the drive means 189 comprises a suitable electric drive means provided with a suitable gear reduction means. It will be seen that the power drive means 189 provides the constant drive speed for the entire machine through the co-action of the chain means 12.

Figure 54:
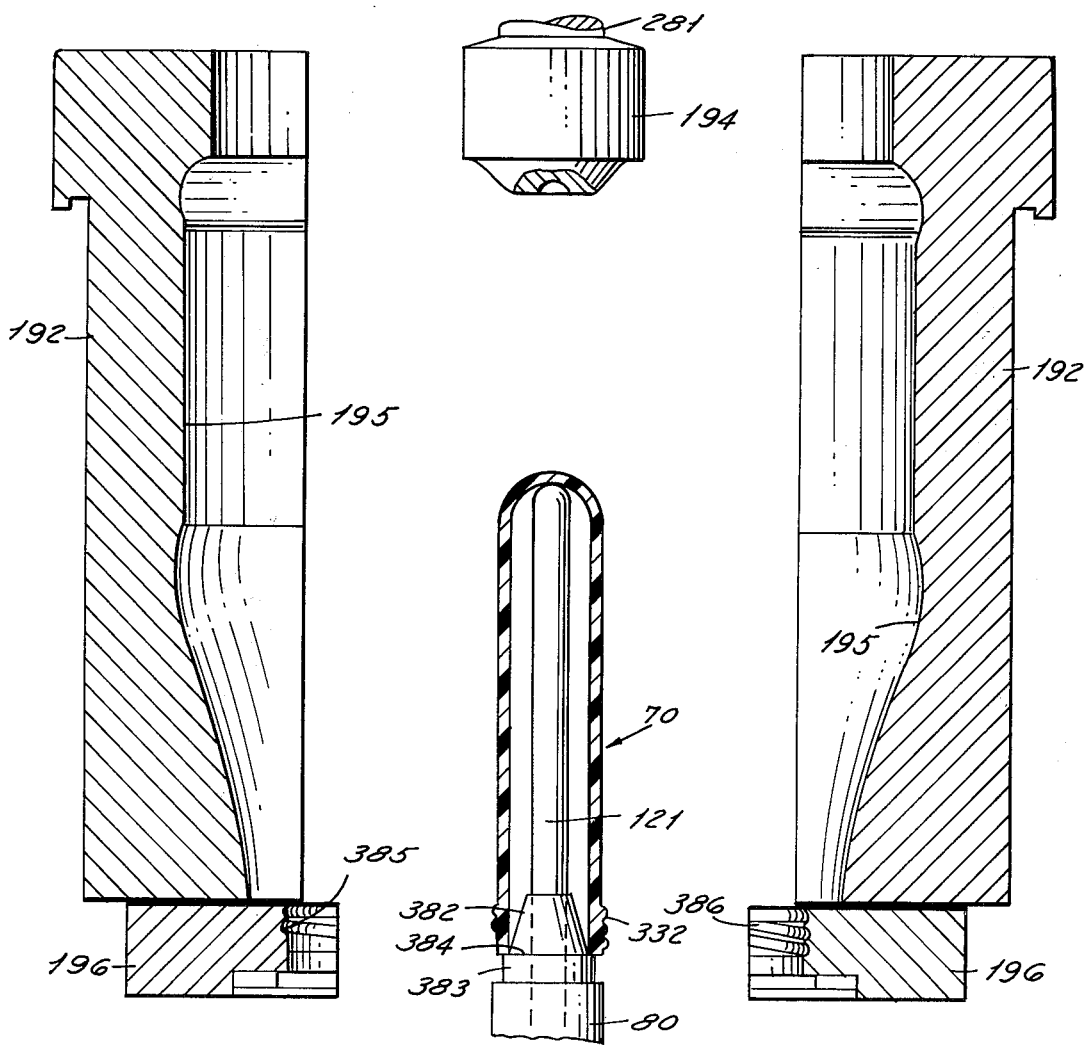
FIG. 54 is a fragmentary, enlarged, elevational section view of the mold structure illustrated in FIG. 53, taken along the line 54—54 thereof, and looking in the direction of the arrows.
Figure 56:
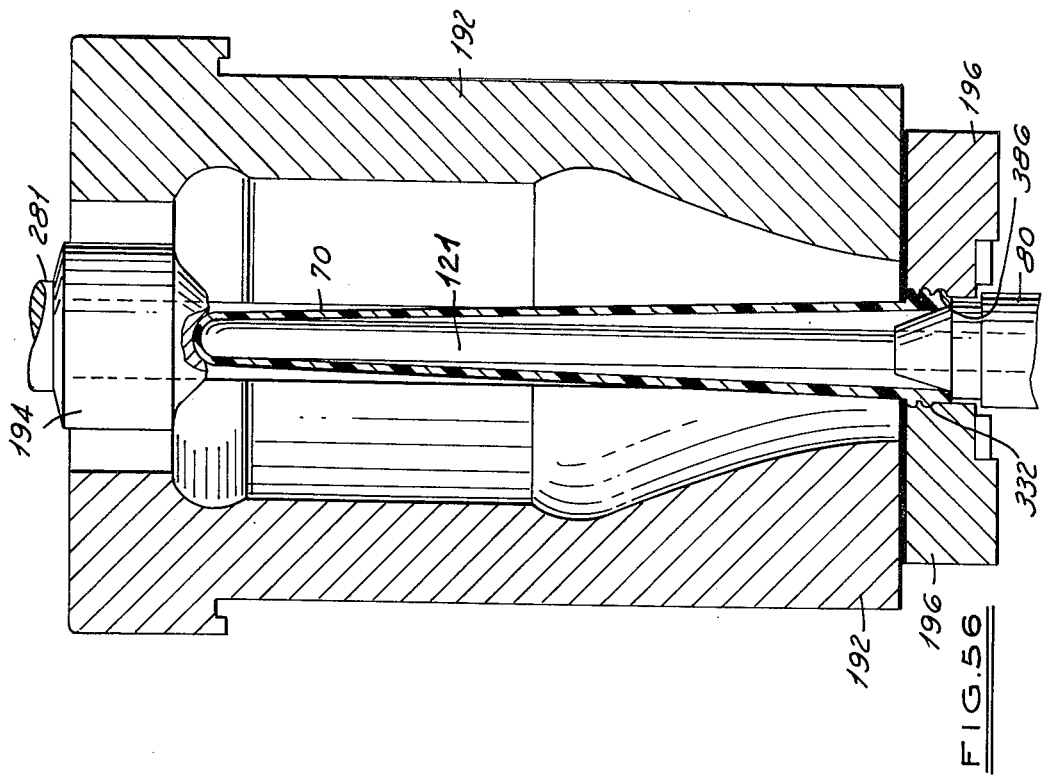
FIG. 56 is a view similar to FIG. 55, and showing the mold bottom plug retracted to the normal bottle blowing position, and with the parison stretched to a position prior to being blown into a bottle.
Figure 55:
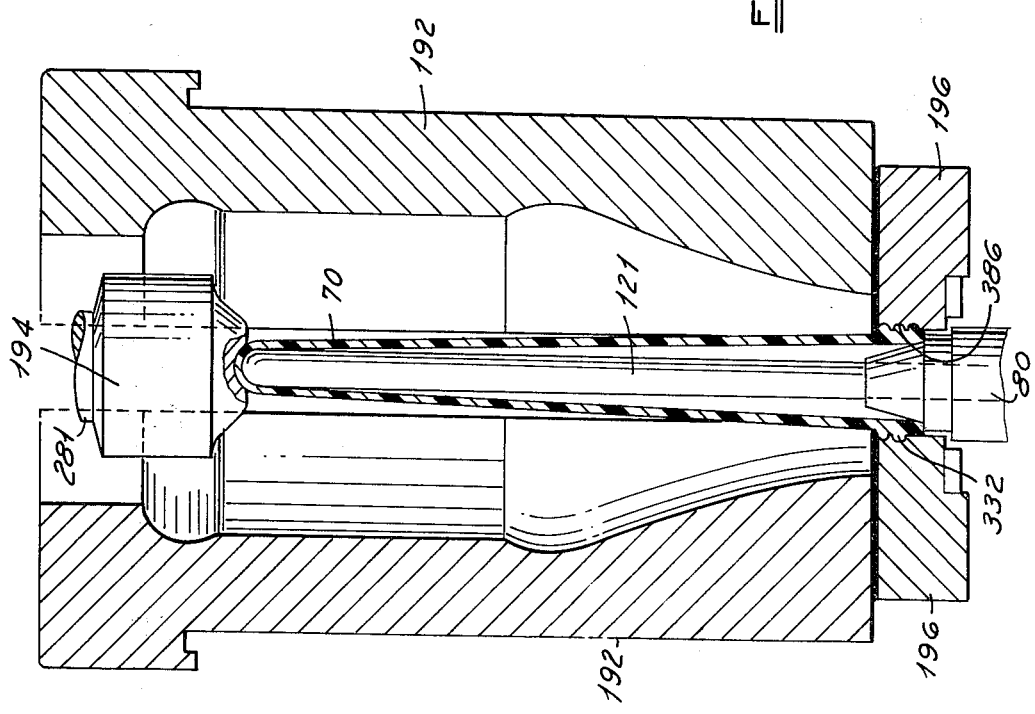
FIG. 55 is a view similar to FIG. 54, and showing the mold halves partially closed, the mold bottom plug moved inwardly a slight distance, and the parison stretched to meet the mold bottom plug.
Figure 57:
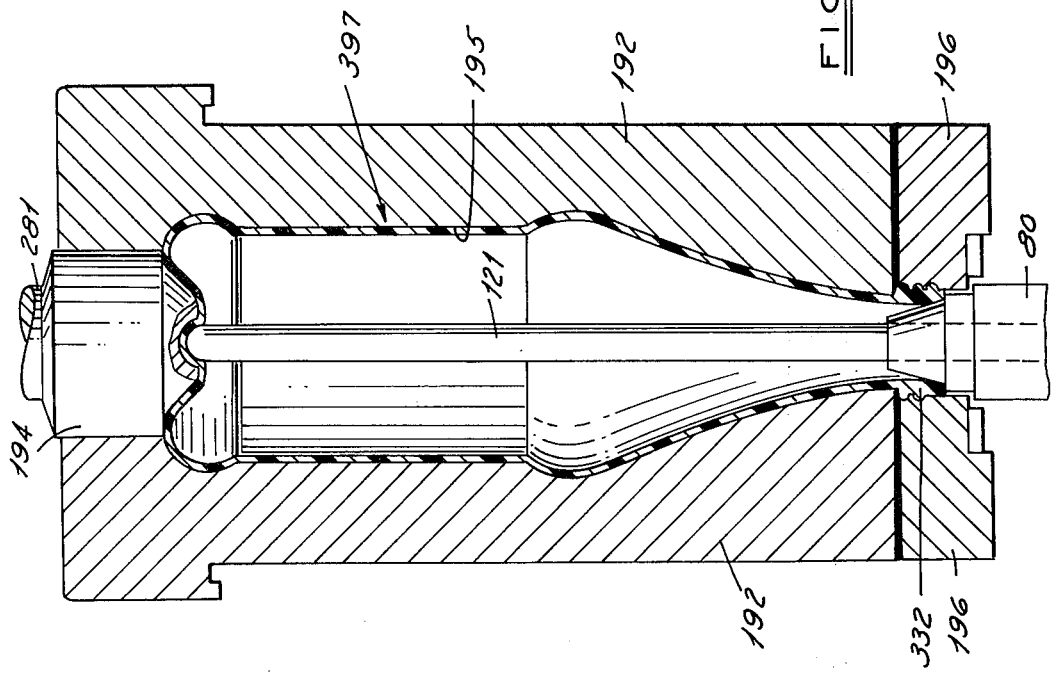
FIG. 57 is a view similar to FIG. 56, but with the mold halves moved to a closed position prior to the admission of air for blowing a bottle from the parison.

Each of the 12 molding stations 13 on the molding rotary turret 14 is provided with a five-piece mold. As shown in FIGS. 38 and 54, the mold at each of the molding stations 13 includes a pair of side pieces or mold havles indicated by the numerals 192. The mold side pieces 192 are semi-circular in cross section and are provided at the upper end thereof with semi-circular central openings 193 (FIG. 39) in which is operatively received the mold bottom end cap or end plug 194. As shown in FIG. 38, the mold side pieces 192 each have a cavity 195 formed therein for molding an article, which in this instance comprises a bottle. The inner face of the mold end plug 194 is shaped to form the bottom end of the bottle. As best seen in FIGS. 55 through 57, the mold includes a pair of neck ring clamps 196.

The aforedescribed mold parts are water cooled and they are supplied with cooling water from a rotary manifold generally indicated by the numeral 201 and mounted on top of the turret 178. As shown in FIG. 2, coolant water is conducted from the rotary manifold 201 to a plurality of individual manifolds 202, one for each of the molding stations 13, through conduits 203. The water is returned to the rotating manifold 201 from each of the manifolds 202 through a suitable conduit 204. As shown in FIG. 2, a pair of conduits 205 conduct cooling water from the manifolds 202 to the mold halves 192 through inlet ports 206 formed in the rear side of each of the mold halves 192 (FIG. 39). The coolant water passes through suitable passages formed in the mold halves 192 and then exits through the outlet ports 207 and passes through the return conduits 208 to the manifold 202.

Figure 28:
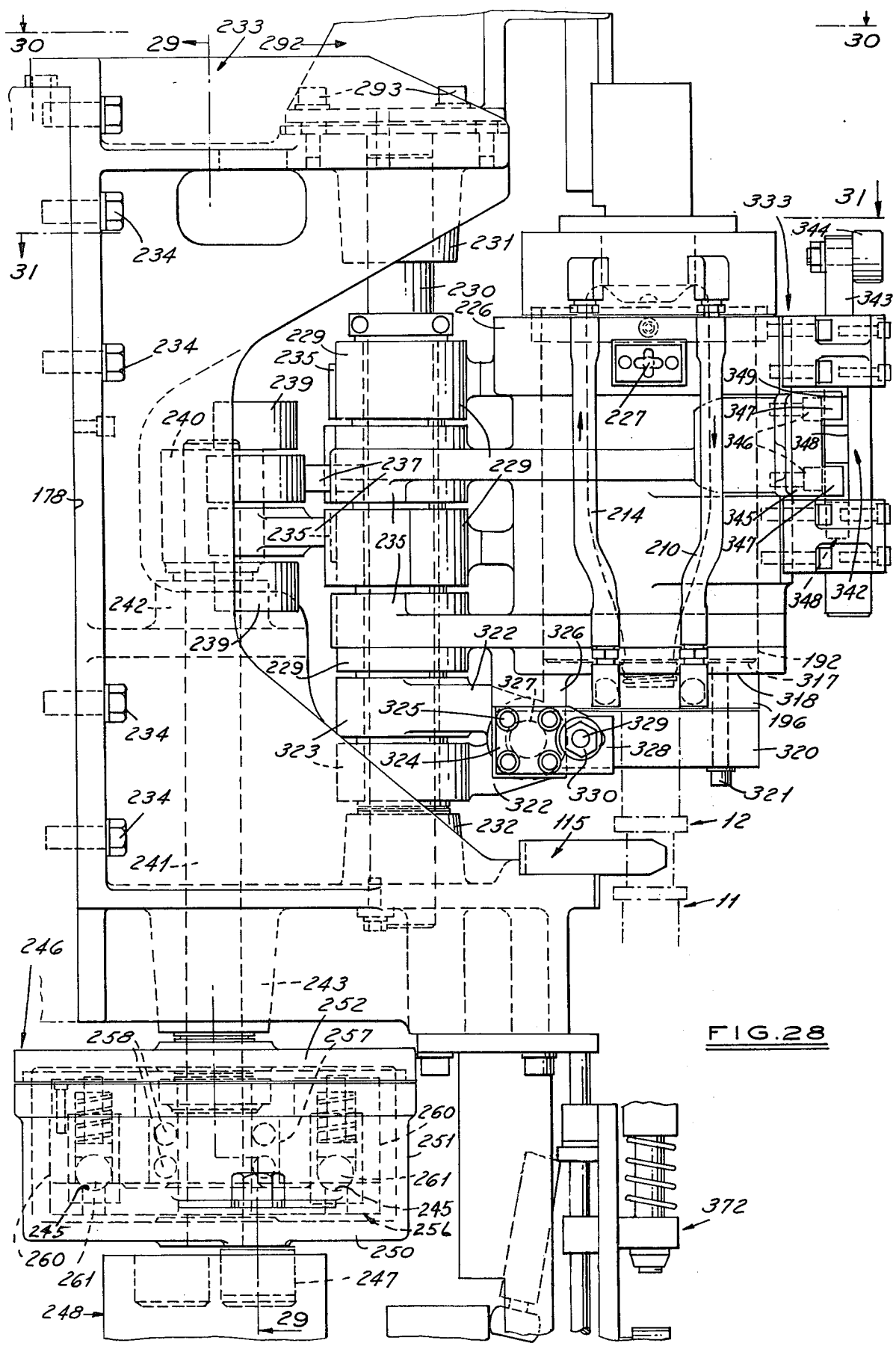
FIG. 28 is a fragmentary, left side elevational view of the structure illustrated in FIG. 27, taken along the line 28—28 thereof, and looking in the direction of the arrows.
Figure 31:
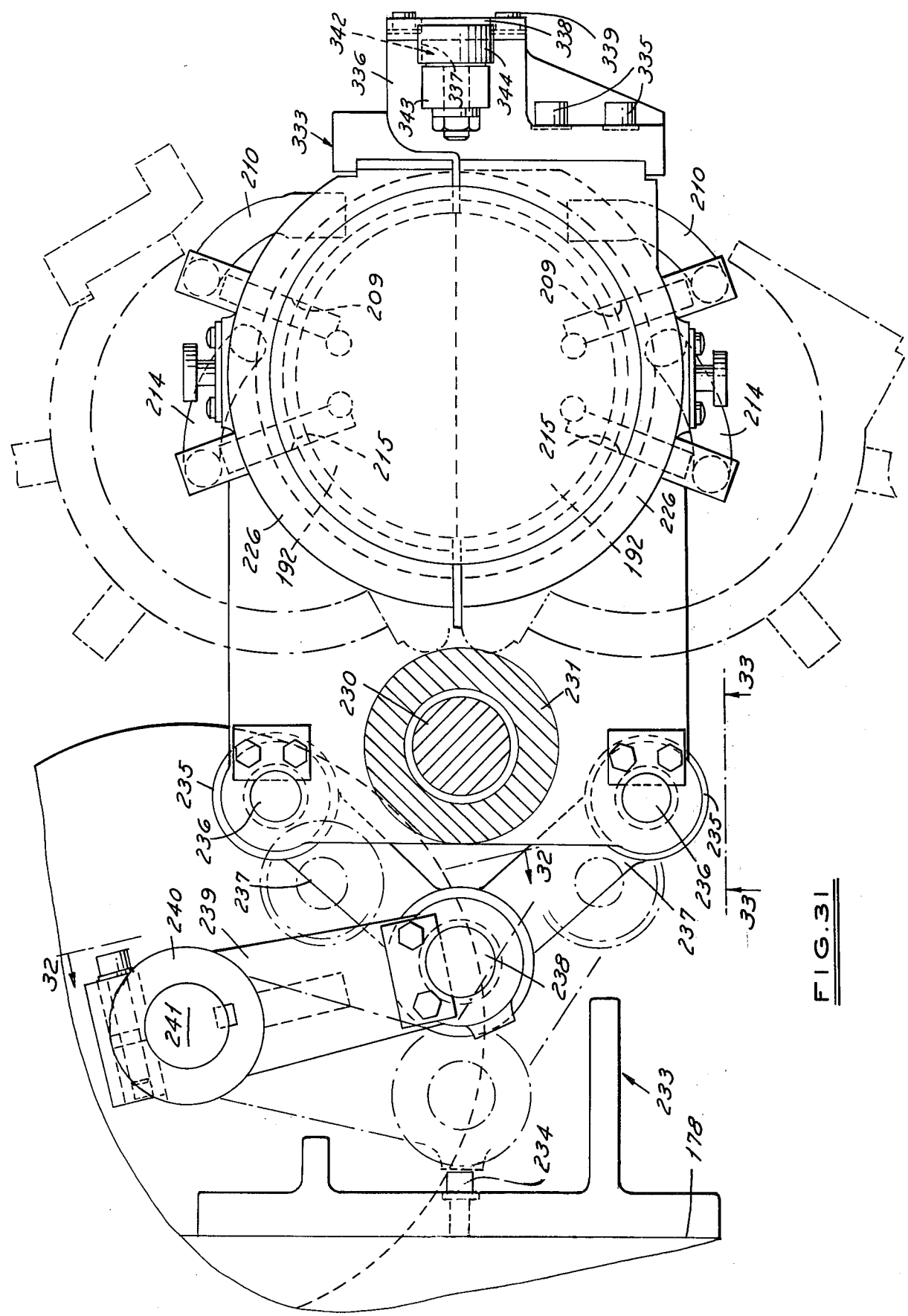
FIG. 31 is a fragmentary, enlarged, horizontal section view, with parts removed, of the structure illustrated in FIG. 28, taken along the line 31—31 thereof, and looking in the direction of the arrows.
Figure 35:
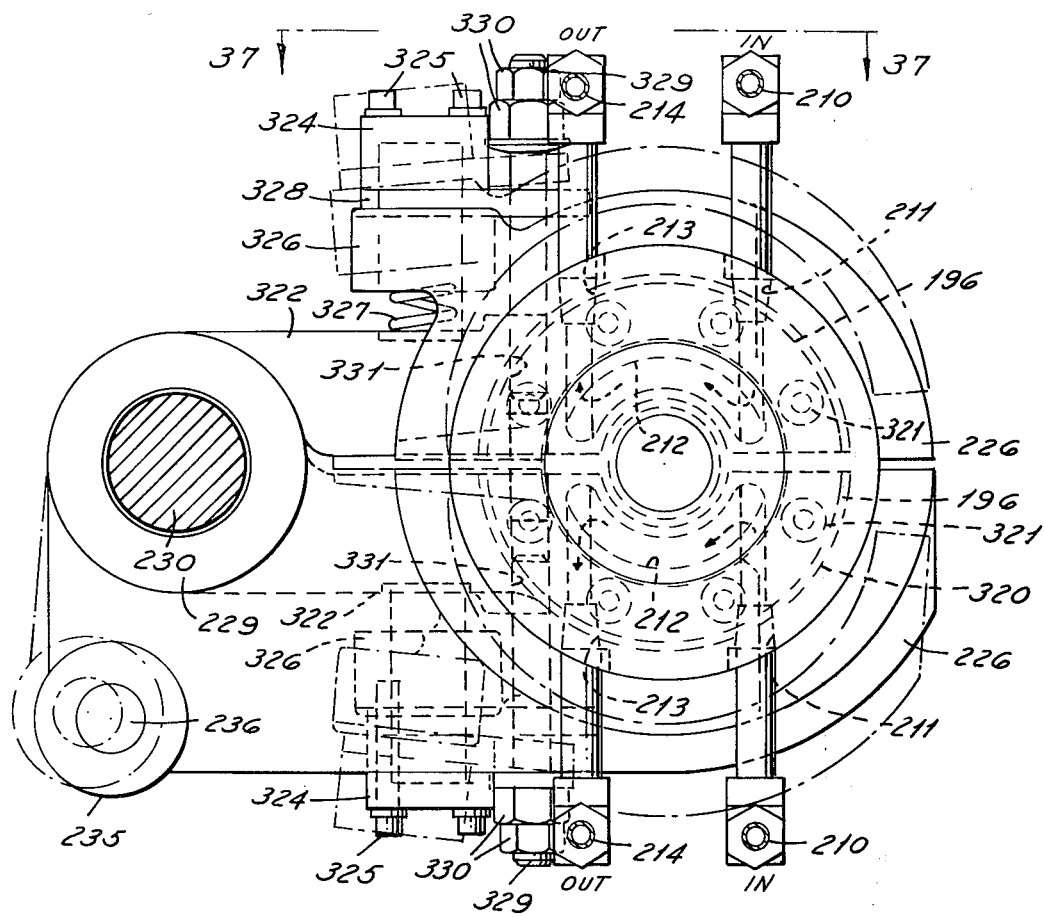
FIG. 35 is a fragmentary, horizontal section view of the structure illustrated in FIG. 27, taken along the line 35—35 thereof, and looking in the direction of the arrows.

Cooling water is supplied to the mold neck clamp parts 196 by passing cooling water to and from the mold halves 192. As shown in FIGS. 31 and 39, cooling water from the passages in each of the mold halves 192 is fed out through outlet ports 209 and downwardly through suitable conduits 210 (FIG. 27) and thence into inlet ports 211 (FIG. 35) in the mold neck parts 196, as shown in FIG. 35. The cooling water passes through passages 212 in each of the mold neck pieces 196 and then exits out through outlet ports 213 and into conduits 214 (FIG. 28). As shown in FIG. 31, the conduits 214 then convey the water upwardly and back into the mold halves 192 through inlet ports 215.

Cooling water is supplied to each of the mold bottom end plugs 194 from its respective manifold 202 through suitable conduit 218. As shown in FIG. 42, the conduit 218 is operatively connected to a passage 219 formed through the mold plug cylindrical carrier shaft 220. The passage 219 conducts the cooling water downwardly and through a passage 221 formed in the plug 194, and thence upwardly through an exit passage 222 and out through a return conduit 223 which is operatively connected to its respective manifold 202.

Figure 30:
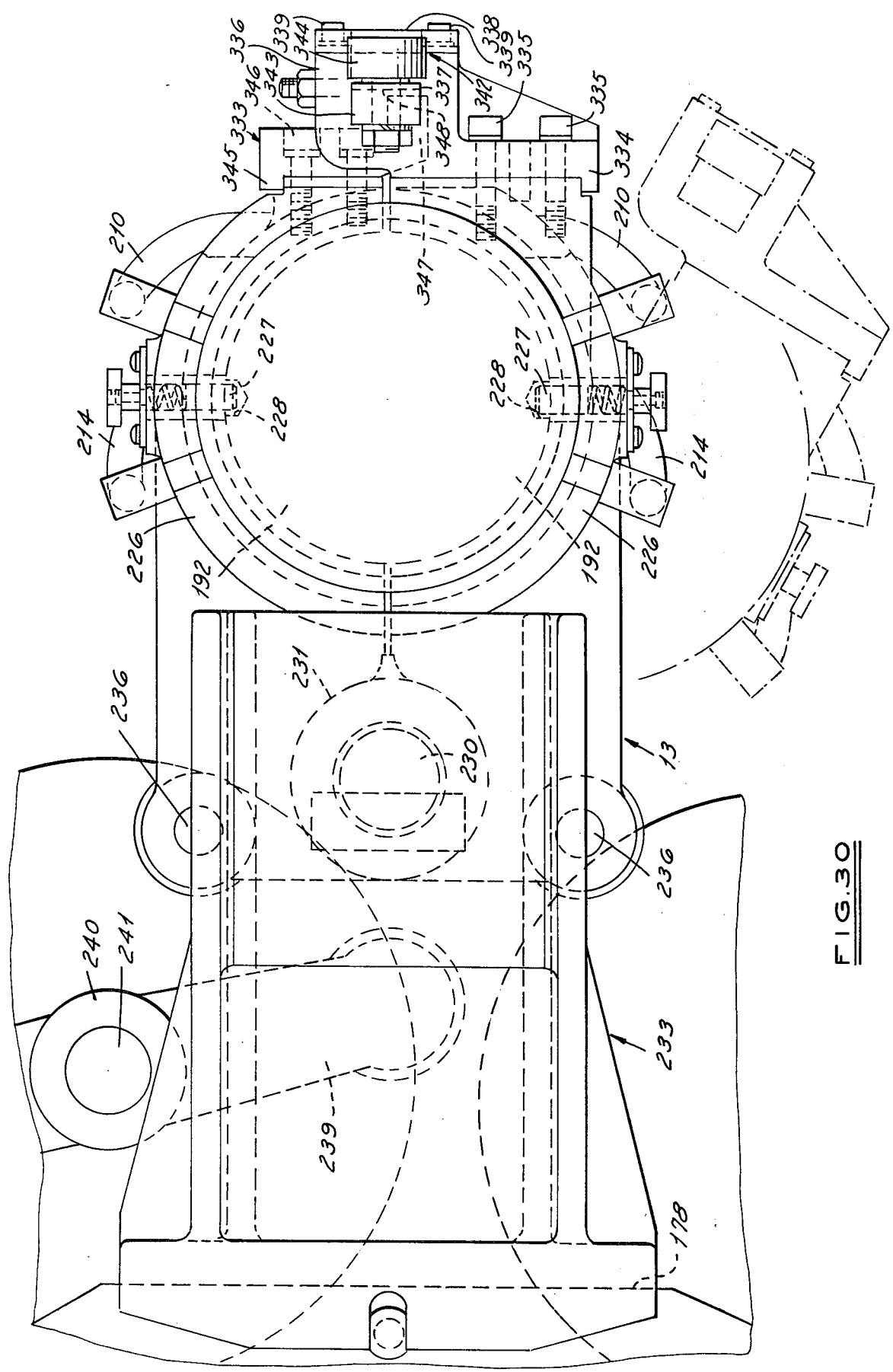
FIG. 30 is a fragmentary, enlarged, top plan view of the structure illustrated in FIG. 28, taken along the line 30—30 thereof, and looking in the direction of the arrows.

As shown in FIG. 30, each of the mold halves 192 are releasably secured to an individual mold carrier 226. Each of the mold halves 192 is releasably secured to its respective mold carrier 226 by a releasable retainer pin 227 which has its inner end engaged in a hole 228 formed in the outer surface of the wall of each mold half 192 (FIGS. 38 and 39). As shown in FIG. 28, each of the mold carriers 226 is provided with a pair of hubs 229 on its inner side which are pivotally mounted by suitable bearing means on a vertical support shaft 230. The support shaft 230 is mounted in suitable bearings in an upper boss 231 and a lower boss 232 which are operatively mounted on a mold station housing 233. Each of the mold station housings 233 is fixedly secured by suitable machine screws 234 to its respective mold station 178 on the mold rotary turret 175. As shown in FIG. 28, the first and third hubs 229, counting from the top as viewed in FIG. 28, would support the mold half 192, as shown in the upper position of FIG. 30, and the second and fourth hubs 229 would support the lower disposed mold half 192 as viewed in FIG. 30.

The solid line position of the mold carriers 226 in FIG. 31 shows the mold halves 226 in a closed and operative molding position. The broken line positions show the mold carriers 226 swung to an open position for the admission of a parison to the mold halves 192 or the ejection of a completed article therefrom. The mold carriers 226 are moved between the closed and open positions by the following described structure.

Figure 33:
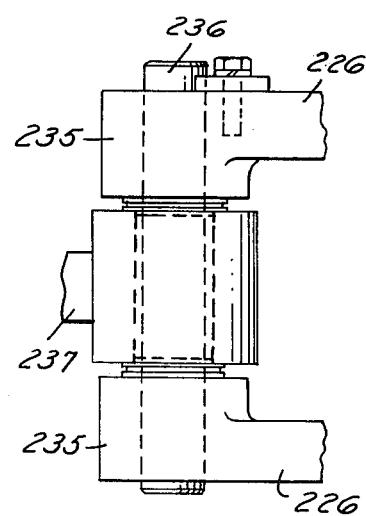
FIG. 33 is a fragmentary, elevational view of the structure illustrated in FIG. 31, taken along the line 33—33 thereof, and looking in the direction of the arrows.

As best seen in FIG. 31, each of the mold carriers 226 is provided on an inner corner thereof with a journal member 235 in each of which is operatively mounted a pivot shaft 236. Each of a pair of mold operating levers 237 has one end thereof operatively mounted on one of the shafts 236, and the other end thereof is pivotally mounted on a shaft 238 which is carried on the outer end of a pair of pivot levers 239 (FIGS. 32 and 33).

Figure 29:
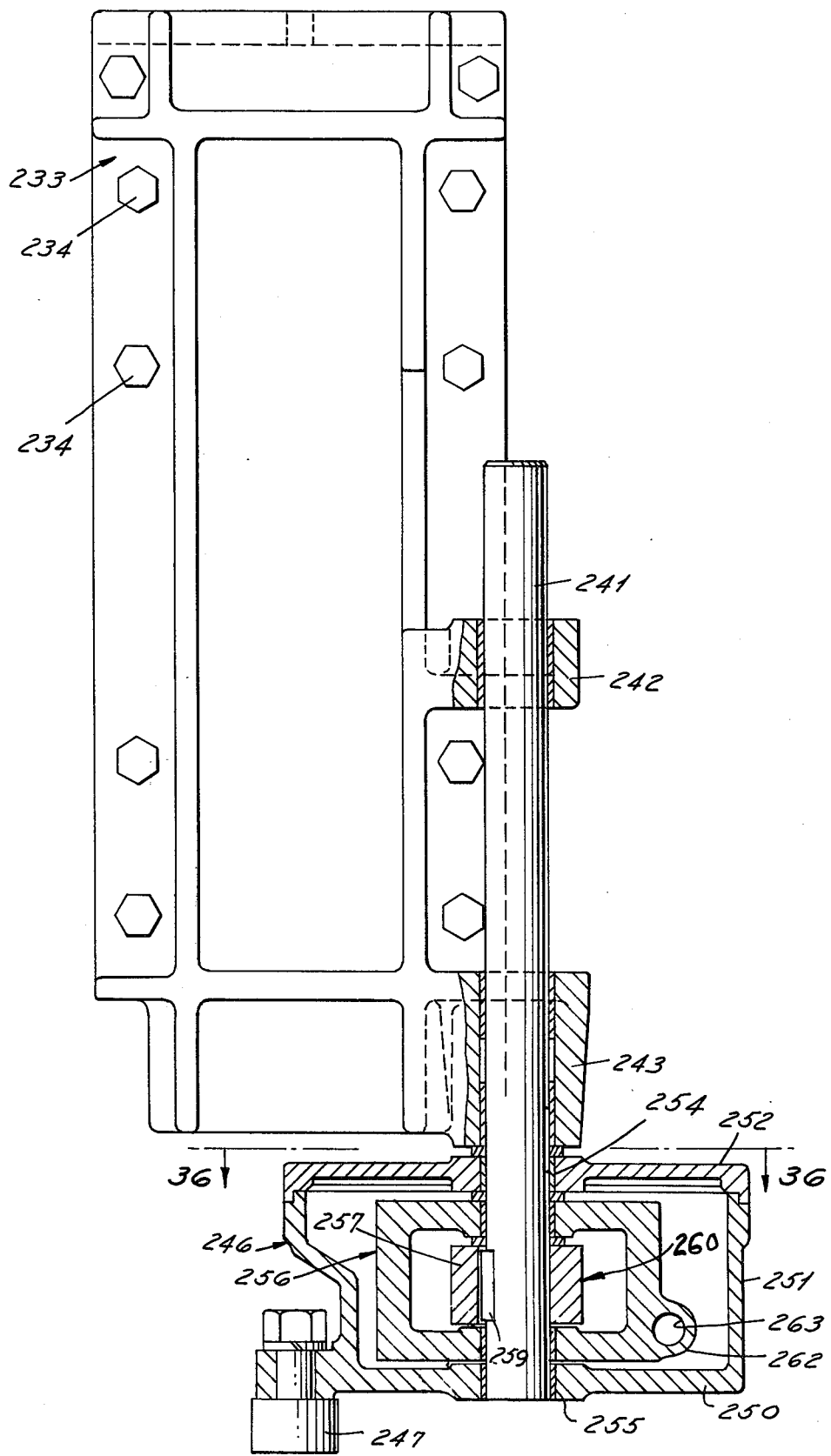
FIG. 29 is a fragmentary, elevational, section view of the structure illustrated in FIG. 28, taken along the line 29—29 thereof, and looking in the direction of the arrows.

As best seen in FIG. 32, the levers 239 are fixedly mounted on a hub 240 which is fixedly secured to the upper end of a vertical mold carrier operating shaft 241. As best seen in FIGS. 28 and 29, the mold carrier operating shaft 241 is journaled in an upper journal member 242, and a lower journal member 243, each of which is operatively carried on its respective mold station housing 233. Operatively attached to the lower end of the shaft 241 is a mold actuator, generally indicated by the numeral 246, which carries a cam follower 247 that operatively engages a mold actuator cam (FIGS. 21 and 22) generally indicated by the numeral 248. As shown in FIG. 31, the mold actuator 246 rotates the shaft 241 clockwise so as to move the shaft 238 and the mold operating levers 237 to the left from the solid line mold closed position, as viewed in FIG. 31, to the broken line mold open position.

As shown in FIG. 4, the mold actuator cam 248 is fixedly mounted on the supporting pedestal and column structure 177. As shown in FIG. 22, the mold actuator cam 248 is arcuate in plan view, and it is horizontally disposed so as to operate to open the mold pieces 192 for ejection of a completed article and for receiving a parison, and then to close the mold pieces 192 again for a molding cycle.

The mold actuator cam 248 is provided with a cam track 249 which is formed to move the cam follower 247 for the appropriate camming operations as the molding rotary turret 14 turns in a counterclockwise direction, as viewed in FIG. 22. The zero degree position of the molding rotary turret 14 is shown to be disposed at a point in the rotary travel of the molding turret 14 where the transfer means chain 12 is passing away from the molding rotary turret 14 and onto the ejector means 17. The mold pieces 192 are in an open position at this point and they continue on to the 20° position as shown in FIG. 22 where the mold pieces 192 are still in an open position. When a molding station 13 is moved to the 45° position shown in FIG. 22, the cam follower 247 is cammed by the track 249 to move the mold pieces 192 to a partially closed position where they are open 13°. Continued rotary movement of the turret 14 to the 60° position shown in FIG. 22 maintains the mold pieces 192 at an open position of 13°. At the last mentioned point, the cam track 249 operates on the cam follower 247 to rotate the shaft 241 to move the mold pieces 192 to the closed position when the molding rotary turret 14 reaches the 70° point of travel, as shown in FIG. 22. Continued movement then moves the cam follower 247 out of the cam track 249 during the blow molding operation. When a molding station reaches the 320° point of travel shown in FIG. 22, the cam follower 247 is again actuated by the cam track 249 to commence opening the mold pieces 192, and they open to an opening of 13°. The 13° opening is maintained until the 332° point of rotary travel is reached, at which time the mold pieces 192 are opened to the fully opened position, shown by the broken line positions in FIG. 31.

Figure 36:
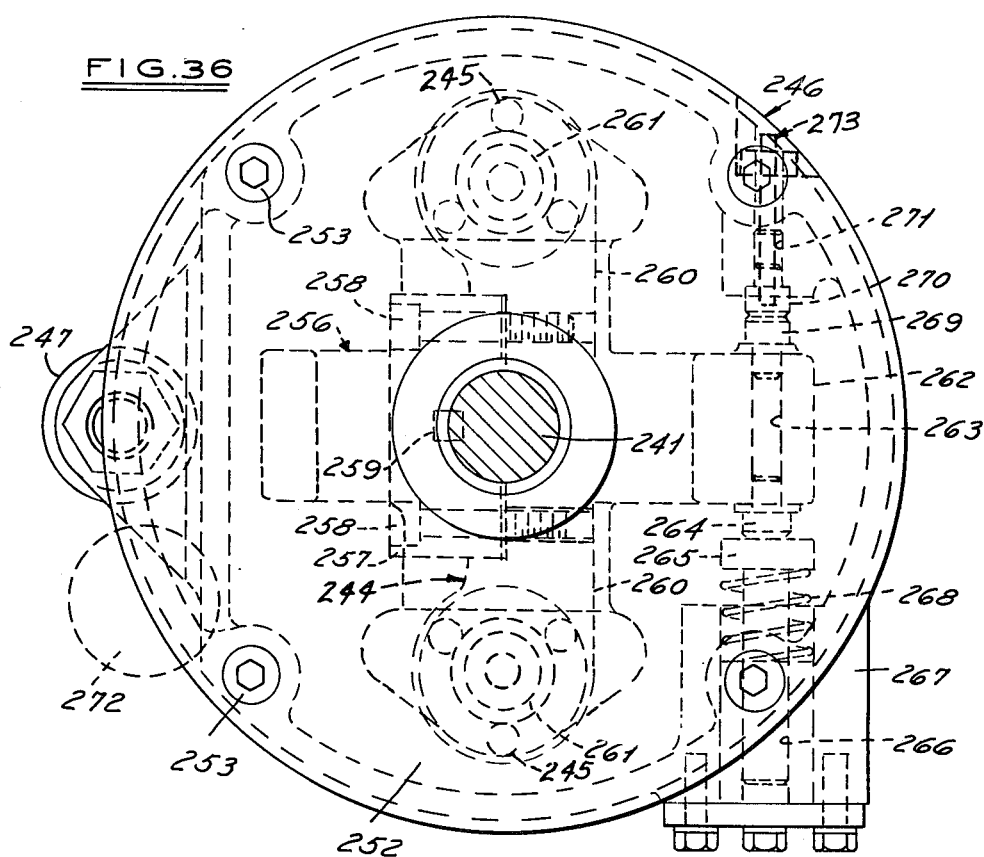
FIG. 36 is an enlarged, horizontal section view of the structure illustrated in FIG. 29, taken along the line 36—36 thereof, and looking in the direction of the arrows.
Figure 37:
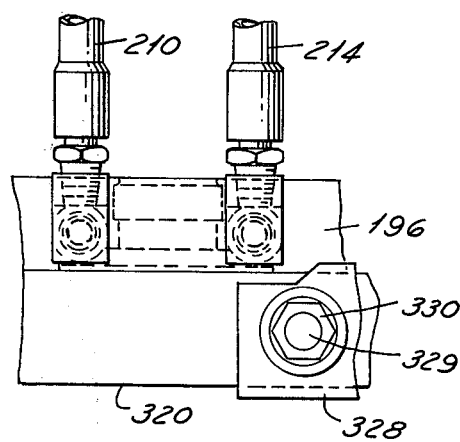
FIg. 37 is a fragmentary, elevational view of the structure illustrated in FIG. 35, taken along the line 37—37 thereof, and looking in the direction of the arrows.

The mold actuator 246 includes a safety mechanism for overload and overtravel purposes, as well as a mold closure adjustment. As best seen in FIG. 29, the mold actuator 246 comprises a pot shaped member having a body including a bottom wall 250 and a cylindrical integral side wall 251. The mold actuator 246 is provided with a detachable circular cover 252. As shown in FIG. 36, the pot cover 252 is releasably secured to the body of the actuator 246 by suitable machine screws 253.

As shown in FIG. 29, the drive shaft 241 is rotatably mounted in a suitable bushing 254 mounted in the cover 252. The lower end of the shaft 241 is also pivotally mounted, in a bushing 255 positioned in the bottom end wall 250. An arm, generally indicated by the numeral 256, is rotatably mounted by suitable bushings on shaft 241. A clamp member 257 is attached by machine screws 258 to a driver 244, and these parts are drivably connected to shaft 241 by a key 259 inside of the mold actuator 246.

As shown in FIG. 36, the driver 244 includes a pair of radially extended detent arms 260 which each have operatively mounted on the outer ends thereof a ball detent means indicated by the numeral 261. As shown in FIG. 28, each of the ball detent means 261 operatively engages a usual ball seat 245 on arm 256 when the detent arms 260 are in the position shown in FIG. 36.

As shown in FIG. 36, the arm 256 includes a driver arm 262 which is disposed radially and at right angles to the ball seats 245. A bore 263 is formed through the outer end of the driver arm 262 and has operatively mounted therein shafts carrying a pair of rest buttons 264 and 269. The rest button 264 is engagable by a spring-biased pad 265 which is carried on a shaft that is slidably mounted in a bore 266 in a boss 267 formed on the body of the actuator 246. A suitable coil spring 268 is mounted around the shaft carrying the pad 265 so as to maintain a bias or pressure on the driver arm 262, to bias it in the counterclockwise direction as viewed in FIG. 36. An adjustable button or stop 270 is mounted in alignment with the rest button 269 and it is carried on a shaft that is operatively mounted in a tapped hole 271 formed in the body of the actuator 246.

As viewed in FIG. 36, the spring 268 maintains the driver arm 262 in a position whereby the ball detent means 261 are in the positions shown in FIG. 36. When the follower 247 enters the cam track 249, the actuator 246 is pivoted counterclockwise as viewed in FIG. 36, so as to move the follower 247 to the broken line position indicated by the numeral 272. A screw adjustment means 273, FIG. 36, is incorporated in the body of actuator 246 and is operatively attached to the rest button 270, to provide a means to set the position of rest button 270, in order to assure complete closing of the mold carriers 226 when follower 247 and actuator 246 has reached the position 272.

If, through normal inaccuracies of the various parts, the mold carriers 226 should fully close before follower 247 and actuator 246 reach the position 272, follower 247 and actuator 246 may continue to move rotationally until position 272 is reached without damage to any component part because said overtravel will be absorbed by the coil spring 268 and the associated parts of the system described hereinbefore. This system allows some relative rotation between the shaft 241, which operates mold carriers 226, and actuator 246.

If, through some unforeseen circumstance, the mold carriers 226 should be held in an open or nearly open position, the ball detent means 261, in series with the overtravel system described hereinabove, will allow follower 247 and actuator 246 to be rotated within the limits of cam track 249 (FIG. 32) by first bottoming coil spring 268 and associated parts, and then forcing the ball detent means 261 of driver 244 (which is driving shaft 241 and carriers 226) out of the ball seats 245 of arm 256 allowing adequate relative rotation between shaft 241 and actuator 246, and preventing damage to the component parts.

This system also works in a similar manner if mold carriers 226 are locked closed. However, in this reverse direction there is no overtravel spring system to be overcome.

Figure 41:
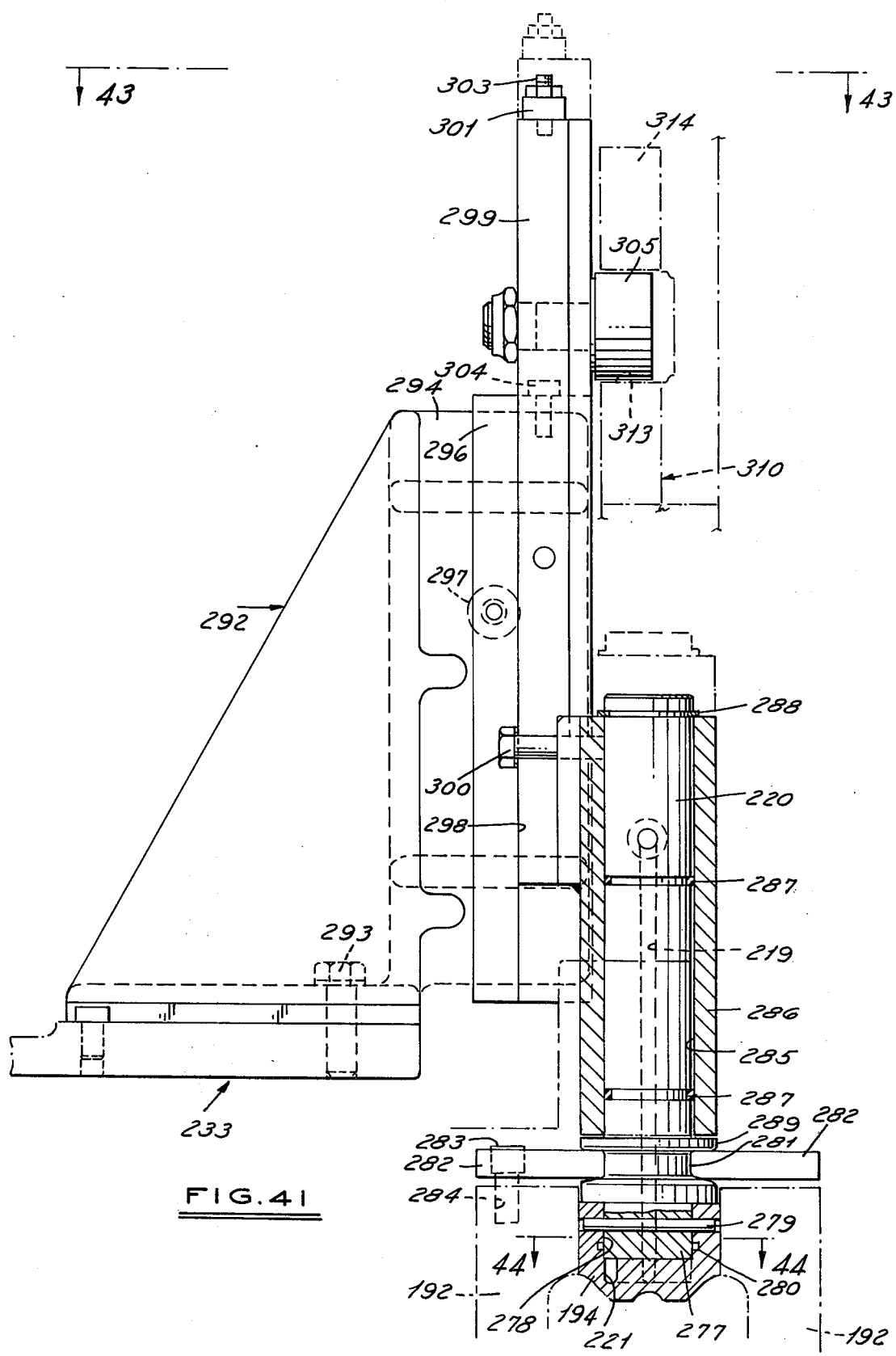
FIG. 41 is a fragmentary, enlarged, elevational view, partly in section, of the structure illustrated in FIG. 42, taken along the line 41—41 thereof, and looking in the direction of the arrows.

As shown in FIGS. 41 and 42, the mold bottom end plug 194 is operatively carried on the lower end of the plug carrier shaft 220. The lower end of the plug carrier shaft 220 is provided with a reduced diameter as indicated by the numeral 277 which is slidably mounted in the bore 278 formed on the upper side of the mold plug 194. The mold plug 194 is releasably secured on the plug carrier shaft end 277 by a suitable retainer pin 279. A suitable O-ring 280 is operatively mounted in the bore 278 for operative engagement against the reduced diameter plug carrier shaft end 277 of the plug carrier shaft 220.

Figure 53:
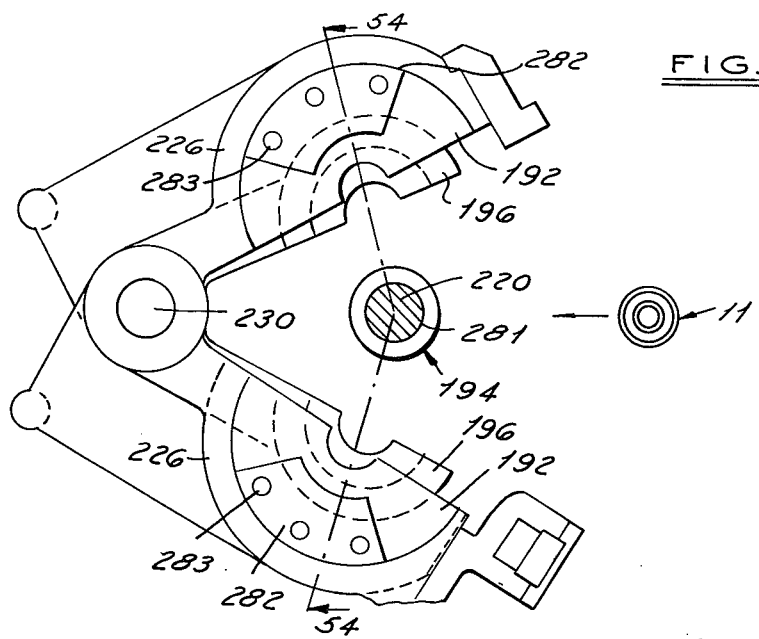
FIG. 53 is a top view of the mold employed in the present invention, and showing the mold halves swung to an open position for the reception of a parison.

As best seen in FIG. 41, the plug carrier shaft 220 is provided with a reduced diameter portion or neck 281 at a point above the mold plug 194. A pair of arcuate plug clamps 282 are adapted to be laterally moved into a clamping position around the neck 281 of the plug carrier shaft 220 for positively positioning and retaining the mold plug 194 at a specific location during an article molding operation. FIG. 53 shows a plan view of the mold plug clamps 282 which are clamp plates that are secured to the upper ends of the mold halves 192 by suitable machine screws 283 which are threadably mounted in threaded bores 284 (FIG. 39), formed in the upper ends of the mold halves 192. The plug clamps 282 are swung clear of the plug carrier shaft 220 when the mold halves or pieces 192 have been open at least 5° each, or a total of a 10° opening from the closed position.

As shown in FIGS. 41 and 42, the plug carrier shaft 220 is operatively mounted in the bore 285 of a vertically disposed tubular housing 286. A pair of suitable O-rings 287 are mounted in the periphery of the plug carrier shaft 220 for operative engagement with the surface of the bore 285. O-rings 287 are a resilient centering device which allows shaft 220 to shift slightly in housing 286 for accurate alignment of plug 194 in mold side pieces 192 and 193. A flange 289 on the shaft 220 limits the upward movement of the shaft 220 in the housing 286. The shaft 220 is releasably retained in the housing 286 by a releasable retainer ring 288.

The tubular housing 286 is operatively mounted for vertical sliding movement on a bracket guide 292 which is secured by suitable machine screws 293 to the top of a molding station housing 233. As shown in FIG. 42, the bracket guide 292 includes a vertical slideway 294 in which is formed the U-shaped vertical way 295. A pair of slide guide members 296 are vertically disposed in the way 295 and are releasably secured in place by suitable machine screws 297. As shown in FIG. 43, each of the slide guides 296 has formed along the inner face thereof a vertically disposed guide recess 298 in which is slidably mounted one side of a vertical slide 299.

As shown in FIG. 41, the plug tubular housing 286 is secured to the slide 299 by suitable machine screws 300. A stop plate 301 (FIG. 42) is secured to the upper end of the slide 299 by suitable machine screws 302. The stop plate 301 is provided with a pair of stop screws 303 which are adapted to limit the downward travel of the slide 299 by engagement with a pair of rest buttons in the form of screws 304 mounted on the upper ends of the slide guides 296. A cam follower 305 is operatively mounted on the upper ends of the slide guides 296. A cam follower 305 is operatively mounted on the slide 299 for moving the mold plug 194 upwardly and downwardly in a predetermined manner as explained in detail hereinafter.

As shown in FIGS. 2 and 22, a U-shaped cam supporting bridge generally indicated by the numeral 306 is operatively mounted across the right side of the molding rotary turret 14 on the base 173 for supporting a mold plug cam, generally indicated by the numeral 310. The bridge 306 includes a pair of side tubular posts 307 and 309 and a fixedly mounted top cross tubular beam 308. A cam track 310 is fixedly supported from the top beam 308 by any suitable means, as by a plurality of depending support arms 311 (FIG. 21).

Figure 58:
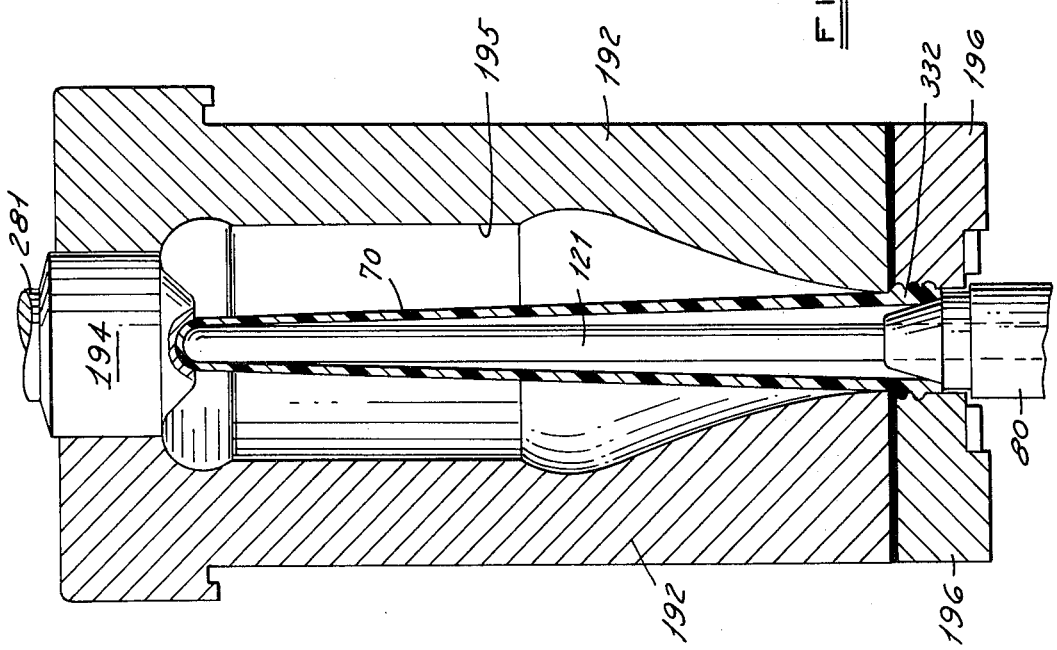
FIG. 58 is a view similar to FIG. 57, but showing the parison blown into a final bottle shape.

It will be understood that during the molding portion of the cycle, the mold end plug 194 is secured in a positive and specific location, as shown in FIGS. 57 and 58, by the mold plug clamps 282. When the molding rotary turret 14 is moved so as to bring a cam follower 305 on a molding station into engagement with the top surface or track 312 of the cam 310, the cam 310 functions to lift the molding plug 194 slightly upwardly from the position shown in FIGS. 57 and 58 at the 338° point of travel as indicated in FIG. 22. As shown in FIG. 21, the cam track 312 of the cam 310 supports and maintains the mold plug 194 in a raised position because of the horizontal shape of the cam track 312. As shown in FIG. 21, the upper surface of the cam 310 is concave upwardly so as to provide a dip 313 in the movement of the mold plug slide 299 for moving the mold plug 194 downwardly by gravity for engagement with a parison, as described hereinafter, and for then again moving the mold plug 194 upwardly to the positive and specific position where it is again locked in place for a molding operation. When a molding station reaches the 70° point in its rotary travel (FIG. 22), the mold is closed and the mold plug 194 is again locked in the positive position shown in FIGS. 57 and 58. The track portion 313 of the cam 310 is enclosed by a secondary or upper cam 314 so as to positively hold the mold plug 194 in its particular controlled position as it moves through the downwardly curved portion of the cam track 310 for controlled stretching of the parison, as explained hereinafter.

As best seen in FIG. 27, the lower end 317 of each of the mold halves 192 terminates at a position slightly above the lower ends 318 of the mold halve carriers 226. The mold neck parts or neck rings 196 are positioned with the upper ends thereof inside of the lower end 318 of the mold halve carriers 226 and they are in a sliding fit with the lower end of the mold halves 192.

As shown in FIGS. 27, 28 and 35, the neck rings 196 are carried on separate neck ring carriers 320. As shown in FIG. 35, the neck rings 196 are secured to the neck ring carriers 320 by a plurality of suitable machine screws 321. As shown in FIGS. 38 and 35, the neck ring carriers 320 are each connected by an arm 322 to a hub 323 which rotatably supports the neck ring carriers 320 on the vertical shaft 230. The neck rings carriers 320 are swung inwardly and outwardly with the mold halve carriers 226, as described hereinbelow.

As shown in FIGS. 28 and 35, a spring chamber 324 is secured by a plurality of machine screws 325 to a depending arm 326 carried on the lower end of each of the mold carriers 226. A coil spring 327 is mounted in the spring chamber 324 and its outer end extends outwardly and into a biasing engagement with the adjacent neck ring carrier arm 322 which carries a neck ring carrier 320. As shown in FIGS. 27, 28 and 35, a spring plate 328 is carried by each of the spring chambers 324, and one end of the plate 328 extends sidewardly forward toward the front of the molding station. A stud 329 extends through a suitable hole in the outwardly extended portion of the spring plate 328 and it carries on the outer end thereof a pair of lock nuts 330. As best seen in FIG. 35, the inner end of each of the pair of studs 329 is threadably mounted in a suitable bore 331 formed in the adjacent neck ring carrier arm 322.

It will be seen that the springs 327 provide an inward bias on the neck ring carriers 320 so as to move the neck rings 196 into operative engagement with the threaded neck 332 of a parison before the mold halves 192 are closed. The aforementioned structure, wherein the neck rings 196 are carried by the mold halves 192 but are spring biased to a position forward of the mold halves 192 so as to engage the threaded neck 332 on a parison 70, permits the mold to be partially closed as shown in FIGS. 55 and 56 so that the neck rings 196 clamp a parison 70 to allow stretching of the parison before the mold halves 192 are completely closed. The neck rings 196 are mounted in close proximity to the lower side of the mold halves 192 so as to provide a sliding fit therebetween. The spring plates 328 function as guides for the studs 329 which in turn provide guidance to the neck ring carrier members 320.

The mold halves 192 are locked in the closed blow molding position by a mold latch, generally indicated by the numeral 333 in FIGS. 27, 28, 30 and 31. As best seen in FIG. 27, the mold latch 333 includes a pair of vertically spaced apart mounting brackets 334 which are secured to the front side of one of the mold halve carriers 226 by a plurality of suitable machine screws 335. As illustrated in FIG. 30, each of the mounting brackets 334 includes an outwardly extended bracket extension 336 which is disposed over the meeting lines between the two mold halve carriers 226. Each of the bracket extensions 336 is provided with a vertical slideway 337 which extends therethrough. Each of the slideways 337 is enclosed by a cover plate 338 which is secured in place by suitable machine screws 339.

As best seen in FIGS. 27 and 28, a latch bolt 342, having a rectangular cross section, is slidably mounted through the slideways 337 formed in the two bracket extensions 336. The upper end of the latch bolt 342 has a reduced cross section to form a cam follower carrier arm 343. Rotatably mounted on the upper end of the cam follower carrier arm 343 in a suitable cam follower 344. The latch bolt 342 is adapted to be operatively engaged with mating latch structure carried on the other mold halve carrier 226.

As shown in FIG. 27, a latch plate 345 is secured by suitable machine screws 346 to the other mold halve carrier 226, and with one side extended over the centerline between the two mold halve carriers 226. As shown in FIGS. 27 and 28, the latch plate 345 has a pair of integral, vertically spaced and forwardly extended square lugs 347, formed along the left side thereof, as viewed in FIG. 27. The lugs 347 are disposed in alignment with the slideways 337 and also in alignment with the left half of the latch bolt 342, as viewed in FIG. 27. The latch bolt 342 is adapted to coact with the lugs 347, when the latch bolt is in the position shown in FIGS. 27 and 28, to lock the latch plate 345 to the brackets 334 so as to lock the two mold halves 226 together during a molding operation. As shown in FIG. 27, the latch bolt 342 is provided with a pair of vertically spaced apart transverse slots 348 which are formed through the rear side thereof, as illustrated in FIGS. 28 and 30. As viewed in FIG. 27, the latch bolt 342 is also provided with a vertical slot 349 on the left side thereof, and along the rear face thereof, which communicates with the transverse slots 348, and which terminates at the point indicated by the numeral 350 in FIG. 27. It will be seen, that when the latch bolt 342 is in the position shown in FIGS. 27 and 28, the mold halve carriers 226 are locked together, because the lugs 347 are locked by the bolt 342 from movement to the right, as viewed in FIG. 27. Locking faces of bolt 342 and latch plate 345 are formed on a slight wedging angle, producing preloading between the mold halves, when locked up to prevent mold separation during blowing cycle. When the latch bolt 342 is lifted upwardly to a position to align the transverse slots 348 with the lugs 347, then the mold halve carriers 226 can be swung to an open position. The cam means for raising and lowering the latch bolt 342 is described hereinbelow.

The latch bolt or bar 342 is the closed position shown in FIGS. 27 and 28 during the blow molding portion of the cycle. As viewed in FIG. 22, when a molding station 13 on the molding rotary turret 14 approaches the cams 248 and 310 it also approaches a cam generally indicated by the numeral 351 which functions as a cam for moving the latch bar 342 upwardly to the unlocked position to permit the mold halves 226 to be swung to the open position.

As shown in FIG. 21, the latch bar up cam 351 is fixedly secured by suitable means to a support bracket 352 which is carried on the bridge post 307. The cam 351 is provided with a suitable cam track 354 which operatively engages the cam follower 344 and functions to lift the latch bar 342 upwardly. The cam 351 may be adjusted upwardly and downwardly on the bracket 352 by means of suitable shims 353.

As shown in FIG. 27, when the latch bar 342 is raised to the unlocked position, a suitable ball detent means 370 is adapted to operatively engage a recess 371 formed on the right side of the latch bar 342, as viewed in FIG. 27, and retain the latch bar 342 in the raised unlocked position. The detent means 370 is carried in the upper bracket extension 336.

The latch bar 342 remains in the raised unlocked position as the molding rotary turret 14 turns counterclockwise past the ejection means 17 and commences a new rotary cycle. As shown in FIG. 22, a latch bar down cam, generally indicated by the numeral 355, is located adjacent the travel path of each of the molding stations 13. The latch bar 342 is still in an open position at the 75° point in the rotary travel of molding station 13. However, when a molding station 13 reaches the 82° point in travel, then the latch bar down cam 355 is operative to engage the cam follower or roller 344, and cam the latch bar 342 downwardly again to the locked position shown in FIG. 27.

FIG. 25 shows the details of the latch bar down cam 355. As shown in FIG. 25, the latch bar down cam 355 is operatively mounted on a bracket 356 which is fixedly supported on a horizontal angle bar 357 (FIG. 22) that is supported between the vertical bridge post 309 and a vertical post 358 which has its lower end fixed to the turret base 173. As shown in FIG. 25, the cam means 355 includes a bar cam 359 having the lower surface 360 formed as a cam track for engaging the cam follower 344. The leading end of the cam 359 is pivotally mounted by a suitable pivot pin 361 on the bracket 356. The trailing or exit end of the cam 359 is spring biased downwardly. The rear end of the cam 359 is pivotally mounted by a suitable pivot pin 362 on a bracket 363 to which is fixed a spring rod 364. The rod 364 extends through a suitable hole in a horizontally disposed plate 366 fixed on the upper end of the bracket 356. The spring rod 364 is provided on the upper end with a pair of lock nuts 365 to limit the downward movement of the rod 364. A suitable coil spring 367 is mounted between the lower side of the plate 366 and the upper side of the bracket 363. It will be seen that the spring biased cam 359 functions to bias a lock bar 342 downwardly as a molding station 13 passes thereby.

Figure 13:
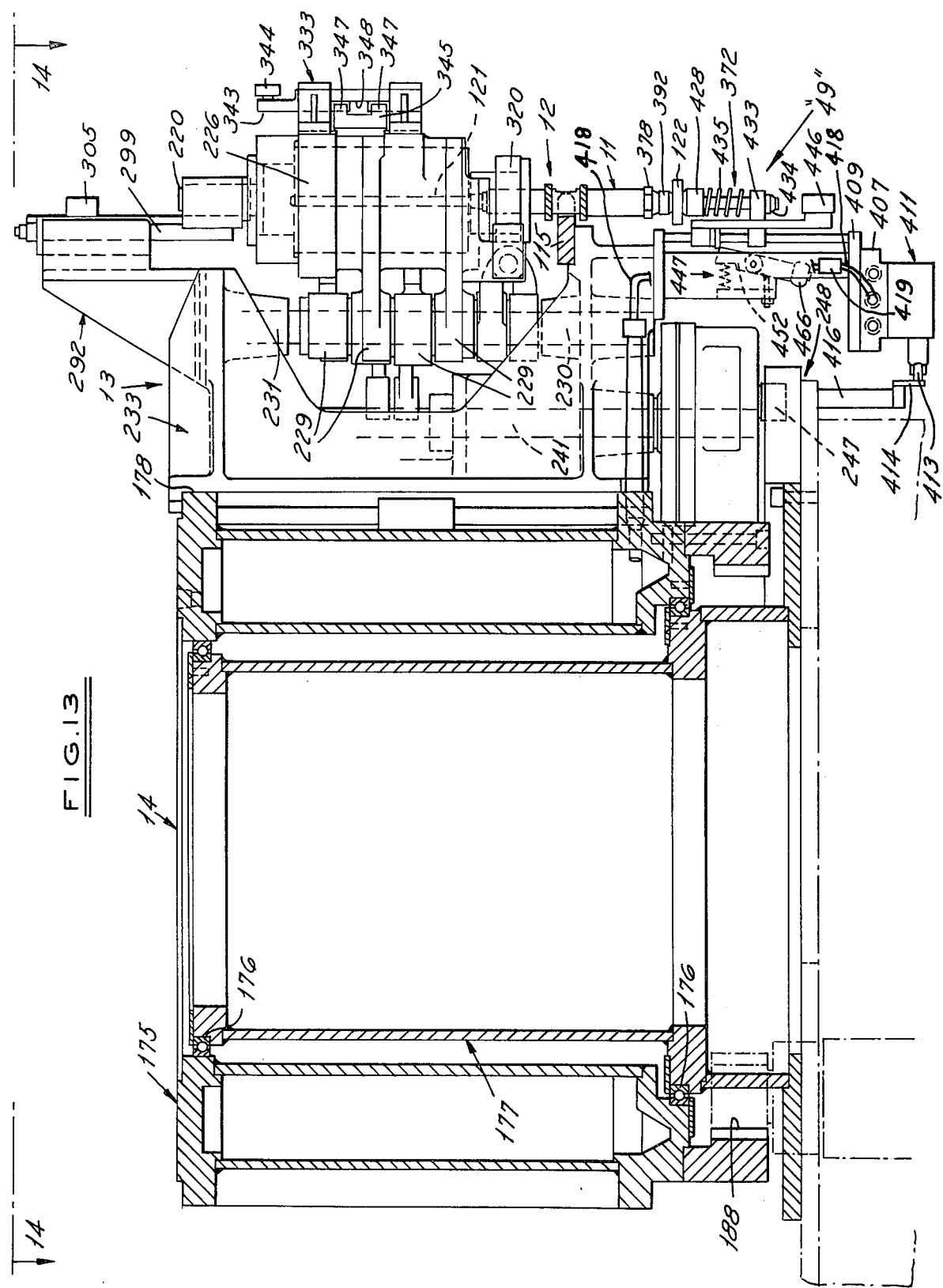
FIG. 13 is a fragmentary, enlarged, elevational, section view of the structure illustrated in FIG. 2, taken substantially along the line 13—13 thereof, and looking in the direction of the arrows.

As shown in FIGS. 4 and 13, each of the molding stations 13 on the molding rotary turret 14 is provided with a stretch pin actuator means, generally indicated by the numeral 372, which will be described in detail hereinafter, after the description of the stretch pin means 11.

Stretch Pin Means

As shown in FIG. 45, the stretch pin means 11 includes the stretch pin body 80 through which is longitudinally and slidably mounted the stretch pin 121. The upper end of the stretch pin 121 is slidably mounted in a longitudinal bore 373 of an air nozzle 374, which also functions as a bushing for the upper end of the stretch pin 121. The lower end of the stretch pin 121 is slidably supported in a bore 375 formed longitudinally through a suitable bushing 376 which is threadably mounted in the threaded hole 377 formed in the lower end of the tubular body 80. The bushing 376 is adjustably secured longitudinally in the body 80 by a lock nut 378. A stop flange 379 is formed integrally on the stretch pin 121 to limit the downward movement by gravity of the stretch pin 121 in the stretch pin body 80.

The aforedescribed stretch pin cam means 120 moves the stretch pin 121 downwardly in the body 80 until the stop collar 379 engages the upper end of the bushing 376. It will be seen that the initial lowered position of the stretch pin 121 is thus determined by the position of the flange 379 on the stretch pin 121, as well as the relative position of the bushing 376 in the stretch pin body 80.

As shown in FIGS. 45 and 54, the upper end of the air nozzle 374 extends upwardly beyond the upper end of the stretch pin body 80, and it is provided with a conical upper end surface 382 which functions as a bushing for guiding an inverted parison 70 downwardly over the upper end of the stretch pin 121 when the parison is loaded on the stretch pin 121, as the stretch pin passes around the parison loading rotary turret 10.

The conical upper end surface 382 terminates at its lower end in a radial flange 383 which limits the downward movement of the air nozzle 374 in the stretch pin body 80. The upper surface 384 of the flange 383 also forms a shelf or seat for the threaded end 332 of a parison 70.

As shown in FIG. 45, a suitable seal means 385 is operatively mounted in the air nozzle 374 for slidable sealing engagement with the outer surface of the stretch pin 121. As shown in FIG. 46, a retainer hairpin lock, generally indicated by the numeral 386, releasably secured the air nozzle 374 in position in the upper end of the stretch pin body 80. The hairpin lock 386 includes a straight leg portion 387 which is adapted to pass through a hole 388 (FIG. 45) formed by a pair of arcuate recesses which are horizontally aligned and formed on the outer surface of the air nozzle 374 and the inner surface of the stretch pin body 80, respectively. The retainer hairpin lock 386 also includes a curved leg portion 389 which is adapted to be seated in a peripheral arcuate recess 390 (FIG. 45), formed around the outer periphery of the stretch pin body 80.

FIG. 34 shows a stretch pin means 11 moved by the transfer means 12 and in engagement with the circular sprocket 115 on the molding rotary turret 14. It will be seen that the sprocket 115 is secured to the plurality of molding station housings 233 by suitable machine screws 391.

As shown in FIG. 45, a cylindrical block 392 is secured together with the block 122 and intermediate shims 393 to the lower end of the stretch pin 121, by a suitable machine screw 394. The block 392 functions as a stop member for engagement with the lower end 395 of the bushing 376. The distance between the upper end of the stop block 392 and the lower end 395 of the bushing 376 governs the total upward travel of the stretch pin 121 into a parison 70 for a stretching operation. In one embodiment, this travel amounted to four inches.

As shown in FIGS. 45 and 46, the upper end of the stretch pin body bore 373 is enlarged to form an enlarged bore 398 so as to provide an annular passage 399 for the admission of blow air into the parison 70 for blowing the same into a finished article, as indicated by the bottle 397 in FIGS. 45 and 58. As shown in FIG. 45, the lower end of the annular passage 399 communicates with four cross drilled holes 400 that communicate with a second, outer annular passage 401. As shown in FIG. 45, the annular passage 401 communicates through an opening 402 in the side wall of the stretch pin body 80 with a passage 403 formed in a fitting 404 carried in one of the ring neck clamps 320. The fitting 404 is provided with suitable annular sealing means around the passage 403 for engagement with a stretch pin body 80 when it is in the position shown in FIG. 45. The passage 403 in the fitting 404 communicates with a passage 405 formed through a fitting 406 mounted in a suitable opening in said neck ring carrier 320.

The fitting 406 at each of the molding stations 13 is adapted to be supplied with suitable blow air from a manifold 407 (FIG. 49) carried on the lower end of each of the stretch pin actuator means 372 at each of the molding stations 13. As shown in FIG. 52, each of the manifolds 407 is fixed by suitable machine screws 408 to the lower side of a plate 409 that forms part of each of the stretch pin actuator means 372. As shown in FIG. 13, each of the blow air manifolds 407 is supplied through suitable conduits 418, and shut off and vent valve means 419 that are connected to supply conduits 410. The conduits 418 are connected to a surge tank which is supplied by conduits such as 410, FIG. 2. The conduits 410 are connected to the rotary manifold 201 and thence to a suitable source of blow air. As shown in FIGS. 49 and 52, the blow air manifold 407 is operatively connected to a suitable flow control valve 411 for controlling the flow of air from the manifold 407 to the stretch pins 121.

As shown in FIG. 49, the blow air flow control valve 411 is provided with a valve operative shaft 412 which is spring biased outwardly and which carries a cam follower in the form of a roller 413 that operatively engages a circular cam 414. The circular cam 414 is illustrated in FIGS. 4 and 22. As shown in FIG. 24, the circular cam 414 is secured by suitable machine screws 415 to a plurality of vertically disposed support arms 416 which are secured by machine screws 417 to the molding rotary turret pedestal structure 177.

As shown in FIG. 22, the cam follower 413 on each of the flow control valves 411 is adapted to operatively engage the circular cam 414 at the 90° point in counterclockwise travel, as viewed in FIG. 22, to initiate the blowing of a parison 70 into a bottle 397. The admission of blow air is continued throughout the rotary travel until the 293° point in the rotary travel of the particular molding station 13 is reached, after which the cam follower 413 rides off of the circular cam 414 and admission of blow air is stopped and the bottle 397 is vented.

The stretch pin 121 is supplied with transfer air for ejecting a finished article 397 from a stretch pin 121 by the following described structure. As shown in FIG. 45, the stretch pin body 80 is provided with a transfer air inlet port 420 which communicates with an enlarged bore 421 in the stretch pin body 80 through which the stretch pin 121 passes. Transfer air is admitted to the inlet port 420 at one of the three stations of the ejection means 17 as described in detail hereinafter. The transfer air passes from the port 420 into the bore 421, and thence downwardly and through four cross drilled holes 422 in the stretch pin 121 and into an axial passage 423. The transfer air flows upwardly through the axial passage 423 of a stretch pin 121 and past a ball check valve 424 and out through four upwardly sloping passages 425 and into the finished article 397 for ejecting the same from a stretch pin 121. It will be seen that the passages 425 have an inner sloping surface of approximately 9° relative to the centerline axis of the stretch pin 121. The ball check valve 424 restricts passage of the blow air outwardly through the axial passage 423 during an article blowing operation.

Stretch Pin Actuator Means

FIG. 13 shows a stretch pin 121 in the fully raised position for a blow molding operation. FIG. 45 shows a stretch pin 121 in the initial or lowered position for receiving a fresh parison 70, and for moving the same into one of the molding stations 13 on the molding rotary turret 14. The stretch pin actuator means includes a spring pressure means adapted to engage the lower side of the stretch pin block 122, as shown in FIG. 49. The spring pressure means includes a cylindrical lift block 428, which is provided with a stepped bore therethrough, comprising the bores 429 and 430. Slidably mounted in the larger bore 429 is the head 432 of a shaft 431. Shaft 431 slidably extends down through the smaller bore 430 and has its lower end seated in a suitable bore in a carrier bar 433. The lower end of the shaft 431 is secured in place by a suitable lock nut 434. A coil spring 435 is operatively mounted between the upper face of the carrier bar 433 and the lower face of the lift block 428. It will be seen that the lift block 428 is vertically movable on the shaft 431, and that the spring 435 provides a controllable upward spring pressure or bias on the stretch pin 121. The aforedescribed spring pressure means compensates for errors and tolerances in initial assembly and alignment of the actuator means 372.

As shown in FIGS. 49 and 50, the carrier bar 433 is fixedly mounted, as by welding, on a cam carrier bar 439. The bar 439 is fixedly connected, as by welding, to a pair of vertically spaced apart, horizontal bars 440 and 441. As shown in FIGS. 49 and 50, each of the horizontal bars 440 and 441 is slidably mounted on a pair of vertically disposed, laterally spaced apart, slide shafts 443 by means of suitable bushings 442. As shown in FIG. 50, the upper ends of the slide shafts 443 are fixedly secured in a mounting plate 444 that is fixed, by any suitable means, to the lower end of the respective molding station housing 233. The lower ends of the slide shafts 443 are fixedly connected by any suitable means to the plate 409. As shown in FIG. 49 and 50, a cam follower roller 466 is rotatably mounted on the lower end of the cam carrier bar 439. The bars 439, 440, and 441 form a slide that carries the cam follower 446 and the aforedescribed spring pressure means for lifting a stretch pin 121.

FIGS. 56 through 58 show a stretch pin 121 in the fully raised blow molding position. FIG. 13 shows a stretch pin 121 maintained in the raised position by means of a spring biased latch means, generally indicated by the numeral 447. FIG. 49 shows the latch means 447 in the process of being disengaged from a stretch pin cam actuator slide structure to permit downward movement of the stretch pin 121 back to its initial position.

As shown in FIGS. 49 and 50, the slide latch means includes a striker plate 448 which is horizontally mounted on the lower side of the upper slide bar 440 by a pair of suitable machine screws 449 and shims 450. The shims 450 permit the adjusting of the plate 448 upwardly or downwardly to a desired position to control the pressure of spring 435 on a stretch pin 121. As shown in FIG. 49, the underside of the striker plate 448 is adapted to be engaged by the upper end 451 of a pivotally mounted slide latch 452.

As shown in FIGS. 49 and 51, the slide latch 452 is suitably mounted on a horizontal pivot pin 453 which is pivotally mounted between the vertical, laterally spaced apart support plates 454 and 455. The lower ends of the plates 454 and 455 are fixed, as by welding, to the plate 409. The upper ends of the plates 454 and 455 are fixed, as by welding, to the plate 444. The lower ends of the plates 454 and 455 are provided with cut-outs on the rear sides, as indicated by the numerals 456 and 457, respectively. Pivot pin 453 is pivotally supported in suitable bearings in a pair of journals 458 which are fixed to the inner sides of the plates 454 and 455.

As best seen in FIG. 49, the slide latch 452 is normally biased clockwise to bring the upper edge 451 under the striker plate 448 by means of a suitable coil spring 463 which is operatively mounted on a horizontal pair of aligned, spaced apart spring rods 462. One of the spring rods 462 is mounted in a suitable bore in the rear upper face of the slide latch 452 and the other spring rod 462 is operatively mounted in a suitable bore in a vertical retainer plate 461 which is fixedly secured between the two vertical support plates 454 and 455 (FIG. 51). As shown in FIG. 49, the clockwise movement of the slide latch 452 is limited by a stop member comprising a threaded rod 464 which is threadably mounted through the plate 461 and secured in an adjusted position by a lock nut 465. A cam follower, in the form of a roller 466, is operatively mounted on the lower end of the slide latch 452 for camming the slide latch 452 in a counterclockwise direction, as viewed in FIG. 49, to release the slide latch from under the striker plate 448.

The slide latch 452 holds the slide structure carrying the stretch finger spring pressure means in the raised position, as shown in FIG. 13, during a blow molding operation. As viewed in FIGS. 21 and 22, a horizontal cam 467 is operatively mounted on the rotary turret pedestal structure 177 by suitable support brackets 468. The cam follower 466 engages the outer edge or cam track 469 when a molding station 13 carrying a cam follower 466 passes by the cam 467. It will be understood from the structure of FIGS. 22 and 49 that as the molding rotary turret 14 continues its counterclockwise rotation that the cam roller 466 will be moved radially outward to pivot the slide latch 452 in the counterclockwise direction to release the upper end 451 from under the striker plate 448 and permit the slide structure carrying the stretch pin spring pressure means and the cam follower 446 to move downwardly. The cam follower 446 and its slide structure and stretch pin spring pressure means come under the control of a cam, generally indicated by the numeral 470 in FIGS. 21 and 22, immediately prior to the engagement of the latch cam follower 466 with its cam 467. The cam 470 is supported by suitable brackets 482 on the turret base 173.

As shown in FIG. 21, the cam 470 is provided with an upper surface or cam track 471 that is formed to a desired shape for controlling the movement of the cam follower 446 and its associated structure. When the latch cam follower 466 functions to release the slide structure carrying the stretch finger spring pressure means, the cam follower 446 then takes over to control the upward and downward movement of such stretch pin actuating structure. As viewed in FIG. 21, the cam track 471 is curved downwardly, as indicated by the numeral 471a so as to lower the stretch pin actuating structure and permit the stretch pin 121 to be lowered in the respective molding station passing by the cam 470. The cam track portion 471a has a separate cam 470a positioned thereover for positive retention of the cam roller 446 between the cams 470 and 470a. The numeral 446a in FIG. 49 indicates the broken line lowered position of the cam follower 446 when it is on the lowered cam track portion 471a.

As a molding station 13 passes the ejection means 17, the proceeds in its rotary travel, as viewed from FIG. 22, a new parison 70 is brought to the molding station at the appropriate time and the stretch pin 121 carrying the new parison 70 is moved upwardly by the last described stretch finger actuating means. When the last mentioned molding station 13 reaches the approximate 40° point in its travel, as viewed in FIG. 22, the stretch pin actuator cam follower 446 comes in contact with the upper face or cam track 473 of a pivotally mounted cam track cam 472(FIG.26). As shown in FIG. 26, the cam 472 is pivotally mounted at its leading end on a suitable pivot pin 474. The trailing end of the cam 472 has fixedly connected thereto a lift bracket 475 to which is pivotally mounted the outer end of a cylinder rod 476 by a suitable pivot pin 477. The cylinder rod 476 is operatively mounted in a suitable fluid cylinder 478 which has its lower end pivoted on a suitable pivot pin 479 which is carried on the upper end of a threaded rod 480. The rod 480 is secured in place on the rotary turret base structure 173 by a suitable lock nut 481.

It will be seen, that by controlling the operation of the cylinder 478, the stretch pin actuator cam follower 446 engaging the upper cam track 473 will be raised upwardly to raise the stretch pin 121 in the particular molding station 13 passing thereover. It will be seen that a stretch pin 121 can be raised at a predetermined time and to a predetermined level and with a predetermined mechanical pressure, as determined by the configuration of the controlling cams 470 and 472 and adjustments of the aforedescribed slide structure by means of the shims 450, and the adjustment of the spring pressure exerted by the spring 435. The cam follower 446 brings a stretch pin 121 upwardly into the desired position, and the latch 452 is biased into a holding position when a stretch pin 121 is raised by the cam 472. When the cam follower 446 rides off of the cam 472, the slide structure carrying the cam follower 446 drops downwardly a slight distance, as 1/16, inches against the latch end 451 to relieve the mechanical pressure on the stretch finger 121, without losing contact between the parison on the stretch finger and the mold end plug 194 which has been moved downwardly to meet the parison. The parison is maintained in a passive clamped position, as shown in FIG. 55, when the latch 452 is biased by the spring 463 into the slide holding position, and the slide structure is dropped downwardly a slight amount to relieve the pressure on the parison against the mold plug 194. The control of this pressure is provided by controlling the aforedescribed cam configurations, shims, and spring pressure. The parison 70 is held in axial alignment in the mold, and the mold is then closed and a blow molding operation can be commenced when the mold latch bar 342 is locked at the 82° point in travel, as viewed in FIG. 22. By proper use of the shims 450, the pressure of a stretch pin finger 121 on a parison and against a mold plug 194 can be controlled so that the contact between the parison 70 and the mold plug 194 is merely a touch contact without any positive pressure. It will be seen that there is no positive preloading on a parison 70. The weight of the mold plug 194 is restricted by the cam 310 so that it cannot overtravel downwardly beyond a certain predetermined point.

As shown in FIG. 15, a safety switch means is provided at about the 227° point in the rotary travel of a molding station 13. The safety means comprises a microswitch 490 operatively connected with controls for the machine, and operative to shut down the entire machine if the switch is operated by a lowered stretch pin which is not at its proper elevation. As shown in FIG. 16, a plate 485 is swingably positioned along the rotary travel path of the molding stations 13, and it is adapted to be engaged by a stretch finger block 122 if the block is in an undesired lowered position instead of its usual raised operative position. The plate 485 is fixedly supported on a vertical pivot shaft 486 which is pivotally mounted on a support bracket 487. The bracket 487 is supported on a post 488 which is operatively mounted on the molding turret base 173. The shaft 486 carries on its upper end a switch operator 489 for operating the safety switch 490.

Ejection Means

Figure 59:
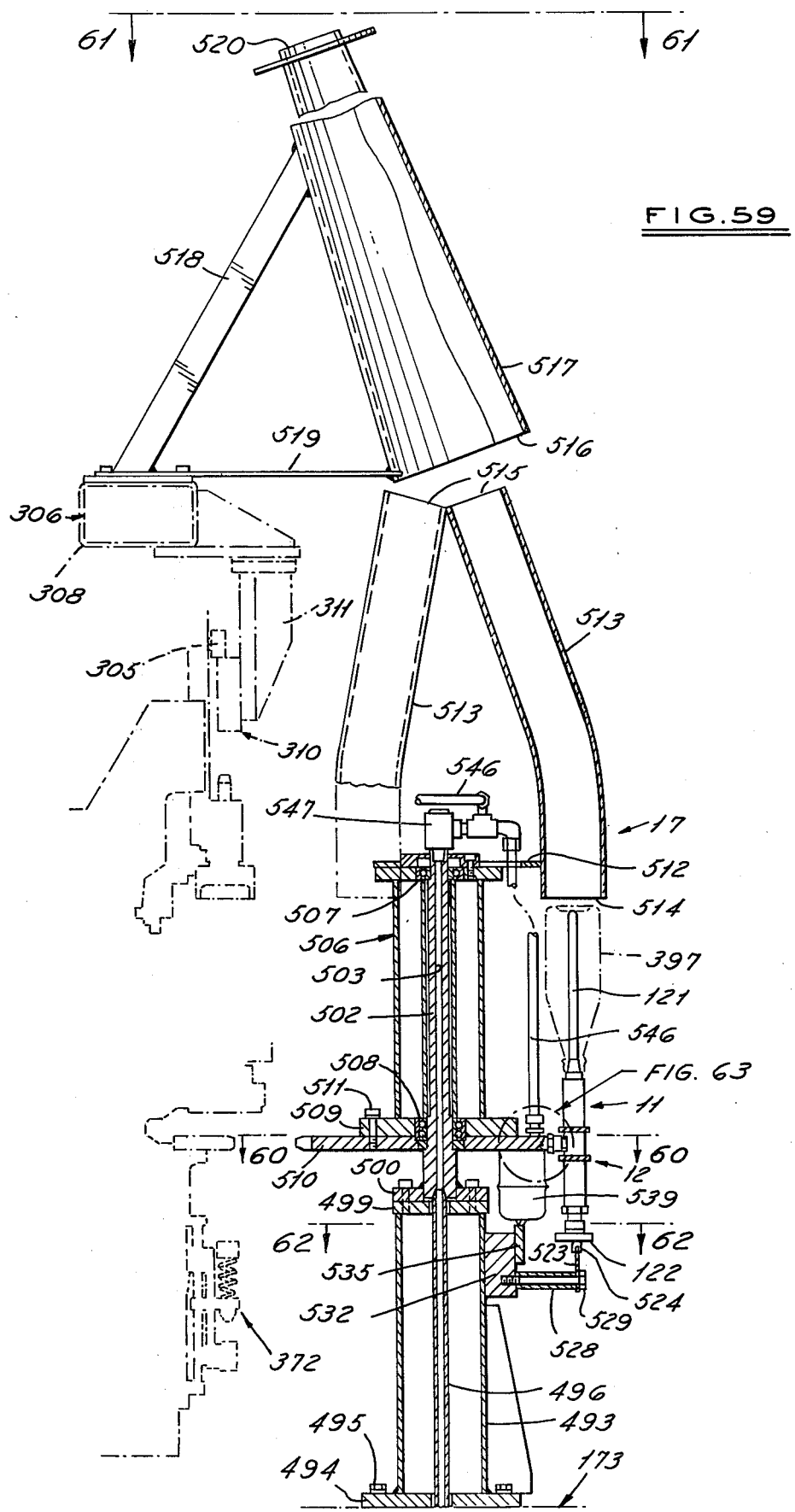
FIG. 59 is a fragmentary, enlarged, elevational section view of the structure illustrated in FIG. 2, taken along the line 59—59 thereof, and looking in the direction of the arrows.

As shown in FIG. 2, the transfer chain 12 conveys the stretch finger assemblies 11 carrying finished articles away from the molding transfer rotary turret 14 and into operative engagement with an ejection means generally indicated by the numeral 17. As shown in FIGS. 18 and 59, the ejection means 17 includes a fixed column 493 which is fixed on a plate 494 that is secured to the molding turret base 173 by suitable machine screws 495. A transfer air supply tube 496 extends upwardly through the bores 497 and 498 formed through the base structure 173 and the plate 494, respectively. The tube 496 is connected to a suitable source of pressurized transfer air. As shown in FIG. 59, a cover plate 499 is fixed on the top of the column 493 and has attached thereto a plate 500 by machine screws 501. A fixed vertical shaft 502 is fixed, as by welding, to the plate 501. The shaft 502 is provided with an axial passage 503 that communicates with the transfer air supply tube 496.

A rotary turret, generally indicated by the numeral 506, is rotatably mounted on the shaft 502 by suitable bearing means 507 and 508. The turret 506 includes a lower circular plate 509 to which is fixedly connected a chain sprocket 510 by suitable machine screws 511.

Figure 61:
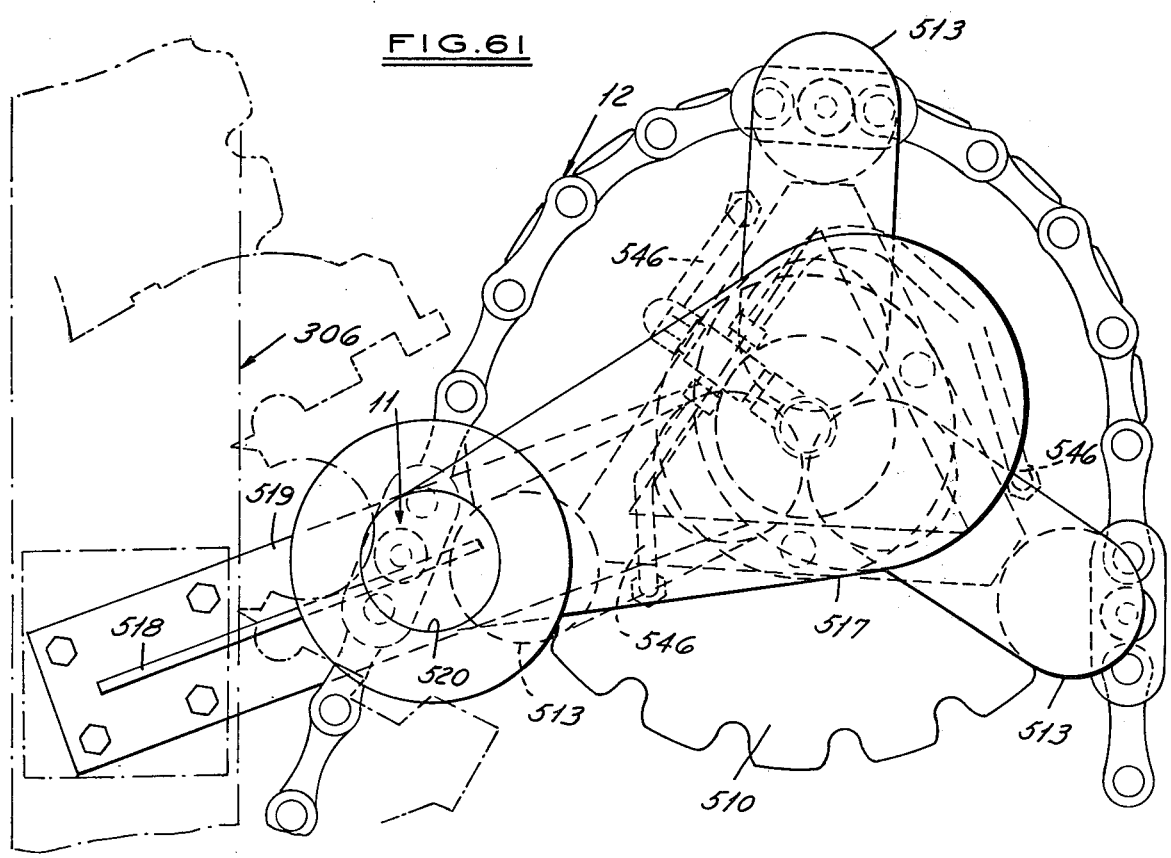
FIG. 61 is a fragmentary, top plan view of the structure illustrated in FIG. 59, taken along the line 61—61 thereof, and looking in the direction of the arrows.

As shown in FIG. 59, the rotary turret 506 carries a fixed plate 512 on the upper end thereof to which is fixedly secured, as by welding, three transfer chutes 513 (FIG. 4) which are spaced about the rotary turret 506 at evenly spaced positions approximately 120° apart (FIG.61). The lower ends of the chute 513 are opened, as indicated by the numerals 514, (FIG. 59) and they are each positioned over an article ejection station on the sprocket 510, as explained more fully hereinafter. The upper ends 515 of each of the transfer chutes 513 is open. As shown in FIG. 59, the transfer chute upper ends 515 converge at the open lower end 516 of an upwardly directed funnel chute 517. The funnel chute 517 is supported by braces 518 and 519 on the bridge structure 306. The upper end 520 of the converging funnel-shaped chute 517 is open and it is adapted to direct an article to a succeeding article processing machine, as a transfer conveyor or the like.

As shown in FIG. 4, the ejection means 17 includes a slide rail 523 which has its leading edge adjacent the point where the transfer chain 12 moves the stretch pin assemblies 11 away from the molding rotary turret 14. The slide rail 523 is provided with a U-shaped slip strip on the upper edge thereof, as shown in FIG. 59. As shown in FIG. 59, the stretch pin blocks 122 on the lower ends of the stretch pins 121 are slidably engageable with the upper side of the slip strips 524 (FIG. 64), as the stretch pin assemblies 11 are conveyed around the ejection means 17.

As shown in FIG. 62, the slide rail 523 has its leading portion attached by a machine 527 to a support block 526 which is fixed to a support arm 525 carried by the fixed column 493. Two other support arms 528 fix the middle and discharge portions of the slide rail 523 to the column 493 by suitable machine screws 529. The leading end of the slide rail 523 is indicated by the numeral 530 and the discharge end is indicated by the numeral 531. As shown in FIG. 59, each of the support arms 528 is fixed by the machine screws 529 to a block 532 which is secured, as by welding, to the column 493.

As shown in FIG. 62, a circular cam segment, generally indicated by the numeral 535, is fixedly supported around the column 493. As shown in FIG. 66, the cam 535 is supported at two points by a machine screw 536 to the support blocks 532. As shown in FIG. 62, the cam 535 is further supported by additional support arms 537. As shown in FIG. 66, the cam 535 is rollably engaged by the cam roller 538 of each of three transfer air valves 539. Each of these transfer air valves 539 is evenly spaced about the sprocket 510 and is fixedly secured to the underside thereof by any suitable means. The transfer air valves 539 are disposed 120° apart so as to coact with each of the transfer chutes 513. The three valve cam rollers 538 are illustrated in FIG. 62 to show their rotary spaced positions.

As shown in FIG. 63, each of the transfer air valves 539 is operatively connected with a pair of air passages 540 and 541 in the sprocket 510. The passages 540 and 541 communicate with a passage 543 in a fitting 542. The outer end of the fitting 542 is provided with an annular seal 544 which is adapted to engage against the reduced portion 81 of a stretch pin body 80 and around a transfer air inlet port 420 for admitting transfer air into passage 421. Each of the transfer air valves 539 is supplied with transfer air through a conduit 546 which is attached by a fitting 545 to a passage 548 in the sprocket 510. The passage 510 communicates with the valve 539. As shown in FIG. 59, the transfer air of conduit tubing 546 is operatively connected to a rotary fitting 547 which is operatively mounted on the upper end of the shaft 502 and communicates with the passge 503.

Figure 60:
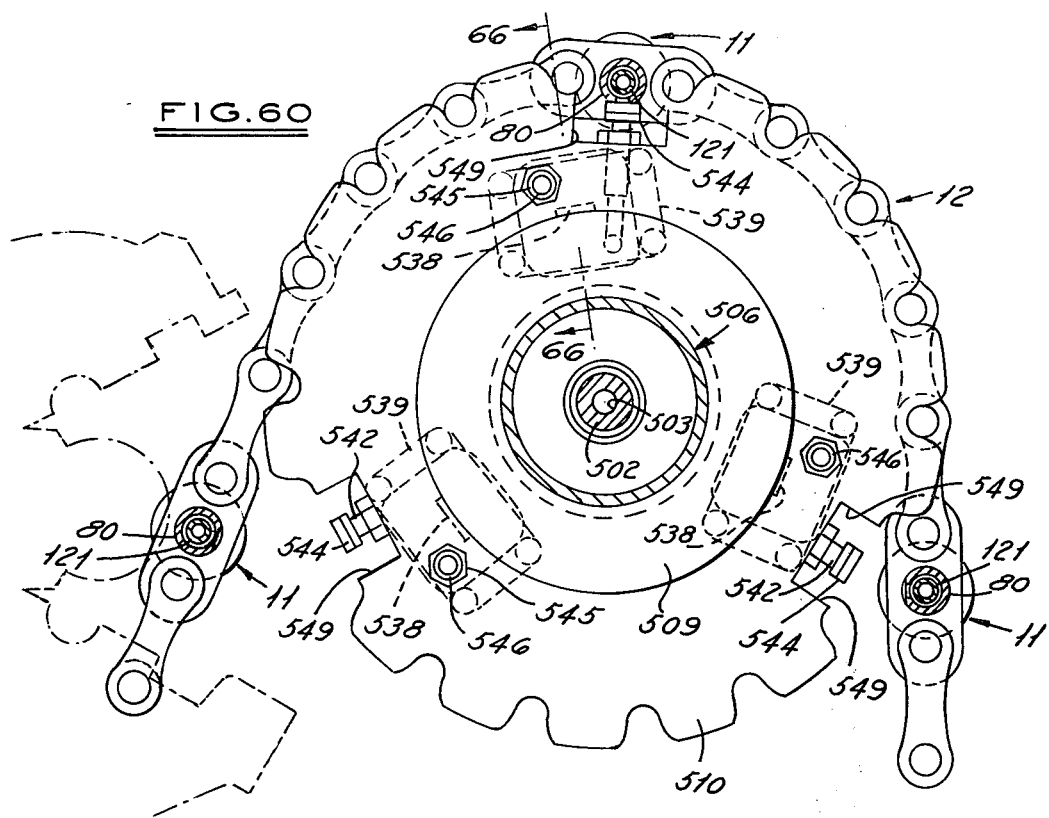
FIG. 60 is a fragmentary, enlarged, horizontal section view of the structure illustrated in FIG. 59, taken along the line 60—60 thereof, and looking in the direction of the arrows.

As illustrated FIGS. 60 and 61, when the transfer chain 12 conveys a stretch pin assembly 11 from the molding rotary turret 14 to the transfer means 17, one of the transfer air valves 539 is arranged so as to be positioned with its respective fitting 542 disposed adjacent the transfer air inlet port 420 of the stretch pin assembly 11. As shown in FIG. 60, the sprocket 510 is provided with three notches 549 in which are received the stretch pin assemblies. FIG. 61 shows that the transfer chutes 513 are also positioned to coact with the transfer air valves 539. As the stretch pin assemblies 11 are conveyed around the ejection means 17 by the sprocket 510, the air valve cam rollers 538 pass over a raised portion 534 of the cam 535 (FIG. 65), for a rotary distance of about 40° during which time pressurized transfer air is admitted through the respective valve 539 so as to blow off the finished article 397 upwardly through the respective chute 513 and into the chute 517. The chute 517 may also be provided with a vacuum to ensure passage of the finished article 397 through the chute 517 to a succeeding processing operation.

Operation

In use, the power drive means 189 rotates the molding rotary turret 14 and drives the transfer chain 12, which in turn drives the parison loading rotary turrent 10. As the transfer chain 12 moves a stretch pin assembly 11 onto the parison loading rotary turrent 10, the stretch pin assembly is disposed under one of the loading chutes 40. As each stretch pin assembly 11 moves under the parison loading position 77, it has a parison 70 loaded into its stretch pin 121. Continued movement of the transfer chain 12 moves the parison loaded stretch pin assembly 11 around the input idler means 91 and into operative location in one of the molding stations 13. The sprocket 115 on the molding rotary turret 14 locates a stretch pin assembly 11 in each molding station 13. The stretch pin 121 is then moved upwardly by the aforedescribed stretch pin actuator means so as to stretch the parison thereon until it engages the mold end plug 194, as shown in FIG. 55.

Continued rotary movement of the turret 14 then causes the mold end plug 194 to be moved to the position shown in FIG. 56 and the stretch pin 121 to the position shown in FIG. 56. The stretch pin finger 121 is then held in the elevated position by the spring biased latch 452 and the mold halves 192 are moved to their closed positions, as shown in FIG. 57. The blow air is then actuated at the 92° point of rotary movement of the molding rotary turret 14, and the blowing continues until the 293° point of the rotary movement. The blowing action blows the parison 70 outwardly into the final formed article 397, as shown in FIG. 58. Continued movement of the particular modling station 13 then causes the mold to open, and the particular stretch pin assembly 11 to be moved to the ejector means 17, where the finished article 397 is ejected, as described hereinbefore. The stretch pin assembly 11 then continues on through the cam means 120 which moves the stretch pin 121 downwardly to the initial parison receiving position, and the stretch pin assembly is moved to the parison loading position 77 for another cycle.

It will be seen that as a stretch pin assembly 11 moves around the molding rotary turret 14 that the parison 70 carried thereon is stretched, blown, chilled and finally ejected from the machine by the ejection means 17. It will also be seen that the apparatus of the present invention is constructed and arranged so that the molding structure does not chill a parison 70 until after it is stretched. By capturing and contacting the parison 70 at the lip portion only, the walls of the parison are not cooled until they are stretched, which results in a more uniform wall thickness in the resultant product 397.

While it will be apparent that the preferred embodiment of the invention herein disclosed is well calculated to fulfill the objects above stated, it will be appreciated that the invention is susceptible to modification, variation and change.

We claim:

1. In a continuous motion stretch blow molding apparatus for blow molding hollow articles from preheated tubular parisons at orientation temperature having one open end and one closed end, the combination comprising:
   (a) a continuous motion parison transfer means;
   (b) a plurality of upwardly disposed stretch pin means carrying said open ends of said parisons in a fixed plan of travel and operatively carried on said transfer means;
   (c) a continuous motion rotary parison loading turret for receiving preheated parisons and for sequentially loading them onto said stretch pin means including:
      (i) a parison loading station; and
      (ii) a plurality of parison loading chutes operatively mounted on the rotary parison loading turret, each of said loading chutes arranged to be disposed over one of said stretch pin means and movable under said parison loading station for receiving a parison and loading the parison onto the stretch pin means disposed thereunder;
   (d) means synchronized with the movement of said chutes for sequentially dropping parisons into the chutes;

(e) a continuous motion rotary molding turret having a plurality of molding stations; and (f) said transfer means being operative to locate each of said stretch pin means with a parison loaded thereon in an individual one of said molding stations for a stretching, blowing and cooling operation on each parison on each stretch pin means to form an article from each parison.

2. A continuous motion stretch blow molding apparatus as defined in claim 1, wherein:

(a) each of said loading chutes is formed with an arcuately shaped front wall which guides a parison received by the chute at said loading station and directs the parison downwardly onto a stretch pin means.

3. A continuous motion stretch blow molding apparatus as defined in claim 2, wherein:

(a) said arcuately shaped chute front wall is parabolically shaped.

4. A continuous motion stretch blow molding apparatus as defined in claim 1, wherein:

(a) each of said loading chutes in gun-holstered shape in side elevation.

5. A continuous motion stretch blow molding apparatus as defined in claim 1, wherein:

(a) each of said loading chutes is adjustably mounted on said parison loading turret.

6. A continuous motion stretch blow molding apparatus as defined in claim 1, wherein:

(a) said continuous motion transfer means includes a chain means and means for operatively mounting said plurality of stretch pin means in predetermined positions therealong.

7. A continuous motion stretch blow molding apparatus as defined in claim 6, wherein:

(a) said rotary parison loading turret includes a chain sprocket having locating means engageable with each of said stretch pin means for positioning a stretch pin means under each of said parison loading chutes.

8. A continuous motion stretch blow molding apparatus as defined in claim 7, wherein:

(a) each of said loading chutes is adjustably mounted on said rotary parison loading turret.

9. A continuous motion stretch blow apparatus as defined in claim 8, wherein:

(a) each of said loading chutes is gun-holstered shape in side elevation.

10. A continuous motion stretch blow molding apparatus as defined in claim 6, including:

(a) a fixed shroud positioned around said rotary parison loading turret;

(b) said rotary parison loading turret having a shroud mounted thereon and movable therewith; and, (c) said chain means conveying said stretch pin means between said shroud to prevent heat loss from parisons carried on said stretch pin means.

11. A continuous motion stretch blow molding apparatus as defined in claim 6, including:

(a) chain take-up means for taking up slack in said chain means.

12. A continuous motion stretch blow molding apparatus as defined in claim 6, wherein:

(a) each of said stretch pin means includes a tubular body, a stretch pin slidably mounted in said tubular body, a first means on said stretch pin for limiting movement of the stretch pin in one direction, and a second means on said stretch pin for limiting movement of the stretch pin in the other direction.

13. A continuous motion stretch blow molding apparatus as defined in claim 12, wherein:

(a) said stretch pin body and stretch pin are provided with passage means for conveying blow air into a parison carried on said stretch pin for blowing the parison into the shape of a final article.

14. A continuous motion stretch blow molding apparatus as defined in claim 13, wherein:

(a) said molding rotary turret is provided with means at each of the molding stations for operatively locating a stretch pin means in each of said molding stations.

15. A continuous motion stretch blow molding apparatus as defined in claim 14, wherein:

(a) each of said molding stations is provided with means for admitting blow air into a stretch pin located in the molding station during a molding operation.

16. A continuous motion stretch blow molding apparatus as defined in claim 14, wherein:

(a) said means for locating a stretch pin means in each of said molding stations includes a sprocket operatively mounted on said rotary molding turret and provided with notches for receiving the stretch pin body of each stretch pin means for axially locating the stretch pin in each molding station.

17. A continuous motion stretch blow molding apparatus as defined in claim 16, including:

(a) means for guiding said chain means from said rotary parison loading turret and tangentially onto said rotary molding turret.

18. A continuous motion stretch blow molding apparatus as defined in claim 1, including:

(a) means at each of said molding stations for locating a stretch pin means at each of said molding stations.

19. A continuous motion stretch blow molding apparatus as defined in claim 18, wherein:

(a) each of said stretch pin means includes a tubular body, a stretch pin slidably mounted in said tubular body, a first means on said stretch pin for limiting movement of the stretch pin in one direction, and a second means on said stretch pin for limiting movement of the stretch pin in the other direction.

20. A continuous motion stretch blow molding apparatus as defined in claim 19, wherein:

(a) each of said molding stations includes a molding means movable between an open position and a closed position; and, (b) means for moving said molding means between said open position and said closed position.

21. A continuous motion stretch blow molding apparatus as defined in claim 20, wherein:

(a) said transfer chain means is operative to move a stretch pin laterally into said molding means when the molding means is in an open position.

22. A continuous motion stretch blow molding apparatus as defined in claim 21, wherin said molding means includes:

(a) a pair of mold halves movable between an open position and a closed position; and (b) a mold end plug.

23. A continuous motion stretch blow molding apparatus as defined in claim 22, including:

(a) means for moving said mold halves between said open and closed positions.

24. A continuous motion stretch blow molding apparatus as defined in claim 23, wherein:
   (a) means for moving said end plug inwardly of said mold halves for engagement by a parison during a parison stretching operation.

25. A continuous motion stretch blow molding apparatus as defined in claim 24, wherein:
   (a) said means for moving said plugs includes a cam operated means.

26. A continuous motion stretch blow molding apparatus as defined in claim 25, including:
   (a) means for locking the mold halves in the closed position.

27. A continuous motion stretch blow molding apparatus as defined in claim 26, including:
   (a) means for moving said mold halve locking means between a locked position and an unlocked position.

28. A continuous motion stretch blow molding apparatus as defined in claim 27, wherein:
   (a) said means for moving said mold halve locking means between the locked and unlocked positions includes cam means.

29. A continuous motion stretch blow molding apparatus as defined in claim 25, including:
   (a) a stretch pin actuator means operatively located at each of said molding stations for moving a stretch pin inwardly of the mold halves to stretch a parison on a stretch pin to a predetermined length.

30. A continuous motion stretch blow molding apparatus as defined in claim 29, wherein each of said stretch pin actuator means includes:
   (a) a spring biased lift means engageable with the stretch pin;
   (b) means for carrying said spring biased lift means;
   (c) means for moving said spring biased lift means to move the stretch pin; and,
   (d) means for releasably retaining said spring biased lift means in a raised position to retain a stretch pin in a raised molding position.

31. A continuous motion stretch blow molding apparatus as defined in claim 30, wherein:
   (a) said means for moving said spring biased lift means includes cam means.

32. A continuous motion stretch blow molding apparatus as defined in claim 30, wherein:
   (a) said means for releasably retaining said spring biased lift means in a raised position includes a spring biased latch means operative when said spring biased lift means is moved to a raised position.

33. A continuous motion stretch blow molding apparatus as defined in claim 32, including:
   (a) means for disabling said latch means after a molding station has passed through a molding cycle.

34. A continuous motion stretch blow molding apparatus as defined in claim 33, wherein:
   (a) said means for disabling said latch means includes a cam means.

* * * * *